US011151676B2

United States Patent
McIntyre

(10) Patent No.: US 11,151,676 B2
(45) Date of Patent: Oct. 19, 2021

(54) SYSTEM AND METHOD FOR TRACKING SEXUAL ASSAULT KIT EVIDENCE

(71) Applicant: Primary Marking Systems, Inc., St. Peters, MO (US)

(72) Inventor: Timothy J. McIntyre, Lake St. Louis, MO (US)

(73) Assignee: Primary Marking Systems, Inc., St. Peters, MO (US)

(*) Notice: Subject to any disclaimer, the term of this patent is extended or adjusted under 35 U.S.C. 154(b) by 0 days.

(21) Appl. No.: 15/892,578

(22) Filed: Feb. 9, 2018

(65) Prior Publication Data

US 2018/0182051 A1 Jun. 28, 2018

Related U.S. Application Data

(63) Continuation-in-part of application No. 15/477,082, filed on Apr. 1, 2017, now Pat. No. 10,346,497, (Continued)

(51) Int. Cl.
*G06Q 90/00* (2006.01)
*G06Q 50/26* (2012.01)
(Continued)

(52) U.S. Cl.
CPC .......... *G06Q 50/26* (2013.01); *G06Q 10/087* (2013.01); *H04N 5/23222* (2013.01); *H04N 5/23293* (2013.01)

(58) Field of Classification Search
CPC .. B60P 3/03; B60P 3/14; G01S 5/0205; G01S 19/35; G01S 19/48; G06Q 10/10;
(Continued)

(56) References Cited

U.S. PATENT DOCUMENTS 4,481,412 A * 11/1984 Fields ............... G06K 7/10881
235/383
5,025,920 A 6/1991 Walsh
(Continued)

OTHER PUBLICATIONS

Scheck, Anne, Rape Kit Allows Anonymous Collection of Evidence [online], Emergency Medicine News, Dec. 2008, vol. 30, Issue 12, p. 1, 39 [retrieved on Mar. 25, 2017]. Retrieved from the internet <URL: http://journals.lww.com/em-news/Fulltext/2008/12000/Rape_Kit_Allows_Anonymous_Collection_of_Evidence.2.aspx>.
(Continued)

*Primary Examiner* — Thien T Mai
(74) *Attorney, Agent, or Firm* — CreatiVenture Law, LLC; Dennis J M Donahue, III; Kevin Staed

(57) ABSTRACT

A system and method for tagging, organizing and tracking evidence during an investigation has evidence kits and mobile communication devices that collect physical, photographic and interpretive evidence, such as materials from a crime scene and interviews with witnesses. The evidence kits can be used to collect physical evidence, and the mobile devices or other computers are used to upload information about the evidence. The system includes multiple user accounts with varying permissions for access by various parties associated with the evidence. Accordingly, some user accounts are configured to permit user inputs on a permanent and temporary basis and other user accounts are configured to only provide read-only access.

20 Claims, 35 Drawing Sheets

Related U.S. Application Data which is a continuation of application No. 14/679,407, filed on Apr. 6, 2015, now Pat. No. 9,619,851, which is a continuation-in-part of application No. 13/598,608, filed on Aug. 29, 2012, now Pat. No. 8,998,084, which is a continuation-in-part of application No. 12/839,213, filed on Jul. 19, 2010, now Pat. No. 8,998,083, which is a continuation-in-part of application No. 12/751,846, filed on Mar. 31, 2010, now Pat. No. 8,220,711.

(60) Provisional application No. 61/226,544, filed on Jul. 17, 2009, provisional application No. 62/456,997, filed on Feb. 9, 2017, provisional application No. 62/456,709, filed on Feb. 9, 2017.

(51) Int. Cl.
*H04N 5/232* (2006.01)
*G06Q 10/08* (2012.01)

(58) Field of Classification Search
CPC ...... G06Q 30/02; G06Q 40/08; G06Q 10/087; G06Q 10/0833; G06Q 20/308; G06Q 10/08; G06Q 50/18; G06Q 50/26; G06Q 10/0631; G06Q 10/06316; H04N 5/23222; H04N 5/23293; H04N 21/4126; H04N 21/43615; H04N 21/4383; H04N 21/6131; H04N 7/18; H04N 7/185
See application file for complete search history.

(56) References Cited

U.S. PATENT DOCUMENTS

| | | | |
|---|---|---|---|
| 5,159,180 A * | 10/1992 | Feiler | G06F 16/9024 235/375 |
| 5,635,917 A | 6/1997 | Todman | |
| 7,466,244 B2 | 12/2008 | Kimchi | |
| 7,510,080 B2 | 3/2009 | Smart | |
| 2002/0113707 A1 | 8/2002 | Grunes | |
| 2004/0260733 A1 | 12/2004 | Adelstein | |
| 2005/0187733 A1 | 8/2005 | Staab | |
| 2006/0076253 A1 * | 4/2006 | Hong | B65D 5/509 206/307 |
| 2007/0299364 A1 | 12/2007 | Sangha | |
| 2008/0217391 A1 | 9/2008 | Roof | |
| 2009/0234678 A1 * | 9/2009 | Arenas | G06Q 10/10 705/4 |
| 2010/0265068 A1 * | 10/2010 | Brackmann | B60P 3/03 340/572.1 |
| 2010/0305992 A1 | 12/2010 | Michalzuk | |
| 2015/0128215 A1 * | 5/2015 | Son | H04L 67/1097 726/2 |
| 2016/0140299 A1 * | 5/2016 | Al Harbi | G16H 40/20 705/2 |

OTHER PUBLICATIONS

UPS Pressroom, UPS Helps Solve the Case(s) on Assault Evidence Tracking infographic—contact webpage & media [online], Jun. 5, 2015 [retrieved on Aug. 26, 2016]. Retrieved from the internet <URL: www.pressroom.ups.com/pressroom/ContentDetailsViewer. page?ConceptType=Media&id=1433519165506-445>.

Lowe, Emily, Idaho becomes first in the nation with online tracking of sexual assault kits [online], Idaho Press, Jul. 15, 2017 [retrieved on Jul. 19, 2017]. Retrieved from the internet <URL: www.idahopress.com/news/local/idaho-becomes-first-in-the-nation-with-online-tracking-of/article_f0d2303b-d3e3-5b00-a60e-51d8e00dcc4d.html>.

Michigan Domestic and Sexual Violence Prevention and Treatment Board, Report of the Michigan Sexual Assault Evidence Kit Tracking and Reporting Commission [online], Jul. 20, 2016 [retrieved on Sep. 3, 2016]. Retrieved from the internet <URL: www.michigan.gov/documents/mdhhs/Final_2016_Report_of the_Sexual_Assault_Evidence_Kit_Tracking_and_Reporting_Commission_529844_7.pdf>.

\* cited by examiner

FIG. 4 eTWIST - Suspects

Name | Code

New (412) | Edit (414) | Delete (416)

Suspects | Victims (700) | Evidence (800) | Remarks (1500)

Case: 00001

Menu | Finished

FIG. 6 eTWIST - Victims

Name | Alias / Entity

Diane Miller

New (812) | Edit (814) | Delete (816)

Suspects | Victims (700) | Evidence (800) | Remarks (1500)

Case: 10001

Menu | Finished

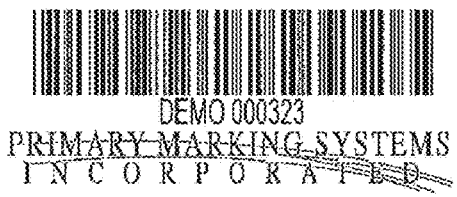
FIG. 15A
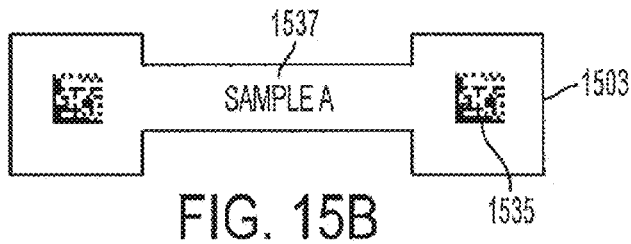
FIG. 15B

Evidence Tracking

| # | Description |
|---|---|
| 000001 | $500 cash |
| 11112 | .357 Magnum |
| 11113 | 425 cash |
| 11114 | Blood on kitchen floor |
| DEMO0 | Knife |
| DEMO1... | Printer w/ bloody finger prints |
| DEMO1... | .357 Magnum |

Barcode: 000001
Type: Evidence-Physical
UCR: A) Currency, Notes, Etc
Description: $500 cash Unit of Measure 1: dollars — Unit Qty 1: 136
Unit of Measure 2: — Unit Qty 2: 0

From:
To:

[Transfer Evidence]

| DSN | From | To | Date |
|---|---|---|---|
| 1234 | officer mcintyre | evidence room - row 2 bin 4 | 11/03/2009 07:03 |
| 1234 | evidence | | 11/03/2009 07:04 |
| 1234 | | county courthouse | 11/12/2009 14:21 |

FIG. 21

All Evidence

Main | Information | Location | Pictures

Case: 0001
DSN: 12345
Barcode: 00001
Owner: John Doe 0 / Suspect-Known
Type: Evidence-Physical
UCR: (C) Clothing and Furs
Description: White tee shirt Evidence Barcode:
- 00001
- 00002
- 00003
- 00004
- 00005
- 00006
- 123456
- 123456789
- 23456
- 789
- DEMO000281
- eeeee
- r Delete Evidence    ^ Make Current ^  — 2201

| Date | DSN |
|---|---|
| 05/17/2010 15:14:50 | 12345 |

| Cases | | | |
|---|---|---|---|
| Case Num | Type | Incident Date | DSN |
| 00001 | 0908 Homicide-Premeditated-P... | 05/27/2010 14:38.14 | 1234 |
| 00001 | 3550 Marijuana-Sell | 12/02/2009 22:14.39 | 1234 |
| 0001 | 1401 Abortional Act on Other | 12/22/2009 09:09.05 | 1we |
| 1 | 1311 Aggravated Assault Polic... | 02/08/2010 09:06.08 | 123456 |
| 10-123 | 3921 Establish Gambling Place | 05/27/2010 11:25.44 | 33265 |
| 10-32543 | 0101 Treason | 05/27/2010 10:38.03 | 12345 |
| 10001 | 1208 Robbery-Residence-Wea... | 02/26/2010 11:49.46 | 12345 |
| 11112 | 0104 Sabotage | 02/26/2010 10:06.28 | 1234 |
| 12 | 1202 Robbery-Business-Weapon | 02/05/2010 15:32.01 | 1234 |
| 1200 | 0106 Selective Service | 01/08/2010 10:04.28 | 1234 |
| 122ft | 1305 Aggravated Assault-Non-... | 02/05/2010 16:27.43 | 1234 |
| 123 | 0106 Selective Service | 05/11/2010 09:25.53 | 1234 |
| 123+ | 1007 Kidnap Hostage for Esca... | 02/17/2010 08:27.16 | detective |
| 1234 | 1211 Robbery-Banking-Type Inst | 02/05/2010 16:23.51 | 1234 |
| 12345 | 1204 Robbery-Street-Gun | 02/26/2010 10:17.23 | 123456 |
| 123456 | 3605 Indecent Exposure to mi... | 02/25/2010 10:17.25 | 1234 |
| 1234566 | 0105 Sedition | 05/04/2010 08:04.03 | 1234 |
| 1e1s | 1201 Robbery-Business-Gun | 02/05/2010 14:08.56 | 1234 |
| 314 555 | 2408 Possession of Stolen Vehi... | 02/26/2010 10:34.15 | 12a |
| 545 | 0101 Treason | 05/18/2010 16:38.55 | 12345 |
| 9999 | 1202 Robbery-Business-Weapon | 03/19/2010 09:04.28 | 025 |
| earth.City | 1006 Kidnap Adult | 03/01/2010 09:48.48 | detective |
| hhhh | 0199 Sovereignty-Remarks | 01/08/2010 10:38.39 | -young |
| sample | 0903 Homicide-Premeditated-M... | 01/16/2007 00:41.58 | asd |
| wwww | 2202 Burglary-Forced Entry-Re... | 05/17/2010 14:56.39 | wwww |

Incident Date
From [06/17/2010 16:52.03 ▼] To [06/17/2010 16:52.03 ▼] — 2511

Modified Date
From [06/17/2010 16:52.03 ▼] To [06/17/2010 16:52.03 ▼] — 2513

☐ Case Num — 2515
☐ Type — 2517
☐ DSN — 2519
☐ Case State — 2521
☐ Filing Agency — 2523
☐ Location Agency — 2525
☐ Precinct — 2527

Order Results By
⦿ Case Num   ○ Date
○ Type       ○ DSN

[< Open]   [New Case]

Filter — 2501

Alerts

| Alert Date | Evidence Barcode | Alert DSN | Alert Text |
|---|---|---|---|
| 06/17/2010 18:58.27 | 00001 | 1234 | Dispose of this Evidence. 2701 |

- ● Next Logon
- ○ After: 06/17/2010 17:00.02

Remind — 2705

Mark Completed — 2703

Case Information 210 310

- DSN: PJ
- Date #: 16-12345-PM
- Filing Agency Code: MSHP — 312
- Incident Date: 08/30/2016 18:3
- Type:
  - 1101 Sexual Assault
  - 1101 Rape-Gun
  - 1102 Rape With Weapon Case Information | Case Location Cancel | Save — 314

- Type: Victim — 3102 514
- First Name: Jane — 512
- Middle Name: Jan — 514
- Last Name: Doe — 516
- Alias / Entity: Janey
- Take Picture
- Delete Picture — 532
- (Picture of Monkey) — 534

Main | Details | Location
Case: 16-12345-PM

Cancel | Save — 528

FIG. 31C

- Barcode: 100136 — 1002
- Owner: Unknown — 1004
- Type: Evidence-Other — 1006
- UCR: (K) Miscellaneous — 1008
- Disposition: Retain as Evidence — 1014
- Description: Swab of victims saliva — 1012

Main | Location

Cancel | Save

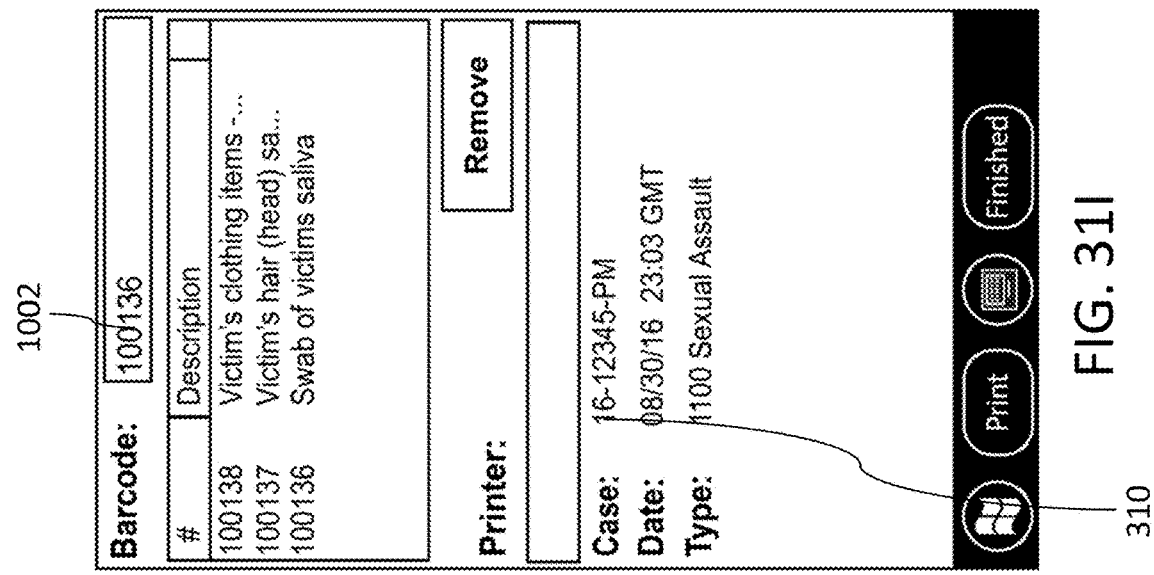
FIG. 31I
FIG. 31H
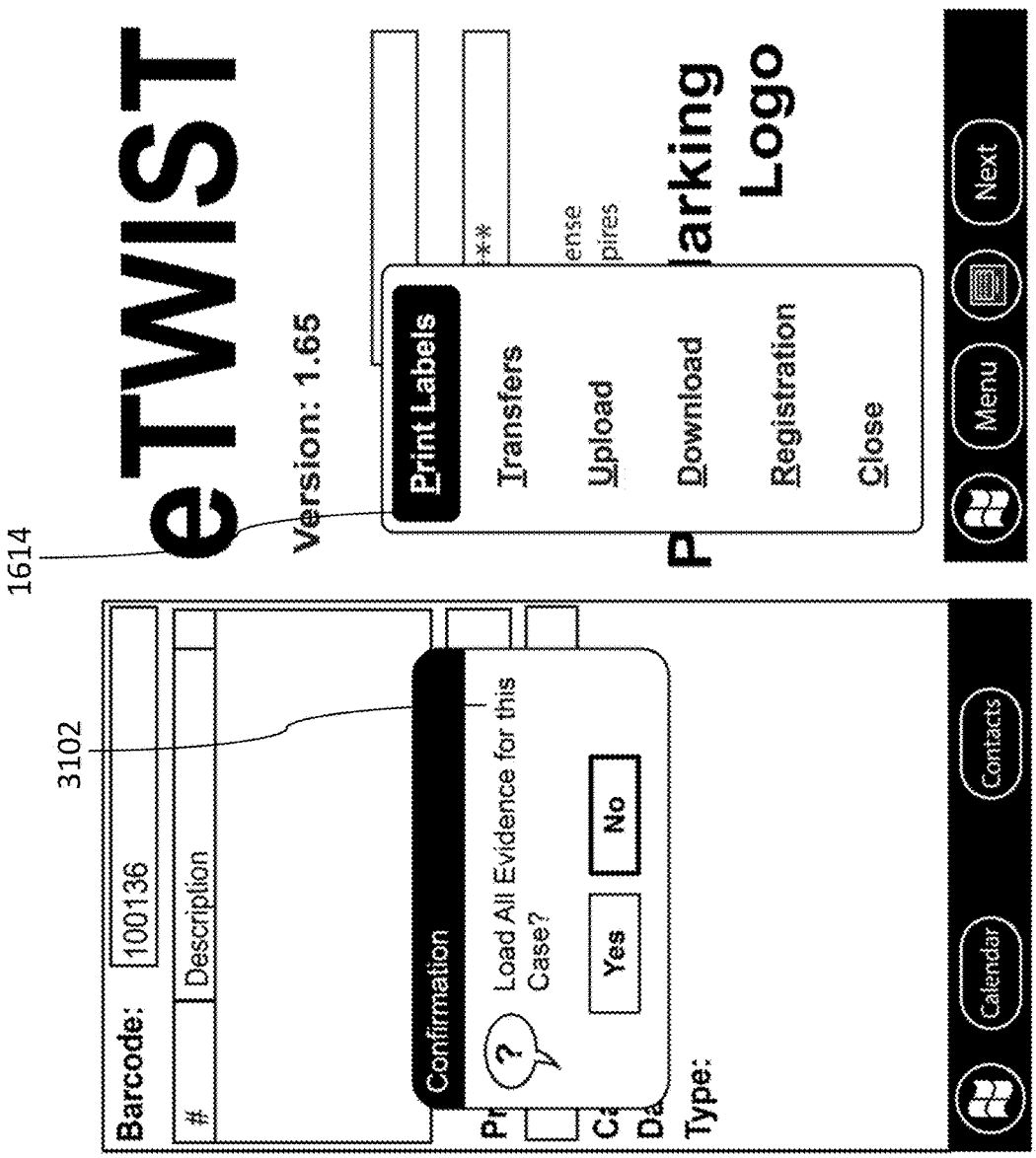
FIG. 31G

SYSTEM AND METHOD FOR TRACKING SEXUAL ASSAULT KIT EVIDENCE

CROSS-REFERENCE TO RELATED APPLICATIONS

This application claims the benefit of U.S. Provisional Pat. App. Ser. No. 62/456,997 filed on Feb. 9, 2017 and U.S. Provisional Pat. App. Ser. No. 62/456,709 filed on Feb. 9, 2017 and is a continuation-in-part of U.S. patent application Ser. No. 15/477,082 filed on Apr. 1, 2017 which is a continuation of U.S. patent application Ser. No. 14/679,407 filed on Apr. 6, 2015, issued as U.S. Pat. No. 9,619,851, which is a continuation-in-part of U.S. patent application Ser. No. 13/598,608 filed on Aug. 29, 2012, issued as U.S. Pat. No. 8,998,084, which is a continuation-in-part of U.S. patent application Ser. No. 12/839,213 filed on Jul. 19, 2010, issued as U.S. Pat. No. 8,998,083, which is a continuation-in-part of U.S. patent application Ser. No. 12/751,846 filed on Mar. 31, 2010, issued as U.S. Pat. No. 8,220,711, and claims the benefit of U.S. Provisional Pat. App. Ser. No. 61/226,544 filed on Jul. 17, 2009. The entire disclosure of these related applications is herein incorporated by reference.

STATEMENT REGARDING FEDERALLY SPONSORED RESEARCH

Not Applicable.

APPENDIX

Not Applicable.

BACKGROUND OF THE INVENTION

Field of the Invention

This disclosure relates to the field of systems and methods for the electronic tracking of valuable objects and information. Specifically, the disclosure relates to the physical and electronic collecting, tagging, organizing and tracking of evidence and other information related to police or other investigative work for later use in law enforcement, judicial proceedings or military operations.

Related Art

In the United States and many other justice systems, judges, juries, and others involved in the judicial system rely on evidence presented at a trial, mediation, arbitration, or other formal proceeding to make a determination as to guilt, innocence, liability, and other legal findings. Because of its importance to such proceedings, there has arisen an entire body of law devoted to nothing except a determination of what may be used as evidence, how it may be presented, and what may be inferred from it.

A good number of evidentiary rules exist to attempt to prevent the presentation of false evidence and to make sure that material shown and used at trial is the actual material that is involved in the underlying action. As the evidence is often the basis for a determination, if the underlying evidence is flawed, inaccurate, or presented inaccurately, a bad determination can be made. As should be clear, it is therefore necessary to make sure that rules are followed with regards to the chain of custody of evidence to make sure that what is presented at trial is ultimately the same as what was originally located.

Because of the nature of criminal investigations, it is very important to know that a piece of evidence located at a crime scene is the same piece of evidence tested by a forensics lab and is ultimately the same piece of evidence presented at trial. In a civil case, lapses in the ownership of physical evidence can often be eliminated by testimony. For example, an individual can be placed on a witness stand and requested to indicate whether or not a certain thing is theirs. In a criminal trial, however, such testimony may not be possible as a defendant is not required to take the stand, and may have an increased interest to lie or deceive. Further, in criminal situations, an increased burden of proof can often require a much more exacting standard. Still further, the same type of evidence may not be as important in a civil case. For example, it may be much more important that a rat was found in an apartment, than the same rat is presented at trial.

In a criminal action, there are often a couple of key pieces of physical evidence. For example, one such key piece of evidence may be the gun used in a shooting. However, the gun may not be immediately connectable to the shooting as the action of the shooting has separated the gun from the bullet which is the more direct connection. Even if the gun is located at the scene, the gun is rarely seen by investigators when the shooting is "occurring." It is, therefore, necessary to connect a gun to the bullet, and to who pulled the trigger. This can involve not only the specifics of the gun itself, but where the gun was located (was it on the defendant, at the scene etc.), how it is known that it fired the bullet which hit the victim (e.g. from ballistics analysis), and how it is determined that this defendant pulled the trigger (e.g. from fingerprints, powder residues, etc.).

The specifics of these connections often mean that a gun has to pass through numerous hands after it is collected. Further, in some situations, there may be multiple guns located and it is important to know which one was actually the weapon used to commit this crime. For example, it will generally be necessary to show that a specific firearm was the same one found in a specific place. Further, it also may be necessary to connect that that specific firearm matches the type used in the shooting, that ballistics information for a bullet fired from that firearm matches the ballistics information from a bullet taken from the victim, and that the bullet tested is actually the bullet from the victim. Still further, it is necessary to connect that a fingerprint from the defendant was taken from that same firearm, that a bullet casing found at the scene was used by that firearm, and so on.

It should be apparent that the web of connections can grow very complicated very quickly. Further, this information is generally needed weeks or months after the shooting occurred and the gun was located. Should an incorrect connection be made somewhere in the process of getting from crime to trial, it is possible to introduce a whole slew of errors. Thus, there is a significant chance that if a mistake is made and an inaccurate connection is introduced, the entire web of connection can become flawed. If the gun taken from the scene is correctly identified as that which fired the bullet, but that gun was then inadvertently replaced with a different gun after the connection was made, a later fingerprint analysis of the "new" gun would point to the gun being used by an individual who actually has no connection with the shooting.

To try and deal with this, rigorous authentication methods have traditionally been used to make sure that evidence is gathered, stored, tested, and handled in such a way that the connections of later evidence to the original evidence are all maintained. This is commonly referred to as "chain of custody" and the idea is that definitive links through each person handling the evidence can be made which tend to show that the same piece of evidence made it through the entire evaluation process and no substitutions were made at any point. Further, if a problem is discovered, chain of custody also provides for improved likelihood of identifying where the problem occurred either to catch a purposeful tampering with evidence, to detect a faulty procedure, or even to potentially allow it to be rectified.

As should be apparent from the above, the purpose of chain of custody is to improve the chances that the same evidence is used by each of the multiple individuals that use it and assert that their results are from it. Should a bullet be inaccurately connected to the victim, it is possible that a piece of false evidence will inadvertently be used because that inaccuracy connects the wrong gun, and probably the wrong defendant to that victim. If the bullet from the shooting is mixed up with the bullet from the ballistics test of the confiscated firearm, the conclusion that the gun fired the bullet used becomes automatic as the bullets (which are actually the exact same bullet) clearly "match." At the same time, it should be clear that the conclusion is inherently flawed (and potentially completely wrong) as the proposition became self-supporting that this was the gun used in the crime when indeed no such conclusion can be drawn with any accuracy due to the incorrect connection.

In its simplest form, chain of custody is the documentation of the movement and location of a piece of evidence from the time it is collected until it is finally presented in court. Chain of custody will generally involve a clear indication of the collection of the evidence, how it is stored, when the evidence is placed in different people's control, and how the evidence transfers between individual's control so as to identify any chance of it being tampered with, a mistake being made in its identification, or it is simply being lost. One can best understand chain of custody by recognizing that a piece of evidence will change hands repeatedly, but the object is only a single thing. Therefore, if it is in a lab under one person's control it cannot simultaneously be elsewhere. Further, if that individual has a unique piece of evidence they will probably return that same piece of evidence. So long as the pathway of that piece of evidence can be tracked, and procedures are in place which inhibit it from getting inaccurately connected to anything else, the odds of a piece of evidence traveling through the system with accurate connections are dramatically increased.

As should be clear from the above, the chain of custody provides for a clearer indication that the same thing is always being referenced. Should the chain be broken, there is a possibility that later evidence is not correctly connected. Should this happen, evidence may be thrown out at trial or may be given reduced weight by a jury attempting to determine the quilt or innocence of the specific defendant. Still further, as a chain of custody indicates who has handled the evidence, should there become concern that evidence has been tampered with, it is possible to recreate who could have done the tampering.

Because of the problems in maintaining the chain of custody in evidence, a large number of materials have arisen to try and make sure that the chain of custody is maintained. In most instances, these materials involve highly manual practices and specialized collection containers to provide for written records of who has handled a piece of evidence. The materials also serve to contain the specific evidence within them so that the individual item is more easily kept tracked and is protected from contamination by an outside source. These systems generally provide ways to uniquely identify a piece of physical evidence. Such systems try and make sure that an individual piece of evidence can be easily and quickly identified as the unique and specific item it is. For the most part, such systems provide for containers into which evidence may be placed, labeling of containers, and identification of individuals who handled (e.g. opened) those containers.

While these systems generally work, they are manually intensive and are subject to concern as the containers can be misplaced, misrecorded, or misidentified through human error. For example, an evidence bag having a unique number allows for specific identification of the evidence bag (and its contents). However, it is possible that when an individual checks out a bag, an inaccurate identifier of the bag is entered by the human user creating a chain of custody concern. Similarly, the contents of the bag may be placed back in the wrong bag leading to inaccuracies.

Still further, while physical evidence is necessary in any investigation, crime scene photos, police officer notes, and other materials also associated with the case and necessary for investigation are not necessarily physical evidence. This information can itself become evidence depending on what occurs during the investigation. These items may have reduced chain of custody issues, but are often not connected at all with the case that they support and when they do become evidence may have increased concerns due to them having been handled differently.

In another example, the current methodology for tracking Sexual Assault Kits (SAK) in the US is very ambiguous, open for interpretation and quite simply has been left to the training of a Sexual Assault Nurse Examiner (referred to herein as "SANE") and the respective law enforcement agency to deal, with using paper and ink methods. There are currently no standards indicating what the SAK itself should look like, what "evidence vessels" within the SAK should look like or how many "vessels" of any particular kind should a SAK contain. Some SAK's have a human readable number, provided from one of the many suppliers of SAKs, a number that does not particularly indicate much at all, it could indicate a manufacturing part number, such numbering is easily duplicated by anyone with even limited means. Other SAKs may merely contain a statement such as "Kit Integrity Seal to be broken by Authorized Personnel Only". SAK medical forms used by SANEs also vary depending on various jurisdictions, county, state, federal, and tribe. Even with military bases and VA hospitals, there are discrepancies among the proper and most current forms.

With the proliferation and use of the Internet and mobile computing devices, there exist many unsecure connections into the "web". In general, the combined ease-of-use of mobile devices and easy accessibility of Internet connections leads to a concerning lack of security and device management when it comes to hardware and/or software systems. Vulnerabilities include oversights such as, but not limited to, the absence of enterprise management security between Machine-to-Machine (M2M), on many public Wi-Fi, private Wi-Fi and backend systems. The absence of enterprise management combine with much more malicious approaches, such as software deployed with wireless "sniffers" disguised as air fresheners. These vulnerabilities allow individuals or organizations to easily "hack" said systems. The challenge to securely share confidential, sensitive, private, and protected data is becoming increasingly more difficult due to demands of HIPPA privacy protection and legally protected criminal investigation. Any system that allows various stakeholders in the justice system to access a common database needs safeguards to enable safe write access by parties that may have different and even fiercely competitive goals, such as with prosecutors and defense attorneys, while securely sharing confidential, sensitive, private, and protected data.

Additionally, the growth of the Internet of Things (IoT) provides previously "quiet" medical devices the opportunity to act more like mobile computing devices, to talk or "chat" amongst other IoT "members." According to an *FBI InfraGard* report dated Dec. 6, 2017, by 2020 there will be between 20-50 billion IoT devices in the world compared to an estimated 10 billion devices as of 2015. These systems and devices range from brand new personal consumer products such as light bulbs, televisions and thermostats to legacy critical infrastructure systems that have been in place for decades but are only recently being connected to the Internet.

Many first responders, Law Enforcement Officers (referred to herein as "LEO" or more generally as "LE"), healthcare providers, and backend organizations are also overly dependent on antiquated hardware and software, with inherent vulnerabilities that could inadvertently put sexual assault survivors' presumably confidential, sensitive, private, and protected data in danger. As reported in the Dec. 11, 2015 issue of *Healthcare IT News* more than 720 data breaches occurred that year, and the top seven cyberattacks alone have left more than 193 million personal records open to fraud and identity theft, according to 10 Fold Communications. The US Census Bureau's population clock reports the 2015 US population at approximately 321 million people, which translates to 58.4% of all personal records were possibly open to fraud and identity theft.

Currently, there are over 400,000 SAKs untested across the United States according to estimates by endthebacklog.org, with the numbers still increasing. According to FBI Crime Clock 2014 reports, one rape occurred every 4.5 minutes on average, and in 2015, the number of rapes increased resulting one rape every 4.2 minutes. At the present time, there is no consensus on the systems and methods to use in tracking the SAKs and managing the workflow of the SAKs as they are processed and moved from the initial gathering of evidence to and between evidence lockers and crime labs. A system is needed to track SAKs with many and various related evidentiary components along with an ability to electronically establish a familial hierarchical relationship with all aspects, stakeholders and individuals related to the respective SAKs with their bundles of evidentiary materials. The system would preferably include computer-assisted management of the workflow for SAK evidentiary bundles as they are processed and moved from healthcare providers, to LEO/A's, to evidence lockers to crime labs, to ultimate disposition through the SAK lifecycle. As described below, current computerized SAK tracking systems may use unique SAK identification systems provided by SAK manufacturers or delivery service operators or may suggest that the government jurisdictions or partnering healthcare provider systems can provide the unique SAK identification system, but none of these existing systems or proposed systems teach or suggest the familial hierarchical relationship that is truly required for a computerized evidence management system (CEM system).

Currently proposed solutions would only track the SAK container and not the individual pieces of evidence which make up the evidentiary bundles and may be in stored internal vessels that fit back within the SAK container and reduce the risk of contamination or may be too large to fit back in the SAK container and may be stored externally from the SAK container, and this failure to track the evidentiary bundles down the hierarchical level to individual pieces of evidence within the same family of evidence for the SAK container results in SAK systems that cannot properly function as CEM systems. Accordingly, the entire principal of operation of the current computerized SAK tracking systems that have been developed and are being contemplated needs to be changed in order to provide these familial hierarchical relationships.

While current systems are designed for the stakeholders in law enforcement, prosecutors, and the administrators of these systems, it has been suggested that systems for tracking SAKs should available to a larger group of stakeholder(s), such as but not limited to, victims and sexual assault survivors and their advocates, and even defense attorneys which would allow stakeholders to independently track the status and movement of their particular SAKs or their respective case(s). Similar to the manner one can view, monitor and track the status of their pizza order, from initially calling in the order thru to delivery, but as explained above with protections in place to ensure the integrity of the data stored in the system.

What is needed is a secure system that is readily accessible to all stakeholders who are involved in all aspects of the Sexual Assault such as, but limited to, the creation, processing, and management of SAKs, and its many and various familial related evidentiary components. Such a system should comprise of at least a robust identification, documenting, collector accountability and tracking component which complies with protocol driven directive(s) requirements for ensuring that the chain of custody for each individual SAK, the respective evidence stored within the SAK, including its many and various related evidentiary components is maintained as the SAK, specimen containers, including its many and various related evidentiary components passes through the various workflow processes.

The current process for collecting, identifying and tracking includes the SANE performing an exam collecting each piece of evidence, biological, physical or any other type of evidence. Example of items that may be contained in the SAK, requiring identification, collection and tracking could be samples such as such as oral, rectal, and vaginal swabs, fingernail scrapings, hair and bodily fluid samples, sections of fabric or other materials cut from clothing, sheets, bedding materials, carpets, rugs, or drop cloths, and printed pictures or images on electronically stored media, and/or any other types of evidence that a trained SANE may deem necessary and might be available in the examination. Some samples require multiple samples to be collected. Some samples are too big or there are too many samples to fit into the evidence vessels provided with the SAK, and other types of evidence vessels must be employed.

In present systems, date and time records are handwritten; many times, this is done sometime after the completion of the exam. It is important to note that biological evidence begins to breakdown as soon as it is removed from body. The body itself reacts both positively and negatively over time, so it is also important to note that accuracy in the recordation of the time and date a respective piece of evidence was collected can be very important to all interested parties.

Generally, as a matter of practice, the SANE and/or healthcare provider will attempt to return all consumed evidence vessels/specimen containers and/or components with their enclosed evidentiary materials to their original SAK as populated evidentiary containers and will do so according to the physical constraints of the SAK and will also seal the SAK. However, many times the populated evidentiary vessels expand in volume size, such as with evidence placed in plastic bags so the original SAK may not accommodate the additional physical space requirements of the populated evidence vessels. Accordingly, merely having a single tracking code or other identifier for the SAK is not satisfactory for tracking all of the evidence associated with the SAK. Accordingly, it is important for the individual evidentiary containers used within each SAK to have unique tracking identifiers, and the database used in the tracking system for the evidence should have familial hierarchical relationships between the evidentiary containers and their corresponding SAK.

Some evidence samples may be too big, bulky or there simply may be too many pieces to be placed back into the respective evidence vessels provided with a respective SAK. This may lead to the need for additional, and/or other types of perhaps non-conventional evidence vessels/containers, such as, but limited to, paper bags, plastic bags, expandable boxes, and/or duffle type bags of all shapes, sizes, configurations, colors, and/or types to securely contain the expansive amount of evidence. As such, the populated evidence vessels cannot all be returned to their respective SAK. It will also be appreciated that representative samples from pieces of evidence may be contained within fixed size vials, capsules, and other vessels and may be returned to the SAK, such as swabbed, scraped, or otherwise collected materials, bodily fluid samples, fabrics, pictures, or any other evidentiary samples. Even for these populated evidence sample containers that fit back into the SAK, it is best for each individual evidentiary container to have a unique tracking identifier that is associated with the SAK in the database to maintain the familial hierarchical relationship between all related evidence.

As indicated above, the fixed size and expandable size populated evidence vessels that can fit back into the SAK are placed back into the respective SAK, and the SAK is sealed. In sealing the SAK, there may be some written record made on the SAK. For example, the SANE's identity may be legibly recorded and the sealed SAK. There may also be some written record made of the separate populated evidence vessels that do not fit back into the SAK, and the SAK and the separate corresponding containers may be securely held in a general storage location, generally within the healthcare provider's facility, until the SAK and other evidence is collected by law enforcement. Accordingly, populated evidence vessels are returned with the SAK and placed in an appropriate storage location and held for law enforcement pickup.

Currently known SAKs may contain a label for writing information and/or a pre-printed instructional identification area on the exterior surface. Such SAKs also have an area for handwritten victim ID, handwritten time and date, SANE ID who performed the exam, and a few signature lines with date/time to identify the deliverer and receiver of the SAK, to identify the respective sampling. All are avenues providing the opportunity for a high level margin for error, great deal of confusion, unmet deadlines, misuse, misinterpretation, and the very real possibility of lacking the clarity of all respective parties. If LE has not yet been contacted, the SANE, the advocate or the healthcare facility will do so. When a LEO arrives at the healthcare facility, the SAK may be transferred to the LEO, whereby both the receiving and delivering parties will sign an acknowledging receipt and should indicate, by electronic signature, some other electronic verification or by handwriting the time/date of the transaction. Sometimes all SAK "paperwork" is provide to the LEO and sometimes such paperwork is not provided until sometime later. At this point the LEO will take ownership of the SAK. As indicated from the Detroit and Houston studies, many SAK remain with the LEO agency for years. It would be beneficial to automate the collection, transfer, and tracking of SAKs throughout their entire lifespan. Although there have recently been some suggestions on systems that may be able to be used in tracking SAKs, including systems in which a single unique identifier is printed on or otherwise affixed to the SAK, no system other than the eTWIST® evidence management system provides a satisfactorily comprehensive solution to the management of SAKs with familial hierarchical relationships between all pieces of evidence associated with each SAK through their entire lifespan as evidence.

There are systems, proposed or crafted by delivery service providers, respective governmental agencies', healthcare providers, SAK manufacturers, and/or other entities for tracking of SAK's. Many, perhaps even most "packaged/canned" tracking systems are dependent of and rely on, pre-defined, pre-printed human and/or machine readable indicia supplied with the SAK from either the SAK manufacturer, governmental agencies/entities, healthcare provider systems or delivery service providers, to account for and track the respective SAK. While at a minimum it is certainly prudent to employ measures to identify, document, track and account for a respective SAK and its many components, merely applying a machine or human readable indicia singularly to the SAKs themselves and declaring familial hierarchical relationships exists between the SAK's and all its many and various related evidentiary components to be identified, trackable, traceable and documented is not a true statement. Such simplistic annotations and illustrations provide false hopes/securities to all stakeholders, which society as a whole is party to, as there has been no establishment of hierarchical relationships between the respective SAK's, specimen containers, its many and various related evidentiary components, stakeholder(s) and the survivor, leading to the apprehension of the perpetrator.

As indicated above, there is no known consensus on the systems and methods to use in tracking of, documenting of, accounting for, recoding of, managing of, a respective SAKs, including its many and various familial related evidentiary components and/or managing the workflow of respective SAK('s), including its many and various familial related evidentiary components as they are produced and/or moved from the kit/component manufacturer, to the initial healthcare providers custody, to "evidence lockers" to crime labs, and so on to a final status, completing the lifecycle. Additionally, there is no known CEM system that is available to all stakeholder(s), such as but not limited to, victims and/or sexual assault survivors (SASs), which may allow them to independently track the status/movement of their particular SAK(s) or their respective case(s). Similar to the pizza ordering system referred to above which has a very simple interface for the customers who are only able to see the status of their individual order while there is an entire tracking and management system in the backend of the system for the operator of the business that is used for processing and fulfilling the orders for all of the customers, the online interface for SAS stakeholders would provide a simplified user interface with limited access that only allows these users to review certain tracking data associated with their respective cases while the backend system of the CEM system and the interfaces for the LE users allows for the complete intake, tracking, and management of the evidence.

Most, perhaps all, current CEM systems implemented at respective local municipal and State law enforcement agencies do not share information, do not allow for sharing, do not interact with each other across multiple jurisdictions within a respective state, and do not interact with other local and state law enforcement agencies outside a respective state jurisdictions or with federal authorities, much less with all other stakeholders. Accordingly, there is no mandatory evidence management repository for information on crimes across multiple jurisdictions that could enable big data computerized analyses finding patterns in crimes, connections between crimes, and possibly even predictions of crimes based on the patterns and connections of past criminal actions across multiple jurisdictions before criminals have been apprehended, and perhaps help to tally tangible and intangible associated costs to such crimes. At most, current systems provide only a patchwork of data, even though the Federal Bureau of Investigation (FBI) has had its Uniform Crime Reporting (referred to herein as "UCR") program active since 1930, a slight amount of the over 18,000 law enforcement agencies voluntarily participate by providing limited information. Perhaps one of the reasons that this patchwork exists is there has not been any centralized system created which not only can receive and map data from numerous disparate CEM systems but can also allow those law enforcement entities which do not have their own CEM system to access a web-based and/or highly secure cloud-based evidence management system available through a server on the centralized system.

Perhaps the most glaring problem with many if not all current systems is that such systems do not enjoy the capability to allow for all stakeholders access to query the system for their particular/respective case and obtain report(s), update(s) on the status of the processing of the SAK unique to their case or on the status of any other aspects of the case. However such a centralized web-based or cloud based system could provide all stakeholders with protocol driven directive(s) access to information on those cases in which they have been identified as a stakeholder. Such a centralized system would allow those jurisdictions that have existing CEM systems to keep their existing systems by integrating existing systems with such a centralized system. An additional benefit of such a centralized system would offer any jurisdiction the option to use the centralized system for its CEM system providing protocol driven directive(s) access to SAS/victims/stakeholders. Of course, the centralized system would also be useful in reporting crime statistics, predictive analysis and performing other varied analyses on said data.

As an additional challenge, other than the eTWIST computerized evidence management system, all other known CEM systems used in the collecting, tracking, documenting and management of, the flow of evidence are not satisfactory for the chain of custody issues surrounding SAKs in which healthcare providers/Sexual Assault Nurse Examiners aka SANE(s) are integral to the collection of evidence. Such said systems do not provide for nor establish a unique, non-repeatable human and/or machine readable indicia driven familial hierarchical relationship between respective SAK's and its many and various related evidentiary components, i.e., grandparent, parent, child. The eTWIST system's features can, but are not limited to, identify, document, photograph, geo-stamp, track and account for all respective piece(s) of evidence within the container and relate the respective evidence to any particular, respective container that holds the respective piece(s) of evidence. Relating and tracking both a container and the evidence within the container is particularly important for the tracking of SAKs which may consist of an evidence container that typically holds multiple pieces of many and various related familial evidentiary components, including individual specimen containers or other vessels. Such a system creates a continuous and unbroken familial hierarchical relationship in a chain of custody between all aspects, events, and stakeholders related to the respective SAK, including but not limited to, its many and various related evidentiary components. The eTWIST system increases the awareness that all collectors and custodians of evidence have a responsibility to care for the evidence within their respective roles in the justice system.

Additionally, this is an important attribute when tracking SAKs because of the unique role played by stakeholders such as, but not limited to, healthcare providers, advocates, and survivors in collecting all respective evidence relating to SAKs. Generally speaking, for most other "non-SAK" evidence managed within a CEM systems, the investigators who collect the "non-SAK" evidence are law enforcement officers (LEDs) and/or specially trained members of law enforcement departments and/or other governmental entities, such as but not limited to, crime scene investigators and/or coroners/medical examiners. However, in collecting evidence following sexual assaults, Sexual Assault Nurse Examiners (SANEs) are most often the "investigators" who are charged with collecting biological and other physical evidence from the victim and/or the victim's body. To maintain the chain of custody and preserve the integrity of the evidence being collected, eliminate the occurrence of errors; bring efficiency to all aspects of the adjudication process, including indigent processes, it is very important, perhaps most crucial to the investigation, for the SANE(s) to electronically document the SAKs that they process and electronically link the SAKs and their contents to minimally the corresponding victims and preferably link each one of the SAKs, specimen containers and/or their many and various familial related evidentiary components/contents to a particular case. The combination of the transformative capabilities of the eTWIST system, such as electronic documentation, site sensitive exploitation of forensic analysis, automating evidence collection, increasing conviction rates, and/or increasing operational efficiency, have significantly improved evidence collection. All stakeholders will see improved quality control, lower cost, and greatly mitigated operational risks, ultimately protecting the health and safety of citizens and officers. Enhancing and extending transparency and accountability work through the strategic application of new technologies and data-informed approaches which yields transparency to protect the truth and ensure the chain of custody guaranteeing that properly documented evidence collection is and remains the cornerstone of public safety.

SAK manufacturers and assemblers are primarily small companies with a sprinkling representation of subsidiaries of larger companies having varying degrees of internal product tracking efforts, including pen and ink or the "in the boss's head" approach. Some commercially available off the shelf (COTS) SAKs have a model number or part number for the SAK as a whole with human readable indicia reflecting the same. However most if not all SAKs do not contain any familial individuality relative to a singularly unique human readable indicia, machine readable indicia or nomenclature of any kind. Nor is there any known singularly unique or respective human or machine readable indicia of any kind respective to a SAK's various and related evidentiary components and vessels. In addition to a respective SAK itself, SAK's contents that should require an individually, singularly unique human or machine readable indicia include items such as, but not limited to, oral swabs, cotton or other tipped applicators, fingernail scrapings, rectal swabs, hair sample vessels, other types of receptors, vessels as well as other collectors used in performance of a sexual assault examination. Given the fact that are perhaps several SAK manufactures and assemblers with widely varying degrees of the knowledge base required to deploy individually, singularly unique human or machine readable indicia, coupled with the fact perhaps none of the aforementioned SAK manufactures and assemblers readily share and coordinate their unique trade secrets and how to's with their competitors, enabling safe write access by multiple non-trusting (and even fiercely competitive) parties presents a very difficult SAK identification hurtle to overcome. Under this described environment, no impartial $3^{rd}$ party data registration, data repository vehicle or similar method exists where SAK stakeholders rely on the SAK manufacturers and assemblers to provide a familial unique singular SAK identification system. Accordingly, there exists a very high probability for duplication of human or machine readable indicia affixed and relating to the SAK. Thus, there is a problem in the art on relying on the SAK manufacturers to provide unique SAK identification.

One could describe the SAK environment as similar to that of genesis of a "SAK organism" without the ability to know the familial hierarchical relationship of the organism, only knowing that this an organism—what is the organism's familial lineage—we cannot tell and may never know for sure. But such a disaster gets much worse, staying with our organism example, there exists a very high expectation that such an organism possess an identical twin somewhere with the identical name and physical descriptions. Each twin has an exact copy of their own whom also have the identical name and physical descriptions of all other twins' organisms, yet the "parents" cannot identified nor distinguish their respective organism nor could the respective organism identify nor distinguish their "parents". It should be evident the disastrous affairs associated with having such an unchecked and open environments for the duplication of human or machine readable indicia (aka "organism"). This is one of the reasons why candy bar manufactures of similar chocolate bars have uniquely familial associated human or machine readable indicia.

Some, perhaps most COTS delivery solutions track only the shipper's name and addresses absent minimal details, (i.e. date and time of shipment, package location, etc.). Other delivery service providers contain intricate, internally generated numbering systems uniquely provided by the respective delivery providers' internal system. These systems are complete with human or machine readable indicia, capable of providing near real-time SAK tracking once the SAK is uploaded into the delivery providers' system. This system requires all stakeholders to be familiar with and deploy the same tracking system or search many delivery service providers' sites. These systems typically have large constraints, and can be highly inflexible, with pre-establish limits as to what information may be contained within the human or machine readable indicia. Further straightjacketed methods such as the label material used, the label adhesive deployed, the size of the label, the aspects the human or machine readable indicia further remove the flexibility to associate, identify, differentiate, track and account for the various commonly found internal components of the kit as described previously. Thus, there is also a problem with relying on a delivery service provider to provide unique SAK identification.

Such knowledge base needed to associate, identify, differentiate, track and account for the SAK itself as an item, coupled with the ability to establish the hierarchical relationship with all aspects, stakeholders and individuals related to the respective SAK, its many and various related evidentiary components, is regarded as perhaps the single most important aspect of a SA investigation, however such intricate level tracking is generally out of the package delivery services providers scope of work. It should be anticipated that such steep learning curves associated with these steps, added additional cost, will assuredly add time delays to the proceedings. It can be anticipated that most delivery services can generally provide package location.

One such delivery service provider with singular SAK tracking capabilities, is UPS's UPS Trackpad®. In the UPS system, whenever the SAK changes custody, a barcode on the SAK is scanned to identify the particular SAK, and the recipient of the SAK is also identified and linked to the SAK along with a signature, date and time stamp. This information can be used, along with the tracking number, date and time, to track and manage all SAKs and allows for searching for individual SAKs and their current respective locations. However, neither the UPS Trackpad® nor any known delivery service provider system can establish and record the historical familial hierarchical relationship between the many and various contents of the package, to the package, to all stakeholders or precise whereabouts and movements of the contents after the contents of the package have been separated and/or package has been discarded. Moreover, current delivery service provider systems do not provide separate privileges, authorizations and/or rights to respective stakeholders with the SAK, such as, but not limited to, the right to receive and/or transfer ownership of the SAK and/or some or all of the respective evidence within the SAK nor the right to restrict, or not, aspects concerning viewing the movement the many and varied evidentiary components, to describe a few of the delivery service provider system shortcomings. As stated earlier, to provide unique SAK Identification designator requires delivery services providers to enable safe write access to multiple non-trusting (and even fiercely competitive) parties, willingly cooperate and perhaps share trade secrets (i.e. area of service, operating procedures, etc.), such actions could be considered extremely and highly unlikely to manifest.

Perhaps some of the biggest reasons there are estimated to be over 400,000 untested SAK's currently in the U.S., is due to law enforcement agencies (LEAs) inherent lack of trust even within their own LEA/O(s) community(s), their inability and unwillingness to cooperate, share, co-mingle establish, coordinate and administer, at most levels an electronic familial hierarchical relationship(s) for all subject matter within the chain of custody, to understand, accept and deploy documented accountability, and transparency through actionable items, to establish electronical and extremely evidence tamper proof alerts or alerting system(s) for tasks driven by long established protocols. The task will likely go undone considering the lack of electronic accountability, dwindling supervisory leadership of SME in tracking and data collection experience, increasing inability to attract new officers, constant interdisciplinary rotations of LEO personnel, and the extreme stress of the position in general. LEA's are traditionally very adverse to and do not release much data, if any, relevant to a case. Given LEA's tremendous reluctance to share data even within LE communities, should a singular LEA, such as a State Patrol or another State investigative agency, be successful at creating a uniquely respective SAK numbering system which enables safe write access by multiple non-trusting (and even fiercely competitive) parties, it can be expected that such a system may not be interactive, nor operative, nor possess or allow for "Cross-pollination" between stakeholders outside said State's scope of influence or jurisdictions.

An example could be State "A" creates a respective SAK system and/or State "B" creates a separate and respective SAK system, each within their own vacuum. There exists the high likelihood of occurrence that both State "A" and State "B" may produce and/or deploy duplicate human and/or machine readable indicia. Such an occurrence in areas where the population routinely transgresses from State "A" to State "B" and/or the reverse, would destroy interoperate data-sharing, break the Chain of Custody, potentially resulting in further harm to the SAS/victim, further limit the LEA's abilities of apprehending suspects, and/or perhaps the worst possible scenario; evidence collected from both independent and vacuum created SAK's and/or systems being rendered inadmissible, unaccountable for, lost and/or missing.

A report out of FL indicates that of the approximately 18,000 LEAs in the U.S., less than 10% are using any kind of electronic system or database to keep track of evidence. Currently the Cook County Sheriff's Office, one of the largest LEA's in the U.S., utilize a spreadsheet to log their evidence. A spreadsheet is not a database which means at some point the spreadsheet will exceed its capacity to accept any more data. When this occurs it should be expected to result devastating legal and civil effects. Similar reports portray other LEA such as, but limited to, the LAPD, NYPD, U.S Military Police, St. Louis County PD, and Miami PD of not having the technology to accept any kind of a mobile electronic evidence data transfer, tracking, documenting, co-mingling, sharing, and cross-pollination, deploying a familial associated human or machine readable indicia.

The healthcare industry as a whole is second to the delivery services provider industry in their use of bar coding. However, their expertise lies purely within the healthcare industry with sector participation generally at a relatively low rate. More importantly healthcare service providers (HCSP) expertise is not in the data collection and the dissemination arena. For the most part HCSP are large private or public companies competing in the same space, with virtually none or at best, very sparse knowledge of the LEA sector and there is a problem with relying on the healthcare system and healthcare providers to establish SAK numbering.

Other than the eTWIST system generally described above and previously patented in the applications to which this application claims priority, none of the currently proposed SAK tracking systems establish the familial or hierarchical relationship between all associated and interested stakeholder parties, including the victim/SAS, the SANE, agencies, officers, several layers and types of legal systems, the SAK including, specimen containers, and the many and various related evidentiary contents of the SAK, and multiple, non-cooperative, distrusting, disjointed backend systems. This makes the accountability, transparency and traceability of a complete SAK specimen containers, including the many and various familially related evidentiary contents of the SAK's chain of custody nearly impossible to establish but perhaps more important, particularly to those who rely on its unbreakable integrity, very challenging at best, but realistically, non-existent. Many of the described systems lack device and system security expertise leaving not only the system as whole vulnerable. Accordingly, improvements to the eTWIST system would be beneficial to make it available to more stakeholders while retaining system security, maintaining data integrity, and expanding LE connectivity options.

SUMMARY OF THE INVENTION

Because of these and other reasons, there are described herein systems and methods for providing electronic monitoring of evidence and electronic storage of investigatory materials. Specifically, the systems relate to electronic systems for identifying, storing, and evaluating evidence. The systems utilize a combination of computer readable storage of investigatory material, along with computer storage of evidence identification.

There is described herein, among other things, a computerized evidence management (CEM) system for the tracking of evidence using evidence tags which have a machine readable indicia and a handheld device that has a camera and a memory. The system preferably includes an evidence container, a printer; and a central server computer. The evidence tags are designed to be attached to a piece of evidence at the time of collection in such a fashion as to indicate if said evidence tag is later removed from the evidence. The evidence is stored in the evidence container and can be removed from the evidence container without destroying the evidence container. A sexual assault kit (SAK) is an example of the evidence container, and the SAK can include multiple specimen vessels that are used for securely storing various pieces of evidence to avoid contamination. The handheld device is preferably used to identify various items of evidence using evidence entries that each includes a description and a photograph of the evidence which is stored in the memory. The printer can be used to print an identification label that is attached to the evidence container and identifies the items of evidence in the container and the case associated with the evidence. The evidence entries in the memory of the handheld device are transferred to the central server computer, and the evidence is transferred to a storage facility.

Preferably, the central server computer has a database with online access to all stakeholders who are given different levels of authorization to access the evidence data depending on their roles and involvement in the cases being tracked and managed by the system. For example, the LE users who operate the handheld devices are granted authority to enter evidence data into the system's database and track and manage the data for the cases to which they are assigned and can also be given access to review the data for other cases. In comparison, victims are preferably given much more limited access that only allows them to review certain tracking data associated with their respective cases and will not include the ability to change data, view other cases, or even view sensitive evidentiary data for their own case such as the identities of witnesses or each individual piece of evidence. The online access can also provide a centralized computerized evidentiary tracking system for LE agencies that are currently using the manual pen and paper system regardless of whether the LE agencies use the handheld devices while collecting the evidence. With commonality amongst computerized evidentiary tracking systems that are used by various jurisdictions, it will be possible for evidentiary information to be shared between these jurisdictions and state and/or federal authorities which can allow for the identification of evidentiary patterns leading to the faster apprehension of criminals who commit crimes across multiple jurisdictions and leave evidence that may link these criminals to their respective crimes.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 shows a suspect list screen on the portable computer.

FIG. 6 shows a victim list screen on the portable computer.

Figures 7A, 7B:
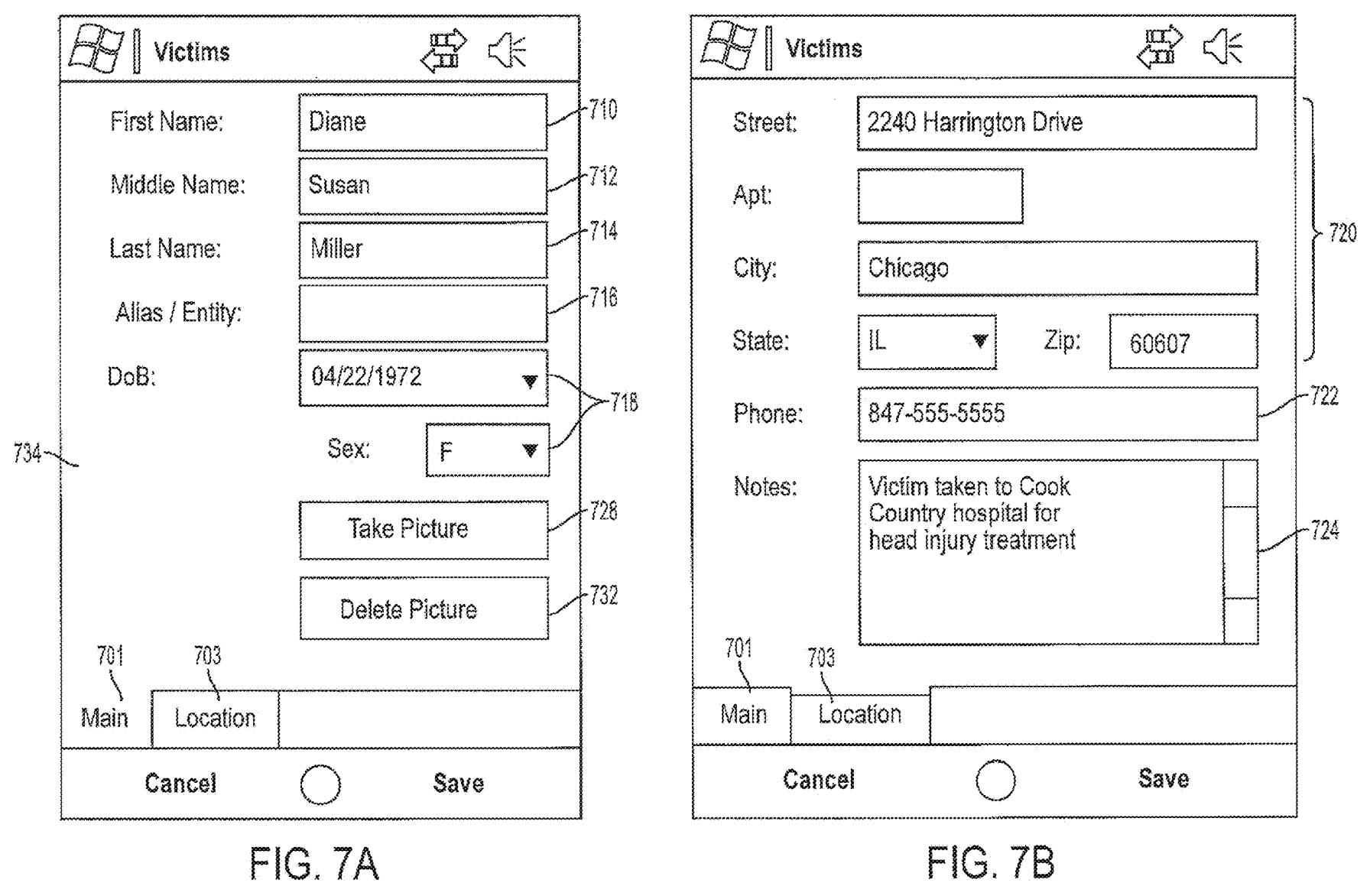

FIGS. 7A & 7B show an entry screens for victim data on the portable computer.

FIG. 8 shows a notes or remarks entry screen on the portable computer.

FIG. 9 shows an evidence list screen on the portable computer.

FIGS. 10-12 show entry screens for evidence on the portable computer.

FIG. 15A shows a label which may be used to tag evidence.

FIG. 15B shows a tag which may be used to tag evidence.

FIG. 18 shows a case list screen.

FIG. 19 shows an integrated screen with a suspect list and details.

FIG. 20 shows an evidence room screen with a chain of custody record.

FIG. 21 shows a case list on a computer with onsite access to a central server.

FIG. 22 shows an evidence list on the onsite access computer.

FIG. 23 shows a victim list on the onsite access computer.

FIGS. 24A-24F show case information screenshots.

FIG. 25A shows a case filter screenshot.

FIG. 26 shows an alert setup screenshot.

FIG. 27 shows an alert notification screenshot.

FIGS. 31A-31L shows screenshots of a system for tracking sexual evidence kits.

DETAILED DESCRIPTION OF THE PREFERRED EMBODIMENTS

The following description of the preferred embodiment(s) is merely exemplary in nature and is in no way intended to limit the invention, its application, or uses.

The system and methods herein will generally be discussed in conjunction with a collection of hypothetical evidence being collected in a criminal investigation. While the system can be used in conjunction with any type of evidence collection and investigation, a criminal case is used in the examples as it is generally more familiar to the reader and it provides an opportunity to highlight a number of specific types of evidence that could be collected. Accordingly, the following description of the preferred embodiment(s) is merely exemplary in nature and is in no way intended to limit the invention, its application, or uses.

To begin with, it is helpful to provide a common vocabulary for this discussion. Throughout this disclosure, references to "physical evidence" will be to items which are collected during an investigation which item will itself potentially be used in a resultant trial and which item is physically controlled during the investigatory process. Thus, physical evidence can be physically be taken back to a storage facility, stored, and later examined or otherwise further investigated.

"Photographic evidence" will comprise evidence that cannot be physically taken back to a storage facility, but comprises photographs which are taken of the evidence contemporaneously to its discovery. Photographic evidence may be of items which are themselves physical evidence or may comprise things that cannot be taken into physical evidence. This may be because they are transitory in nature or because they are physically difficult to transport. For example, the position of a body is generally not something that can be maintained as physical evidence. Instead, a photograph of the position will generally be made.

"Interpretive evidence" is evidence that is collected by an investigator and relates to their notes, thoughts, observations or other information they collect which is not physical or photographic. In effect, this is evidence that is subject to the interpretation of the investigator. This may comprise their thoughts or feelings, observations, or other material that is subjective to them. As example(s), it may be their comments during an investigation (such as describing a location in a photograph or where it was taken from), personal observations or may be something that they have no way of recording in another fashion. For example, an investigator may record what a witness told them. Interpretative evidence may be used at trial, but is also often used as an investigatory aid.

While the above descriptions are utilized throughout this document, the above are in no way intended to limit the meaning of these terms as they may be understood by one of ordinary skill in the art.

Figure 1:
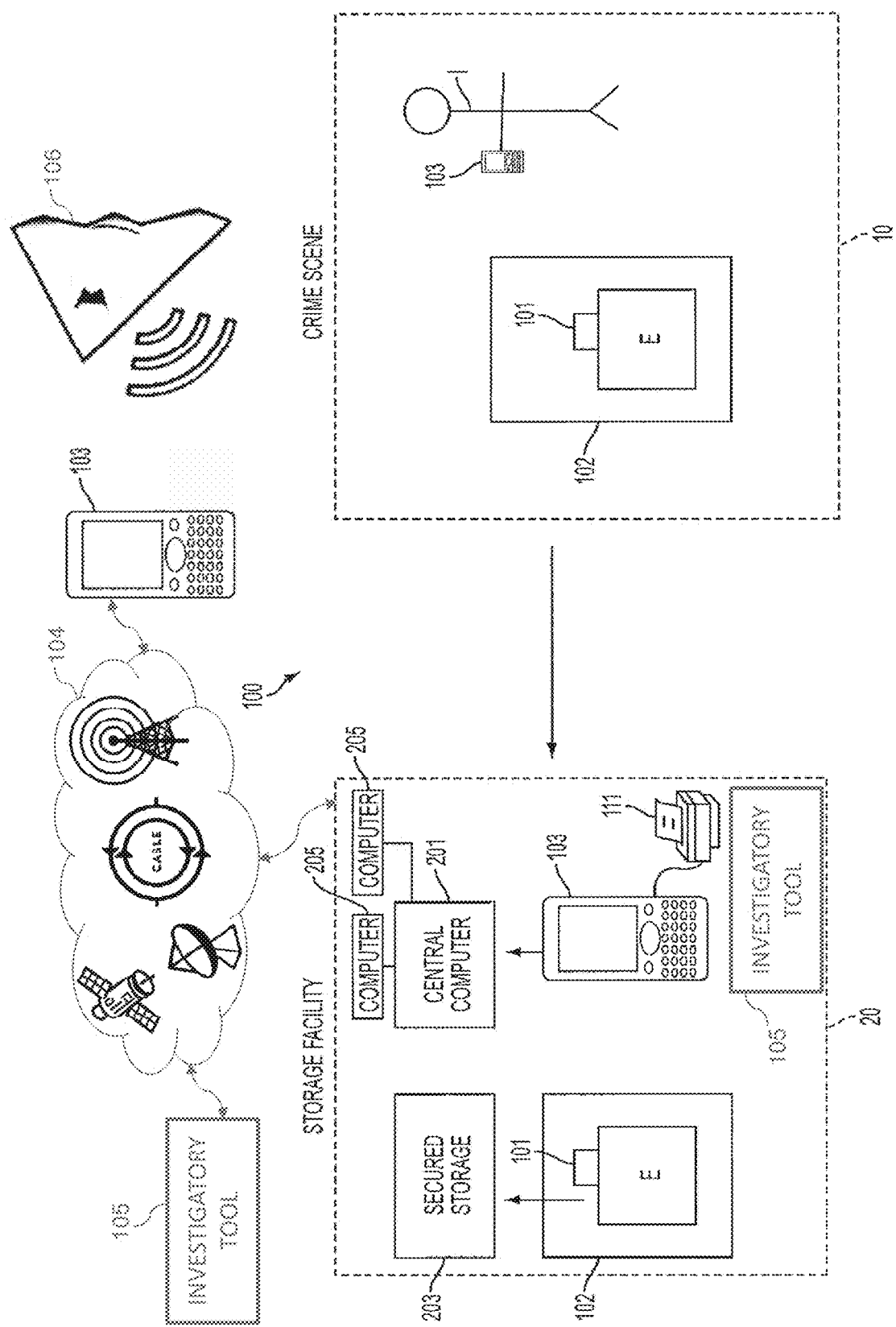
FIG. 1 shows a block diagram of a system for tracking evidence.

FIG. 1 provides a block diagram of the components of an embodiment of an evidence tracking system (100). In FIG. 1 there are provided two different parts of the system. The first is for use at the crime scene (10). At the scene (10) a piece of evidence (E) which will need to be collected, identified, and tracked. The evidence (E) is tagged through the use of a tag (101) which is connected to the evidence (E) directly. The evidence (E) is also tagged by being placed in a bag or other container (102). It will be appreciated that for sexual assault investigations, the container may be a sexual assault kit (SAK) which may include vials, capsules, or other fixed sized vessels for evidentiary samples that may fit back within the SAK container as well as bags, foldable boxes, or other expandable vessels for evidentiary materials that must be stored external to the SAK container. As indicated below with regard to evidence kits in general, the tags for the evidence (E) may be provided as part of the kit or may be individually printed by a printer.

The existence and identification of the tagged evidence (E) is entered into handheld computer (103) by an investigator (I). The investigator (I) will also provide additional information into the computer (103) to identify the evidence as well as information about the evidence (E) such as, but not limited to, identification information, photos, or observations. The investigator (I) may also utilize the handheld computer (103) in the collection of additional evidence such as photographic evidence and interpreted evidence which may be connected or unconnected to physical evidence such as, but not limited to, identification of suspects or victims, other notes, or observations. The handheld computer (103) will generally provide for a linking connection associating the tag (101), the evidence (E), the bag (102) and any other information related to the case and store all this information in an internal memory while the investigator (I) is at the crime scene. The computer (103) will generally be capable of communication and may obtain information wirelessly from a remote location, specifically an evidence locker or other secure evidence storage site (20) and may include peripheral devices such as printer (111).

Once the evidence (E) has all been collected, the computer (103) and evidence (E) will jointly be presented to an evidence storage facility (20). The memory of the computer (103) is generally transferred to a generally secured central computer system (201). The evidence (E) may also be placed into secure storage (203) at a related time. This provides for the first check to make sure that the evidence (E) is correctly identified as the information transferred from the computer (103) will need to match with the evidence (E) actually provided.

Evidence (E) can be checked out from the secure storage (203) by parties which need access to it through the use of an onsite access (205) to the central computer system (201). Checking out the evidence involves obtaining the evidence (E) and having the central system (201) be updated to indicate that the Evidence (E) has been placed in that individual's control. Again, the system (201) will double check to make sure that the correct evidence (E) is checked out. When the evidence (E) is returned, the same checks occur. It is checked that the same individual who checked out the material is returning it and that the evidence (E) matches the records. This process will repeat for every individual who will access the evidence (E). Further, the onsite access (205) may allow for parties to review evidence, collate cases by any number of criteria, and provide for chain of custody information for use at trial to further investigations and provide for simplified evidence (E) handling.

While the above provides for a general indication of the components of the system (100), the system (100) is best understood by discussing the various pieces of the system (100) in conjunction with a hypothetical investigatory activity. For purposes of this disclosure, that activity will be the investigation of an armed crime.

To begin with, it is important to recognize that there are a variety of pieces of information which comprise evidence. As discussed above, evidence can be physical evidence, photographic evidence, and interpretive evidence. One benefit of the depicted embodiment of the system (100) is that it allows for all such evidence (E) to be collected on a single device (103) which can be taken to the crime scene, on later investigations, or otherwise transported with an investigator (I). The device (103) can also provide functionality which further assists in evidence collection. Still further, an investigation is often not the domain of only a single investigator (I). In many investigations, it is necessary to have a variety of persons which may be directly or indirectly working on the same case and it can be desirable to interconnect the information that they gather.

To begin the discussion, we are going to first look at the operation of the handheld computer (103) and how it will work in an embodiment. Generally, the computer (103) will be provided to a police officer or other investigator (I) charged with the collection of evidence (E) at the scene of the crime (10). As the scene (10) will generally not be within the evidence storage facility (20), the scene (10) will be considered a location remote from the base of operations of the investigator (I). Further, the scene (10) presents the first point of evidence (E) collection and therefore, generally, is the point where chain of custody needs to begin.

When evidence (E) is to be collected at the scene, the investigator (I) will initialize his computer (103) to begin the collection and processing of evidence (E). The computer (103) may be any form of portable computing device but will generally be a device which is easily man-portable, useable in the palm of the hand or in a variety of positions, and will be rugged enough to survive the rigors of operating in a variety of environments and weather conditions. The handheld device may comprise, but is not limited to, Motorola MC series devices (such as, but not limited to, the MC55XX, MC75XX, MC90XX, and MC95XX series), Intermec CN series devices, and other devices known now or later discovered which offer generally similar functionality. The device (103) will generally include memory and software designed to allow it to operate as the handheld device (103) of the present system. It may also include communications hardware and software to allow the device (103) to communicate with other devices (103'), computer networks (104), or other investigatory tools (105). In alternative embodiments, other devices may be used as computer (103) including, but not limited to, handheld computers such as a Palm Pilot™ or Handspring™, and other tablet computers such as an iPad™, smartphones such as an iPhone™, Blackberry™, or other portable computers.

Generally the computer (103) will be smaller than a standard laptop computer so as to provide for improved portability and ease of use. Specifically, the computer (103) will be designed to be easily transportable by hand and carried on the person. It is also preferably designed for at least partial one-handed operation. The computer (103) will generally have a variety of functions including having external connection ports for connecting to other devices such as a printer (111) or a larger computer. It may also include a camera, video camera, or other visual recording capability or may include a laser or other device designed to read specific types of machine readable media. It may also include positioning components such as Global Positioning System (GPS) access, internal navigational controls (such as, but not limited to, a gyroscope or compass), or other components for recording the device's position. The device (103) can also provide for indications of how the GPS signal is retrieved and calculated and can also compute the device's (103) relative speed or direction of motion.

The computer (103) will generally include onboard computer readable memory for the storage of input from a variety of sources as well as operational software and may include a user input device such as, but not limited to, a keyboard, stylus, or touch screen to allow for a user to enter information into the device (103). In an embodiment, the device (103) also or alternatively includes speech recognition or speech-to-text conversion which will allow the investigator (I) to enter information into the device (103) by speaking into a microphone or similar device and having it interpret the speech and fill in the entry. The handheld device (103) may also have access to a wireless network such as through a Bluetooth™, Wi-Fi, Cellular, or other standard network protocol. Regardless of the type of computer (103) used, the computer (103) will generally include software, that is computer readable code running on memory therein, or supplied via a network connection, which allows it to operate in accordance with the principles discussed herein.

Figure 2:
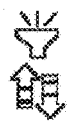
FIG. 2 shows a login screen on a portable computer used in the system.

To explain the operation of the computer (103), it is generally most logical to walk through a series of screens as they would appear to a user. FIG. 2 provides for an embodiment of a login screen for the computer (103). As the chain of custody begins when evidence is initially collected, it is important to keep a record of who the investigator (I) is entering the information and using the computer (103) when it is being used for the initial classification of evidence (E). In this case, the investigator (I) is assigned an identifying code (referred to herein as a DSN) which they will enter into an appropriate entry area (210) or computer (103) to commence operation of the software. The DSN may be secret, but more commonly will be public and may be coupled with a secret password or other piece of secret material information to both keep information on the computer (103) secure, and more definitively identify the investigator (I). While such definitive secure identification is generally preferred in most embodiments, it is not strictly required unless necessary to support legal evidence proceedings. It should be recognized that in alternative embodiments other forms of identification of the investigator (I) including, but not limited to, bioinformatic scanning, passwords, dongles or other hardware-based identification solutions, or other technologies may be used to identify the investigator (I) who is initially gathering the evidence and working with the evidence entries. The investigator (I) may also be identified by a signature capture or similar technology.

Figure 3:
FIG. 3 shows a case setup screen on the portable computer.

Once the investigator (I) is logged in, they will move to the screen of FIG. 3 where they will enter case information. The log-in is generally desirable as it has now connected the investigator (I) associated with that log-in identifier to the actions which are to be performed. Thus, this investigator (I) has initial custody of the evidence (E). Certain fields in the various screens of FIGS. 2-14 may be designated as mandatory to provide that certain information must be entered before the investigator (I) can advance from the screen. The specific mandatory fields will generally depend on embodiment, however, identification of the investigator (I) and case (310) are generally the most likely to be required. The system (100) will also attach the collected evidence (E) to the specific case (310) to which it is thought to be relevant.

Thus, the evidence (E) will initially be collected with two identification items, the investigator (I) collecting it, and the case it is associated with. Generally, case (310) information will be newly entered at the time the new case (310) is opened. However, should the evidence being collected be for a prior case (310) which was already opened, the investigator (I) may open the case (310) on their computer (103) or may access a wireless or other network connection and download relevant case information directly to their computer (103) so as to add to it. The investigator (I) may also enter the information as a new case without recognition at the time it is entered that it is connected to a prior case. Such connection may be made at a later time when more information is known and may be done at the central server computer (301).

As should be apparent from FIG. 3, the case identifying information can include identifying information for the case including the case number (310), the relevant investigatory agency or jurisdictional authority (312), and details of the incident date (314), type (316) and location (318). Once the case information has been entered, evidence is ready to be collected to be attached to the case (310).

In the present embodiment, evidence (E) is all collected in connection with the case (310) and is stored in connection with that identified case (310). In this way it is relatively straightforward to determine what evidence (E) is necessary in the trial or other proceedings associated with the case (310). Further, such case (310) connections are an easily understood way for users to connect the evidence (E) which is collected and associated together. However, in an alternative embodiment, the case (310) connection is unnecessary and the evidence (E) may be connected using another connection method, or no connection at all.

Because there are a number of different types of evidence (E) that may be collected, or even that may exist or be created at this time, the computer (103) provides for a variety of different screens that allow for entry of information to identify and catalog evidence (E). A menu of these may be obtained by activating the menu key (401) and indicating which type of information is desired to be entered.

The first type of evidence (E) we will discuss here is suspect information. This is discussed first merely to provide order to the discussion herein, it should be recognized that, in an embodiment, an investigator (I) can enter the types of evidence discussed herein in any order and need not complete any entry before beginning on another. Suspect information is usually interpreted evidence and will generally comprise information collated by the investigator (I) to identify a potential suspect. In some cases, the information may be relatively specific pointing to a specific known individual. In other cases, only basic, general, identifying information may be known. In still further cases, a suspect may be relatively unknown at the time of initial evidence (E) collection.

If there is a suspect in the incident, information about that suspect may be entered into the system (100) to store that information in conjunction with the case. FIG. 4 provides for an indication of a suspect list screen (410). In this depiction, there are no suspects yet entered so the list area is empty. The investigator (I) would select new (412) in order to begin a new suspect entry. Should there already be suspects listed, the edit (414) and delete (416) functions could also be used.

This form of evidence list (410) where there is a list of previously entered evidence of a particular type available and a place to edit, add to, or delete information will be common throughout the various collection and classification mechanisms of the depicted embodiment. In effect, the computer (103) will provide a list of all types of information that have been previously collected and will allow the investigator (I) to either edit previous information (for example, if new items are learned) to enter new information, or to delete old information. In this way, the handheld device (103) computer (205) or central computer (201) can be used in the same fashion that a traditional investigator (I) may have used a note pad. It should be also be noted in FIG. 4 that the different types of evidence (3102), including the suspects (400), victims (700), physical evidence (800), and notes (1500) are all accessible by tabs so that all evidence (E) in the case (310) is accessible.

For ease of reference, the suspect or other entry of a single piece of evidence (E) is identified herein as an "evidence entry." An evidence entry is generally all interrelated information pertaining to a single "thing" that "thing" being a piece of evidence. It should be recognized that such "thing" may be a physical thing (e.g. a gun) may be a person or other individual (e.g. a dog, or a suspect), may be something transitory (e.g. a blood spatter pattern, a position of a body), or may be an observation or note. Further, individual pieces of evidence may be related (e.g. a gun and casing from the bullets it fired). In order to provide for segregated entry, each piece of evidence may be considered to correspond to an evidence entry, thus each entry is effectively a piece of evidence, regardless of type of relationship to other entries. Each entry would be listed by type in a list such as list (410). Therefore, the evidence entries together catalog all the evidence (E) collected.

Figures 5A, 5B:
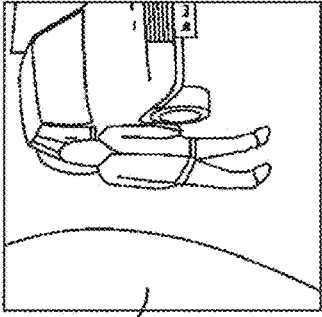
FIGS. 5A & 5B show entry screens for suspect data on the portable computer.

FIGS. 5A and 5B provide for a place to enter information about the suspect adding details to that evidence entry. This can include their names (510) (512) and (514), alias (516), vital statistics (518), address (520), current contact information (522) and notes (524) should additional information be desired and there is no specific entry point for it. The status of the suspect (526) may also be entered. Each entry point may provide for free form fields, or may provide for a selection of prepared choices. For example, the name field will generally allow for a user to enter any word as names are often unique and even similar names may reflect differences in spelling or pronunciation. For a field such as the user's gender, however, there are generally limited options in that a suspect is either male, female or unknown. The different screens of entry points for information are generally accessible by tabs (501) and (503).

It should be recognized that in an embodiment, the computerized evidence management (CEM) system (100) does not require that all information be present in order to record the known information, and may even provide for the ability to enter a detail that indicates a lack of knowledge. For example, while a suspect's gender is limited to male or female, the field may include alternative entries which would allow for an investigator (I) to enter other information about gender. For example, the field may allow a user to indicate that the gender is currently unknown (e.g. that no details of the suspect are known), that the gender is unclear (e.g. that there is an indication of gender, but it is uncertain), or even that the gender is not one of the two standard choices (e.g. that a suspect is a non-human animal).

The ability to enter additional information is an important feature of an embodiment of the system. While the inventive CEM system (100) is designed to enter expected information and to provide for easy organization of expected information, it will generally also be the case that the system is versatile enough to handle the unexpected. In the investigation of crimes, it is often the case that information is limited, contradictory, or even unbelievable. In these situations, it can be important that a user of the system (100) be able to provide for interpretative evidence in a freeform fashion and that they not be constrained by what the system (100) thinks comprises necessary information. For this reason, virtually every input has a free entry area, such as notes (524), where interpretative evidence may be entered by the user without constraint.

In an embodiment, the handheld computer (103) will include the ability to take digital or other pictures as part of its functionality. Therefore, the screen of FIG. 5A also provides for the ability to take (528) and delete (532) pictures that are associated with this particular suspect. In this embodiment, the picture (534) is then directly attached to the suspect information to allow them to be stored together. Generally, the picture (534) will be obtained directly by a camera onboard the handheld computer (103) which may be used to take a picture of a suspect who is at the scene. Alternatively, the picture (534) may added to the file using another method of information capture. For example, if the victim has a picture of the suspect on their digital camera, the file may be directly downloaded from their camera to the handheld computer (103) and then stored as the suspect picture (534).

It should be apparent that the suspect and notes storing component of the system (100) is designed to provide for information directly related to people potentially involved in the incident. This will only rarely be physical evidence (although there may be a connection to physical evidence) but will instead comprise photographic evidence or interpretative evidence that is collected by the user. Thus, the system (100), in this embodiment, serves as both a notepad whereby the investigator (I) can record information that they think may be valuable, and also allows those notes to be used and referenced.

The computer (103) can also provide additional information to the evidence entry. In an embodiment, the computer (103) provides such information from its own access and resources. For example, the computer could provide a system time and date or may attach GPS coordinates indicating where the photo was taken. There may also be provided an indication of the GPS signals accuracy or if it matches with an internal position calculation. The device (103) could also provide a compass signal to indicate the direction the device (103) was facing at the time a photo was taken or could provide more esoteric information, such as if the computer (103) could detect a wireless network at the time or the speed at which text was entered.

Once the information of a suspect has been entered by the investigator (I) to the point where the investigator (I) is satisfied with the completeness of the entry, the suspect information is saved as an evidence entry identified as information on the suspect and the entry is listed in area (410). As should be apparent, depending on the specific information available, the amount of information entered may vary widely in completeness with some entries having virtually complete information while others may comprise information in only a single field. The recordation of the suspect effectively starts the chain of custody of this piece of evidence (if needed) as it is now associated with the case and investigator (I) who entered it.

Like suspects, there are often people who are not suspects but where information recorded is useful. One very clear case is that there may also be victims of the incident and these are discussed in conjunction with FIGS. 6, 7A and 7B. The pages of entry are very similar and provide for a listing of victims associated with the incident (610) which may be manipulated by adding new entries (612), editing existing entries (614) or deleting entries (616), as discussed above. Further, the same information is used as for suspects including victim's names (710) (712) and (714), aliases (716), vital statistics (718), address (720), contact information (722) and freeform notes (724). Again, photos (734) can be taken (728) and connected with the case or may be deleted (732) later, and the information screens are accessible by tabs (701) and (703). Internal device information such as date, time, location, and others may also be added.

In a further embodiment, while the depicted embodiment is limited to storing information on suspects and victims, menu tabs can also be provided for similar information on witnesses, bystanders, or present investigators (I), should such information be considered worth recording at the time. As such entry would be very similar to the entry of information on suspects and victims, it is not separately discussed as the methodology is clear from the above.

As should be apparent, the ability to connect pictures with the case can be very useful. For example, if the victim needs to be found, inclusion of a picture can provide for potentially useful information later. Further, the inclusion of a picture can help insure that victims and suspects which may share names with other victims or suspects are appropriately kept separate or are kept together as appropriate. Further, the appearance of an individual at the time the evidence entry is created can be very useful. For example, should a witness identify that a suspect has a beard, and the suspect, when first located has a beard that they later shave, the fact that they had a beard at the time of the incident has been recorded. Similarly, if a victim had visible bruises, these could be recorded. The handheld computer's (103) ability to take such pictures provides for further benefit as it means that there is less likelihood of a picture being separated or lost from the information about the suspect, victim, eyewitness, or other relevant person prior to entry and provides that the investigator (I) has ready access to a camera. Further, the ability of the device (103) to combine this information with other available information such as, but not limited to, date, time, location, facing, or the like can provide valuable additional description of the picture.

Figures 8, 9:
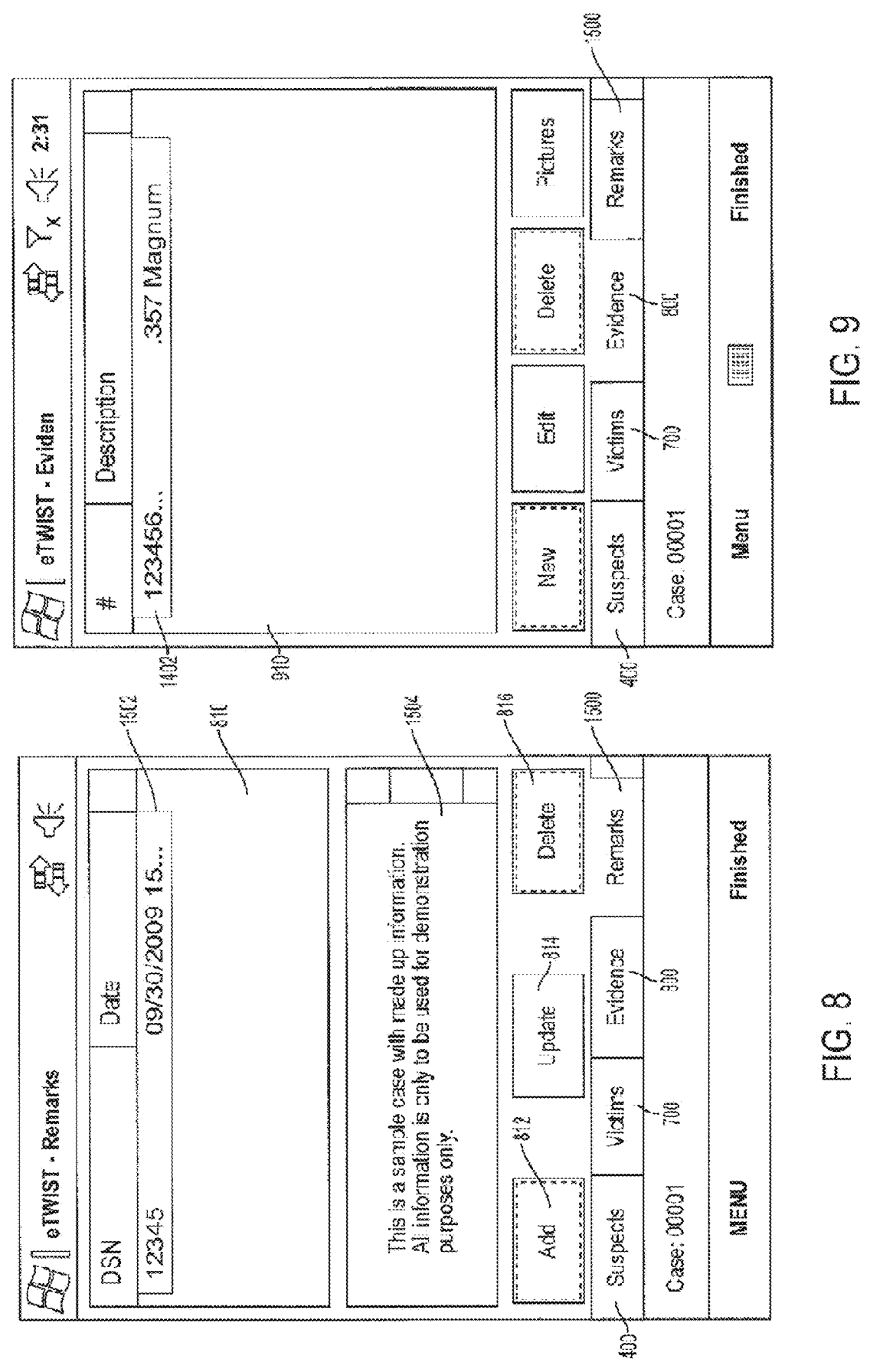

FIG. 8 provides for a general remarks area (1504) whereby any additional information which does not make sense to be included anywhere else can be entered (812), edited (814), or deleted (816). Again, this information is connected with the specific case and is stored as an evidence entry (1502) along with a date/time recordation stamp or other provided information. As discussed above, there is always the possibility of an investigator (I) feeling that information which does not fit into the established material framework of the system (100) needs to be recorded. As one example, if the temperature could have an effect on the way something appeared, that may be a useful piece of interpretive evidence to record in the notes area.

While the collection of information related to individuals involved in the incident is important and provides for useful functionality, in most situations the vast majority of the evidence to be collected will not be related to identification of parties, but will be related to physical evidence left at the scene, or collected during later investigatory activity. Further, in the above described components of the system (100), individuals are usually more transitory. That is, the entry stands alone as evidence (or works in conjunction with a person which cannot be easily confined to an evidence locker). Therefore, the chain of custody of the evidence is often limited to the photographic and other information in the evidence entry itself and chain of custody of the individual may not be as important. When it comes to physical evidence, however, the evidence itself is often stored in addition to the information in the computer system (100). Thus, storage can require connections that are not necessary for information on individuals.

FIGS. 9-14 are directed to screens for the collection of physical evidence. Much of the data gathering of the system (100) is focused on the collection and identification of physical evidence due to the increased chain of custody requirements. In FIG. 9 there is provided, as with the suspects (410) and victims (610), a list (910) of the physical evidence which has been collected. In this case, there is only an entry (1402). Thus, the only physical evidence collected is the firearm believed to have been used in the incident, a 0.357 magnum revolver.

Associated with the evidence entry for the revolver are a variety of informational items directed to that piece of evidence (E) including, but not limited to, descriptions and related identifications. As things are often less "individual" than suspects or other persons involved in the case, it is often necessary to make a piece of evidence "more individual." To use a simple example, if 20 shell casings of identical make and caliber are found at a scene in different locations, it may be necessary to keep track of which were found where as they may have been fired by different guns.

In order to make individual pieces of evidence (E) more unique, each piece of evidence (or a group of pieces of evidence if appropriative) can have a unique identifier associated with it. Some embodiments of such tags (1501) and (1503) are shown in FIGS. 15A and 15B. In a preferred embodiment, this tag (1501) or (1503) is attached directly or indirectly to the evidence so that the evidence item plus tag (1501) or (1503) becomes a more readily identified "individual" item. It is preferred that the tag (1501) or (1503) be attached to the evidence (E) in a generally permanent fashion or in a fashion where the tag's (1501) or (1503) removal would be relatively easily to detect. As the tag (1501) or (1503) and evidence (E) combination is being used to make the evidence (E) more unique and improve the ability to segregate this evidence (E) from similar evidence, it is important to detect should something happen which would compromise that connection. By making the removal of the tag (1501) or (1503) more easily detectable, such removal would need to be explained.

In order to allow for tagging of evidence (E), an investigator (I) will generally be provided with a plurality of tags which can be used on the evidence (E) during the investigation. These may be provided with the handheld computer (103) as part of a kit or may be printed by a printer (111) associated with the handheld computer (103). Embodiments of such tags (1501) and (1503) are shown in FIGS. 15A and 15B. The tags will generally include at least a portion which is self-adhesive and may comprise labels (1501) as provided in FIG. 15A or attachable suspended tags (1503) as provided in FIG. 15B. The attachable suspended tag format (1503) will generally be preferred as it provides for greater ease in attaching the tag (1503) to a variety of different things.

In the embodiments of FIG. 15B the tag (1503) comprises a tag of generally barbell shape having two wide ends (1531) and a narrower connection center (1533). The ends (1531) will generally include a computer readable identifier (1535) and may include a human readable identifier (1537) as well. The tag (1503) may also include other information such as, but not limited to, an identification of the investigatory authority, a manufacturer's marking, or a tamper indicator. The tags (1503) may be paper or may comprise alternative materials such as plastic. In the depicted embodiment, paper tags are used for ease of printing. In order to inhibit damage to tags (1501) or (1503) printer (111) may utilize thermal image transfer or a similar technology that inhibits the ink from being damaged by exposure to light, heat, or moisture. The tags (1503) may also include a plastic cover surface or may be treated so as to protect the printing of the tag (1503) from water or other liquid damage.

Generally the back side (1557) of the wide ends (1531) will be removable so as to provide for an adhesive surface to allow the tag (1503) to be stuck to itself, or to a piece of evidence (E). The center section may also comprise such adhesive and the backing may be designed to be removed as a singular piece or as multiple pieces. The adhesive provided will generally be designed to be considered a generally permanent adhesive so that the adhesive will bond securely to a variety of surfaces. Specifically, in the Embodiment of FIG. 15B, the adhesive will generally have sufficient adhesive strength such that if the two ends (1531) of the tag (1503) are adhered together, the tag (1503) will more easily rip than the adhesive will separate. This provides that once attached to the piece of evidence (E), the tag (1503) is generally only removed by a destructive act to the tag (1503), making such removal detectable.

The alternative embodiment of FIG. 15A provides for a more standard shaped label (1501) which is used as a tag. This label (1501) is a more standard rectangular shape and also includes a computer readable identifier (1515), human readable identifier (1517), and indication of manufacturer (1519) and may be constructed in any of the fashions discussed for the embodiment of FIG. 15B. Again, it may have a removable surface on the back (1527) which can be peeled to expose an adhesive.

The tag (1503) will generally be preferred over the label (1501) as it is generally easier to attach to a variety of different types of evidence (E) without necessarily damaging or hindering access to the underlying evidence (E) and still being readable. The label (1501) will generally work well on flat surfaces which it can be directly contact to (for instance a piece of glass) but will often not work well if it needs to go around a component or may need to be removed to perform testing on the evidence (E). The former is problematic as the curve applied to the label (1501) may make it difficult for a machine to read the machine readable indicia (1515) or to attach the label (1501) to oddly shaped materials or those that resist the attachment of labels (1501) (for example those with a grainy or rough surface). The other problem is that the attachment of the label (1501) could cover a valuable piece of evidence (E) and removal of the label (1501) is designed to be difficult. For example, if the evidence (E) is a sheet of paper, removal of the label (1501) would generally result in damage to the evidence (E), and not just the tag (1501), which may be undesirable in certain circumstances.

Generally, the tag (1501) or (1503) will be attached to the evidence (E) by the initial investigator (I) at the time the evidence (E) is being collected. This will often be done initially upon collection; however, in some circumstances it may be necessary to produce photographs of the evidence (E), such as, but not limited to, showing its positioning, prior to the evidence (E) being handled in any way. In this situation, the evidence (E) may first be photographed (at least partially) prior to the tag (1501) or (1503) being attached.

The attachment of the tag (1501) or (1503) to the piece of evidence (E) creates a piece of tagged evidence. Generally, it will be the case that a single tag (1501) or (1503) is used for each single evidence entry in the computer system (100). Thus, if a single tag (1501) or (1503) is used on many items which are located together (for example a stack of money), the stack is treated as an individual evidence entry. This methodology is by no means required, however.

FIG. 9 provides for the entry of individual pieces of evidence (E) in the same fashion that suspects and victim entries were discussed above. As the general listing of entries is similar, no further discussion is provided herein. In order to provide for improved identification, As shown in FIGS. 15A and 15D, the tag (1501) and (1503) will generally include both a human readable indicia (1517) or (1537) and a machine readable indicia (1515) or (1535) where the human readable indicia (1517) or (1537) corresponds to the machine readable indicia (1515) or (1535) which, in this case is a barcode. As the tag (1501) or (1503) is now associated with the particular piece of evidence (E), these indicia may now be used as an identifying name for the evidence.

Figures 10, 11:
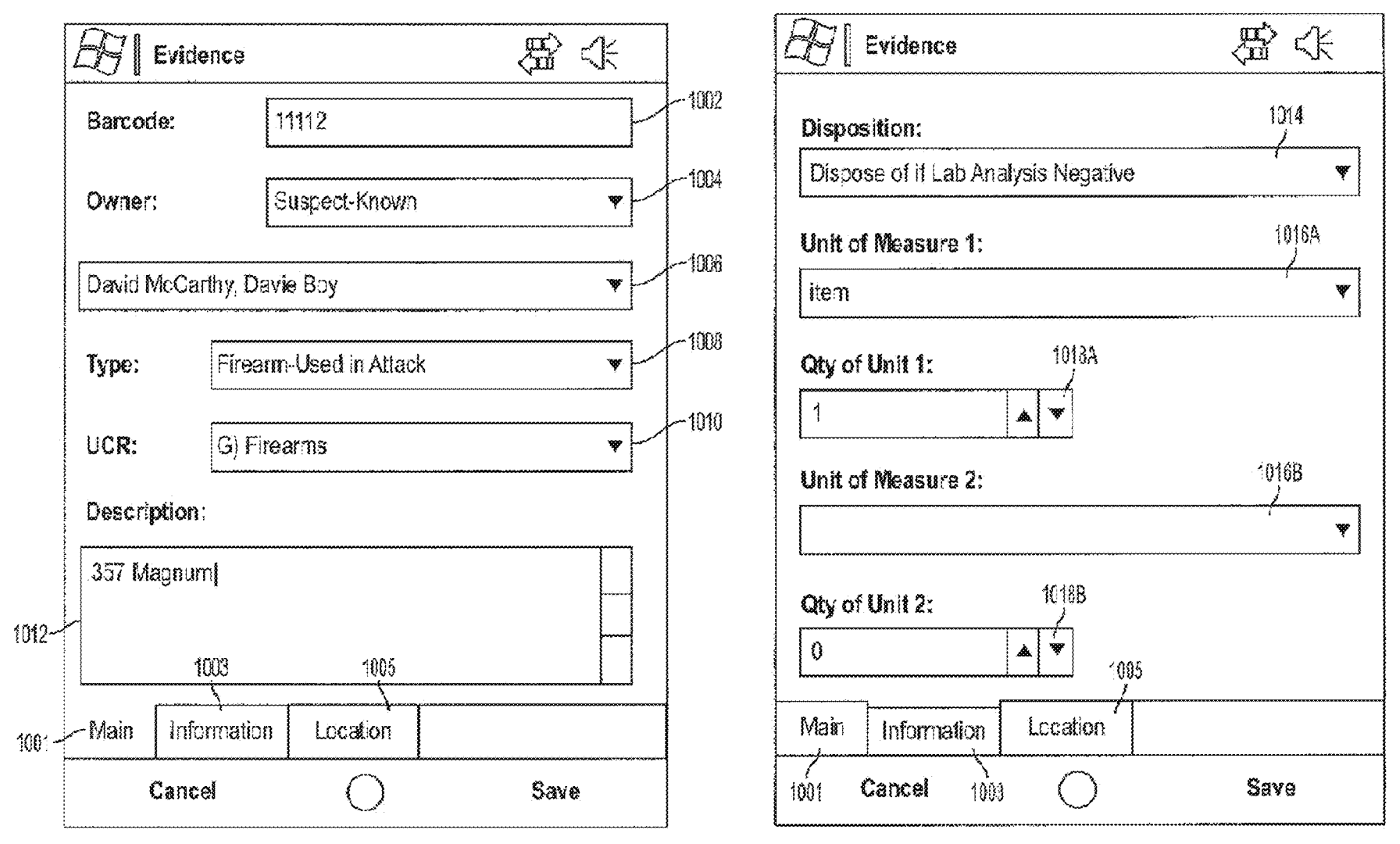

In FIG. 10, the investigator (I) can enter the human readable indicia (1517) or (1537) into the system (100) via box (1002). Alternatively or additionally, the tag (1501) or (1503) can be electronically entered via the machine readable indicia (1515) or (1535) utilizing an onboard function of the computer (103) capable of reading the machine readable indicia (1515) or (1535). This may comprise a laser or otherwise specialized component of the handheld computer (103), may comprise utilizing the onboard camera to take a pictures of the indicia (1515) or (1535) which picture is then interpreted by software on board the handheld computer (103) or another function. As the evidence entry (1402) has now been made, like in the situations above, the user can then enter additional identifying information about the evidence. This can include, among other things, the owner of the evidence (1004) and (1006). In this case the owner is a known suspect as indicated in box (1004), the suspect listed previously in FIGS. 5A and 5B. Therefore, the system allows selection of already entered suspects and is selected via a menu providing the suspect entries already associated with the case.

A variety of other selectable or typeable fields can be included in the identification depending on the needs of the investigator (I). For example, if it is known that the evidence (E) was used in the incident, but it is unknown who the suspect may be, the owner may be listed as a suspect—unknown in box (1004) to point out that the object is likely connected with the suspect, but the suspect is unknown at the time of entry. Similarly the evidence can be connected with other known or unknown parties and affiliations. For example, should a gun be found at the scene of a stabbing, its connection with the case may be completely unknown and may be identified as such. In the event that the evidence (E) is not connected yet with a person having an evidence entry under one of the other sections, the box (1006) may not utilize the search and may allow new typed entries, or may gray out to inhibit entry therein.

The identifying information for the evidence (E) will also generally provide for a type of evidence (1008) along with an indication of its connection with the incident. There may also be certain uniform identifiers (1010) related to categories used by police agencies and certain parties to allow for their own classification of materials. This can be valuable as certain types of evidence (E) may need to be stored in particular facilities, under particular conditions, or may have specific disposal requirements. There is also a place where a description by the recording officer can be entered (1012) to provide for other free form information.

In FIG. 11 there is provided a screen showing other information about the piece of evidence (E). As the physical evidence generally requires different information than a suspect listing, for example, this screen may provide for specialized information about the evidence (E). Specifically, the disposition field (1014) discusses what to do with the piece of evidence once the case is completed or should it turn out that the evidence is unneeded or unrelated to the case. Thus, should a piece of evidence (E) be collected which appears to have no connection to the incident, the item can be disposed of to avoid it taking up space in evidence storage. Similarly, the listing includes a unit of measure (1016).

The unit of measure (1016) can be particularly useful for certain evidence (E) where there may be more than one "item" collected at once and placed in a single evidence entry, for example, currency or illegal drugs. In the currency situation, it may be desirable to calculate the quantity (1018) of currency in total money (e.g. if $57 was found in the victim's wallet or if a stack of bills contained $1000). Alternatively, it may be useful to keep note of the type of bills located (e.g. 100 $1 bills) or may be useful to utilize a more combined approach (e.g. 1 roll of quarters). Similarly with drugs and other bulk items, knowing if a measurement is made in grams, pounds, or other units of measurement can be helpful. These amounts can be valuable as they allow for further identification of the evidence (E) and can allow for the quantity (1018) to be put in using whatever measuring devices may be handy at the time. The quantity (1018) may be entered directly by the investigator (I), or may be calculated and entered directly by a peripheral connected to the handheld computer (103). For example, a digital scale could be connected to the handheld computer (103) to provide for a precise weight at the time of collecting. Even if the scale is not directly attached, the scale readout could also be recorded by utilizing a photograph showing the evidence (E) and scale readout as part of the evidence entry.

Figure 12:

FIG. 12 provides for a place to indicate where the evidence (E) was located. This can provide for address information (1020) and contact information as used for suspects, but also provides an open description box (1024) to allow for the user to enter freeform information. Thus, if the evidence (E) was located on a person, the address information could be entered of where the person was located, and the location on the person of the item could described. Similarly if the device was hidden, the hiding place can be described. It should be noted that the different entry screens of 10, 11 and 12 are accessible by tabs (1001), (1003), and (1005).

Figure 14:
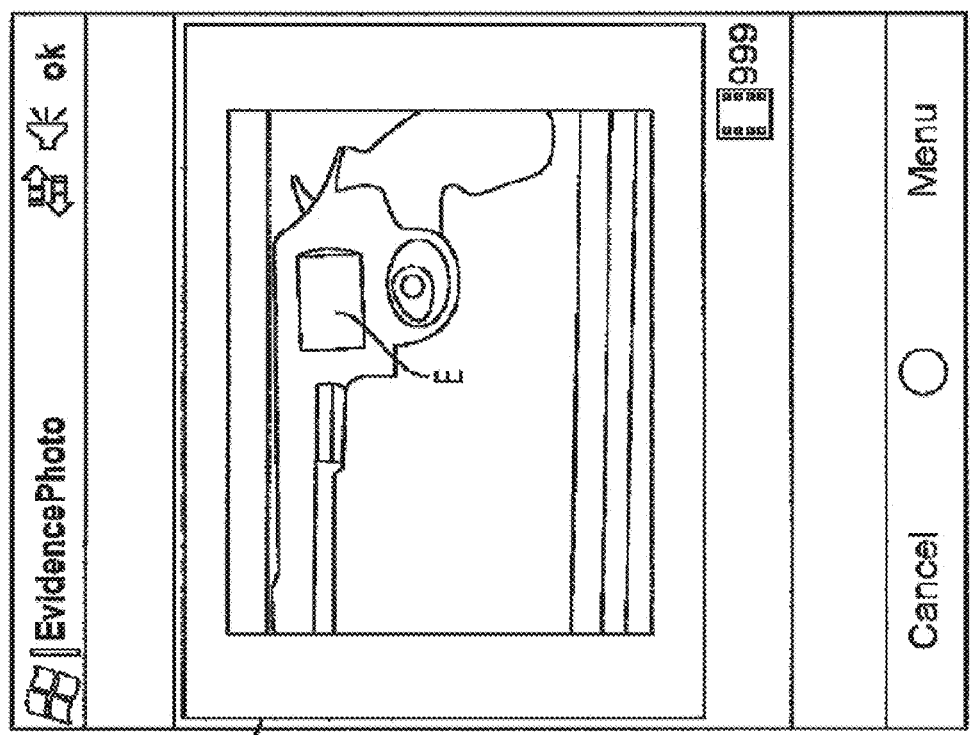
FIG. 14 shows a camera display screen on the portable computer.
Figure 13:
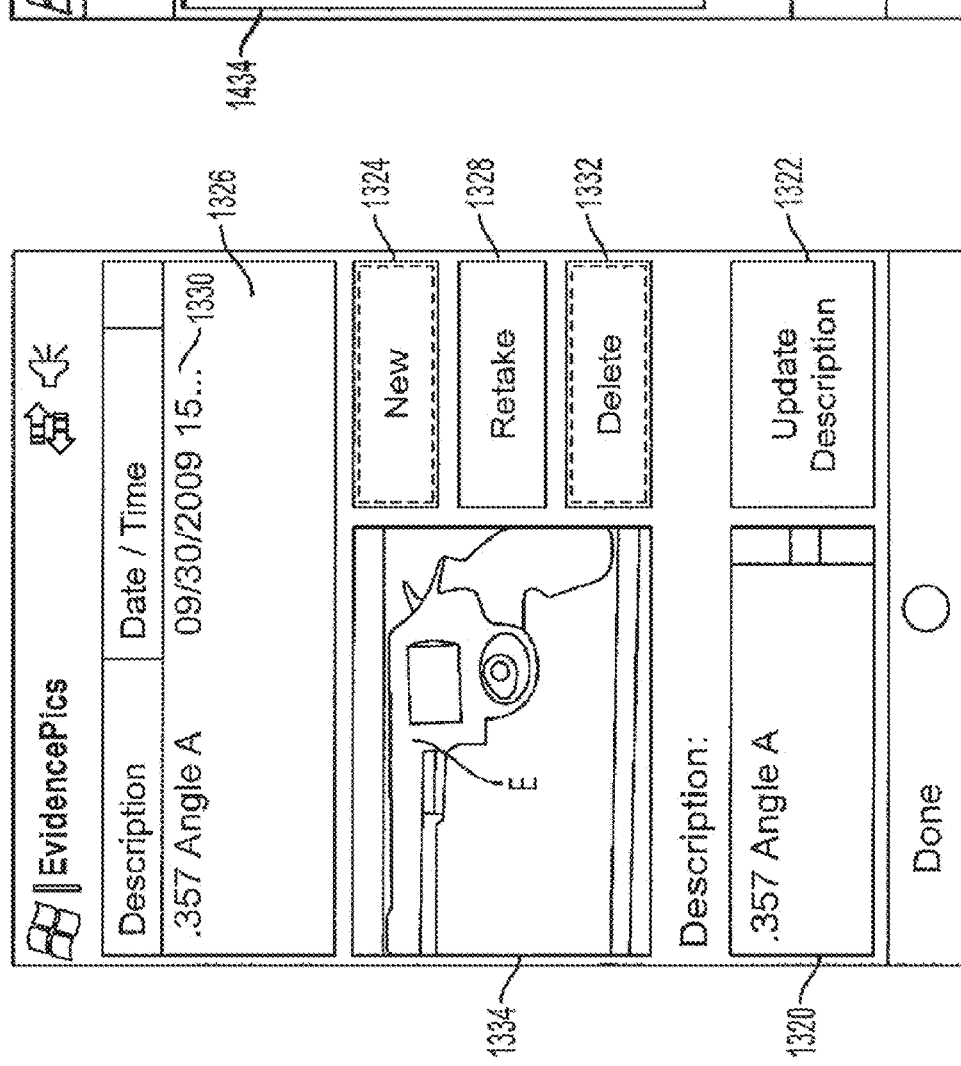
FIG. 13 shows a photo entry screen for evidence on the portable computer.

FIGS. 13 and 14 are directed to the storage of photographs in conjunction with the piece of evidence (E). As indicated above, the recordation of photographic evidence of the evidence at the time the evidence is collected can allow for additional information to be maintained. Further, some evidence (E) cannot be removed and stored for trial. For example, it is generally impossible to record the specific location where evidence (E) was found as the location is not transportable and a description may be somewhat subjective. In such situation, photographic evidence in conjunction with physical evidence may be useful. As many of the handheld computers (103) suitable for use in the system (100) will include internal digital cameras, the system (100) allows for the onboard camera to be used in conjunction with recordation of such photographic evidence. As discussed previously, this can also be combined with system information to provide further explanation of the photos such as, but not limited to, date, time, location, or device (103) facing.

Further, placement of the evidence (E) with other supporting information, such as a photograph of where it was located or with items such as a ruler or other common identifier can also be helpful in understanding the evidence (E). For example, should evidence (E) be located in a particular room or be at a particular position on the floor, a photograph showing the position may prove useful later. Further, making photographs of the evidence (E) contemporaneously with its collection can provide further indications that the evidence (E) indicated is uniquely identified. A photo at the time can also show specific characteristics of the evidence (E) such as, but not limited to a distinctive scratch on a grip or the position in which the tag (1501) or (1503) is placed.

FIG. 13 provides for the picture to be connected with the specific evidence (E) contemporaneously with the evidence's (E) collection in a similar fashion to the use of photographs of suspects or victims discussed previously. As can be seen, in this screen the picture (1334) is shown along with a description (1320) which can be entered about where the picture is taken, angles, dates, backgrounds or any other useful information. The description (1320) will also generally be used to identify the photo in photo list (1326). The system also provides system entered information such as, but not limited to, the date, time, location and direction the picture was taken to also be provided in the entry (1330).

As should be apparent from FIG. 13, the evidence (E) may have multiple photos connected to it. Because of this, the photo list (1326) is used to provide for a larger collection. Further, the screen of FIG. 13 provides for more manipulation tools to show increased functionality such as allowing a user to enter multiple new photos (1324), reshoot or edit existing photos (1328), or delete photos (1332). The description can also be edited (1322). FIG. 14 simply shows an internal camera view (1434) of the handheld computer (103) as would be used when taking the picture.

Once the information on the physical evidence has been entered to the satisfaction of the investigator (I) using the screens of FIGS. 9-14, the evidence entry (1402) is completed for the physical evidence. As should be apparent, the electronic file is already linked to the physical evidence (E) by means of the tag indicia (1537) or (1517) shown in box (1002). However, it will generally be desirable to provide for further connection and to improve ease of storage of the evidence (E). Often, the evidence (E) needs to be relatively isolated from the outside environment. Specifically, the evidence (E) will need to be examined for fingerprints or particles of substance which may be on it and it is necessary to make sure that alternative elements are not introduced by transportation or storage. In these cases, the evidence (E) is generally stored in evidence bags which serve to provide some isolation.

Evidence bags are generally used to prepare the evidence (E) for transport to a particular storage facility, for storage, and for later processing and evaluation. It is rarely the case that evidence (E) collected at the scene needs to have nothing further done with it. Instead, evidence (E) is usually transported to a secure storage facility where it can be stored and available for analytics to be performed thereon, and can be stored long term in preparation for trial. This will often be carried out by placing one or more pieces of evidence (E) from the case in an evidence bag (1702) for storage. While evidence bags are generally of a common design, each evidence bag is generally individually labeled in a fashion which connects the evidence (E) in the bag to the bag (and the bag in turn is then connected to the chain of custody). The evidence bag (1702) is generally labeled so as to indicate what evidence (E) is stored in the bag and what case the evidence (E) is connected with.

Figure 17:
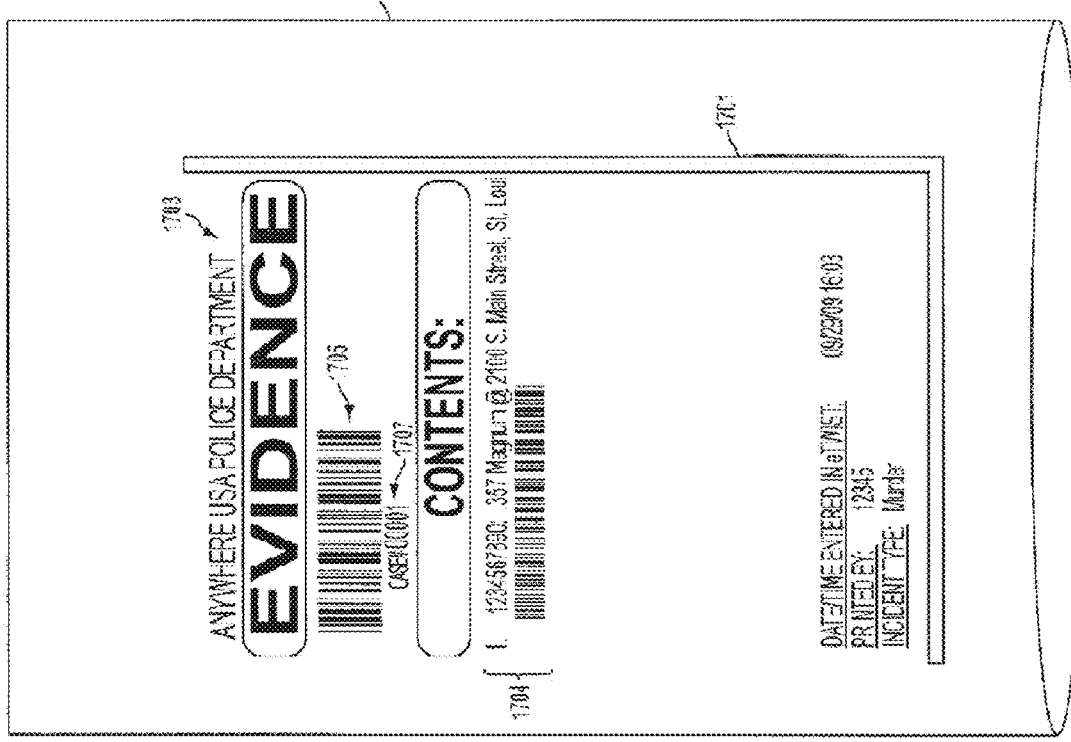
FIG. 17 shows an evidence bag and printed label.

In an embodiment of the present device, once sufficient evidence has been collected to be bagged, the investigator (I) will generally prepare a custom bag label as shown in FIG. 17 by having the handheld computer (103) utilize a printer (111) to print the label (1701). Where the printing of a bag label (1701) occurs depends on embodiment but will often occur either at the scene, with the Investigator having been provided with a "table top" or "desk top" type, or other type, of printer, or may occur at the storage facility (20) prior to the evidence (E) being checked into secured storage (203). Generally, having the bag labels (1701) printed at the storage facility (20) is preferred as it means the Investigator (I) does not need to carry a printer which may take up additional space. However, certain investigatory authorities utilize crime scene vans or trucks which allow for increased processing of evidence at the scene. In such a situation, such a vehicle may carry the printer (111) and provide access at the scene.

In addition to the bag label (1701), in an embodiment the handheld computer (103) may also generate other paperwork associated with the evidence. This can include, but is not limited to, evidentiary forms, deposit forms, and request forms. In an embodiment, the handheld computer (103) can actually use the evidence (E) already stored on its system to issue a citation, warrant, court document, or other document based on the evidence (E). For example, if a certain crime was dependent on having a certain amount of an illicit substance on one's person (e.g. more than 1 gram), if the system (100) had records of more than 1 gram of the substance as having been collected, a citation for that crime could be issued directly from the printer (111). This can eliminate the need to connect the evidence to the citation as the citation can be directly connected to the relevant evidence (E) via the system (100) at the time the citation is issued and the evidence collected. This can be particularly useful where the criminal penalty involves paying a fine and confiscation of the evidence as it allows the handheld device to partially automate and integrate the actions of collecting the evidence, issuing the citation, and storing the information for trial (if needed).

Figure 16B:
FIG. 16B shows a screen with a selection of evidence to be placed in a bag.
Figure 16A:
FIG. 16A shows a screen with a selection of printing labels for evidence bags.
Figure 16C:
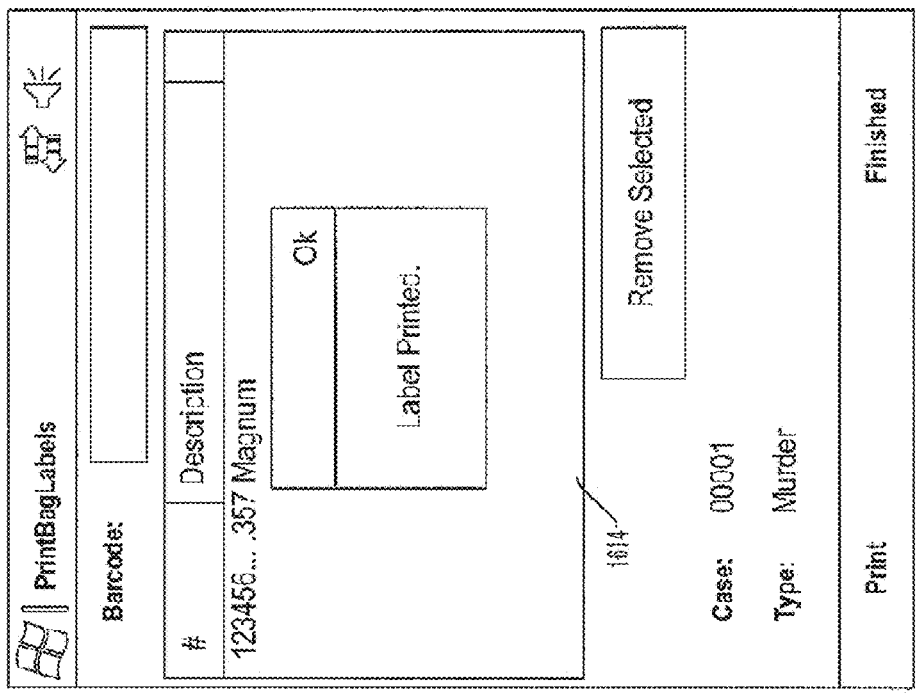
FIG. 16C shows a screen with an evidence label having been printed.

Regardless of where the bag labels (1701) are printed, they are generally printed prior to the evidence (E) being sent into secured storage (203) and will often be printed by action of the handheld computer (103) instead of central computer (201) or other remote computers (205) so that the bag's (1702) are labeled prior to the evidence entries being uploaded from the handheld computer (103) to the central computer (201). FIGS. 16A, 16B, and 16C provide for screens to load the evidence list (910) from the current case and then print an evidence bag label (1701), such as that shown on FIG. 17 as the evidence (E) is gathered at the scene. FIG. 16A allows for selection of the current case (1602) from a list of cases (1610), FIG. 16B provides a list of the present evidence in this case (1612) and FIG. 16C provides for loading and printing (1614). It should be noted that any paperwork necessary as an evidence report could also be printed using the same or similar system.

As shown in FIG. 17, the evidence bag label (1701) will generally indicate the relevant investigatory authority (1703) that has the evidence (E) and will include a machine readable identifier of the bag (1705) which will be associated with the specific case (1707). The label (1701) then also includes an indicator (1704) of the evidence (E) within the bag (1702). This can include a description as well as reprints of the machine readable (1515) or (1535) and/or human readable (1517) or (1537) identifier corresponding to the evidence tag (1501) or (1503) on the evidence (E).

The inclusion of the tag (1501) or (1503) allows for evidence, when checked out, to be reconnected to the bag (1702) and for the bag (1702) to itself be connected to the case (310) in the same way the evidence (E) it contains is connected. For example, when the evidence (E) is placed in the bag (1702), the tag (1501) or (1503) on the evidence (E) and the tag (1701) on the bag (1702) may both be read by the device (103). If they match, the machine OKs putting the evidence (E) in the bag (1702). If they do not, the device (103) indicates that the tags (1501) or (1503) do not match and that the wrong piece of evidence (E) may be being placed in the bag (1702). Similarly when the evidence (E) is removed from the bag (1702), the party removing it can scan both the tag (1501) or (1503) and the bag label (1701) to indicate that the evidence (E) in the bag (1702) is still the evidence (E) indicated on the bag (1702). In this way, should a party be working with similar pieces of evidence (E) and inadvertently get the two items crossed, the problem will be quickly corrected and the evidence chain will remain solid. Essentially, the bag (1702) and evidence (E) tag (1501) or (1503) co-identification provides for one further assurance that the evidence's (E) custody has been maintained. In the depicted embodiment, the machine indicator (1515) or (1535) is not used in favor of the human readable indicator (1517) or (1537).

Once evidence (E) has been bagged, it is essentially ready for deposit with an evidence locker and will be prepared for transport. Generally, the evidence bags (1702), along with the investigator (I) and the handheld computer (103) will be transported to a central storage facility (20). The central storage facility (20) will generally comprise a hardware facility for the storage of the physical evidence (e.g. an evidence locker) (203) along with a central computer system (201) designed to inventory the contents of the hardware facility (203). Upon arriving at the facility (20), the evidence (E) will be presented to the hardware facility (203) for storage and the handheld's (103) memory, including all the evidence entries, may be transferred to a central computer system (205). Such central storage (20) is generally used both to store the physical evidence (E) and to store the electronic evidence entries to provide for increased security and safety of data and evidence while also allowing for others to access the data.

The data may be uploaded to the central computer (201) from the handheld computer (103) by any means known to one of ordinary skill. In an embodiment, the information will be uploaded wirelessly or via another remote network either directly from the handheld computer (103) or via a car mounted computer or laptop computer that the handheld computer (103) is connected to. In another embodiment, the handheld computer (103) may be taken to the physical facility (20) and then plugged into or otherwise connected to the central computer (205) and the data is uploaded as the evidence (E) is placed into storage.

Generally, the information on the handheld computer (103) will be uploaded to the central computer (201) relatively simultaneously with the physical evidence (E) being presented for storage in the locker (203). This will therefore allow for the chain of custody to be securely passed to the next person. As the evidence (E) is all securely in bags (1702) and the correct items being in the correct bags was verified when the items were placed in them, the bags (1702) are generally checked into the facility (203) along with the evidence entries from the handheld computer (103) being provided to the central computer (205). In an embodiment, when the computer records of the evidence entries are uploaded, the bags (1702) are scanned and the computer determines that all bags (1702) listed are present. Assuming this is correct, the custody of the evidence (E) is transferred to the custodian of the evidence locker (203) who will store the evidence (E) until it is needed.

Once the evidence (E) has been placed in centralized storage (203), the handheld computer (103) can either have its memory deleted, freeing up space for the next investigation, or may maintain a duplicate record of the evidence entries for continuing investigation. Generally, the handheld computer (103) will retain a copy of the record (to allow for updating) until the record is purposefully deleted. Regardless of what happens, at this time the handheld computer (103) may no longer have a master record of the evidence entries. That will often be maintained at the central computer system (201). In an embodiment, the system (100) will utilize a hierarchical arrangement of information where the system on the central computer (201) is the highest in the hierarchy with other copies of the entries below it, however, the master record may be the record with the most recent or most current set of information or evidentiary findings, as defined by the most current time and date when any entry was engaged. In this way, records are updated to include the newest information regardless of where the information is entered.

Once the evidence (E) is in storage and the information is on the central computer (201), additional functionality may be provided. Specifically, the data is no longer unique to the original handheld computer (103) on which it was entered but is now placed centrally and can be accessed via any device (205) capable of accessing information on the network, including the central computer (201). It should be recognized that computer (205) will generally provide similar functionality to the handheld computer (103), but may provide consolidated or more detailed information in each screen due to a larger screen size. However, the general storage and access functionality will be similar to that shown in FIGS. 2-14. In one mode of operation, this will allow an investigator (I) in the field to add information to a specific open case they are working on by accessing the information. It may also allow for a new party to take custody of the evidence and attach further information to the evidence entry. To load existing case information the investigator (I) may utilize a list of cases such as the list (1803) in FIG. 18. Search capability can also be provided.

For example, when a gun's serial number is matched to an owner who is a suspect, the person who performs the match can provide the additional piece of information to the evidence entry for the gun and/or suspect. Similarly, if the investigator (I) was to locate and arrest a suspect in the case and the suspect had a firearm on them of a type which was used in the crime, the arresting officer may access the evidence entries of the case (310) from their handheld computer (103) and add the additional evidence entry for the gun to the record of this case (310). They may also add a picture of the suspect, for example, if one had not previously been part of the record. They may also do this directly from the evidence room (203) at the time the suspect is brought in.

This updating may occur in a still further embodiment by accessing the master file directly via a network connection of the handheld computer (103) or depending on functionality, the computer (103) or (205) may not access the master copy directly, but the computer (103) or (205) may be able to access the case (310) via a reference number or other identifier so that the new evidence (E) can be connected to the case (310) when the handheld (103) is allowed to update by being linked at a later time.

This last embodiment can be particularly useful in a situation where there is concern of the handheld computer (103) being used to obtain unauthorized access to certain information and thus the flow of data is designed to be more one directional. Similarly, in an embodiment, the device (103) can have access to software which can provide a remote kill, for example, where its memory can be deleted or its functionality can be destroyed by a remote action should the device (103) be lost or stolen. An investigator (I) who knows that there is an open case (310) can obtain the reference of that case (310) from the handheld computer (103), but cannot access the details of the evidence already collected. Instead, they simply enter their new details, and that information is allowed to flow to the central server (205) where it is connected with the already open case (310).

To access and add to information on a case (310), the investigator (I) may have access to all cases on the central computer (201) via their handheld computer (103), or may have access to only those cases they have previously worked on or are specifically provided access to. The latter will generally be preferred as it helps to make sure that each investigator (I) is not overwhelmed with a long list of open cases when they are trying to locate the one they are investigating. However, it does not provide the ability for an investigator (I) to connect evidence to a case other than those they are working on.

In addition to providing all the above functionality on the handheld computer (103), the information may also be provided via the central computer (201) and via other computers (205) connected on a network to the server (201). These would generally be larger, more powerful machines, than the handheld computer (103) and could allow for the capturing of alternative data and for more powerful computational actions. In an embodiment, such systems (205) could be provided at the evidence locker, but could also be provided at remote locations, such as forensics laboratory or as part of a mobile command center.

Figures 18, 19:
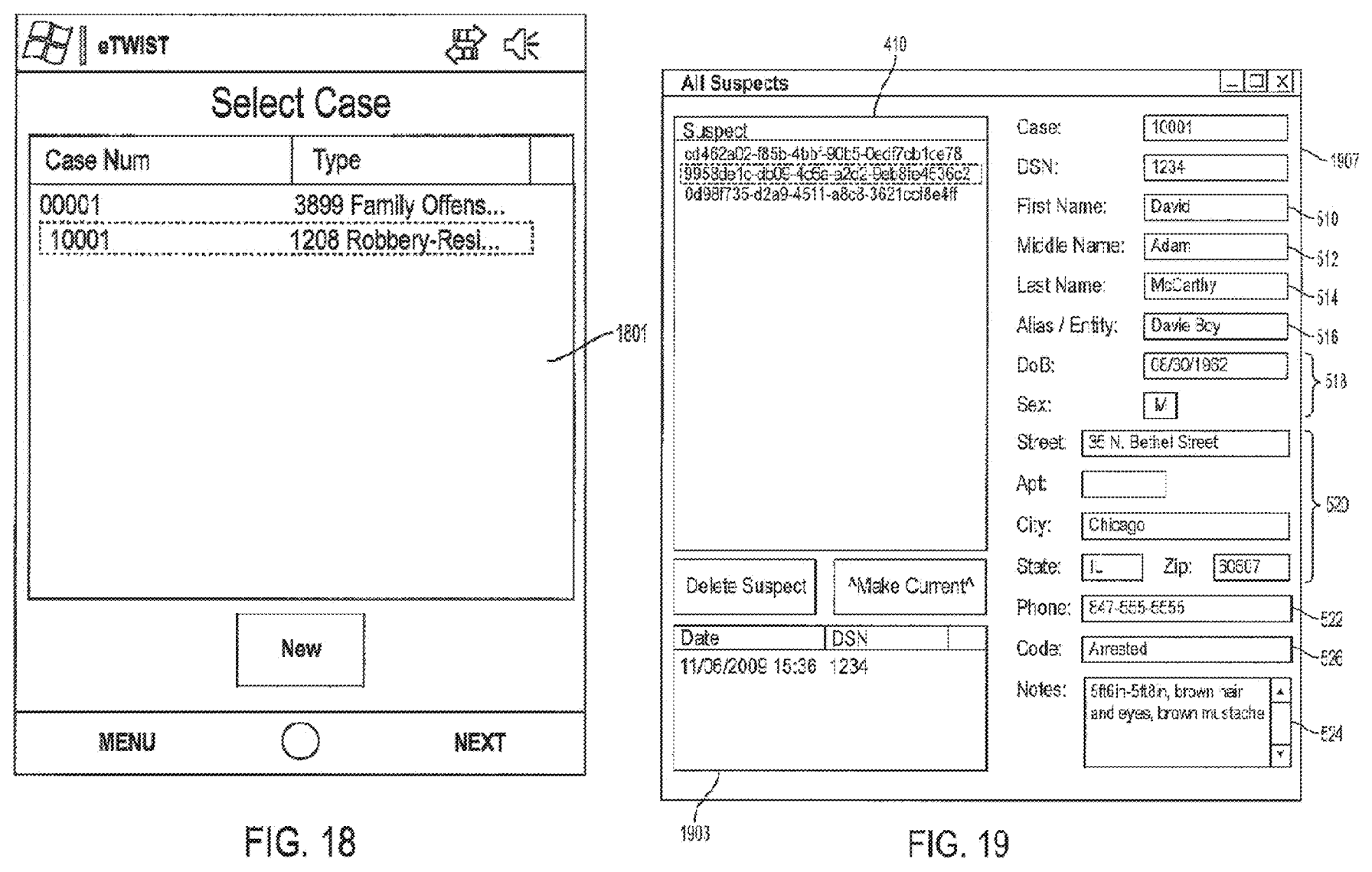

In effect, once entries have been uploaded from the initial gathering activity to the central computer (201), the accessibility of the evidence entries will generally increase as the information is moved from a single handheld computer (103) under the control of a single investigator (I), to a network accessible by many. This upload corresponds with the physical evidence (E) being made similarly accessible with the evidence (E) going from being at the remote crime scene, to being stored in a centrally accessible evidence locker (20) with such central storage, an interested investigator may be able to review the evidence entries and provide updates or connect them with cases. FIG. 19 shows a screen (1404) which provides the suspect list (410) in a case. In FIG. 19, the information generally available to the investigator is the same as that of FIGS. 4-5B, but is provided in a larger more complex form, as computer (205) may have a larger display, more powerful processor and increased or simplified data entry tools. The screen (1901) also indicates the investigator (I) (1903) who entered the information.

Generally, once the evidence (E) has been placed in the evidence locker (203), the handheld computer (103) on which it was originally entered will not be used in conjunction with it anymore. Instead, a user who is accessing the evidence (E) would use one of the remote terminals (205) to scan the evidence (E) in or out. Further, that user may enter additional information for the case (310). For example, the user may perform a ballistics analysis of a firearm. The results of that analysis may be added to the case file for that firearm as additional evidence. This will work whether the additional information is physical or is electronic.

While computer (205) may be used instead of computer (103), the functionality of the device (103) in connecting the chain of custody is still maintained. Specifically, when a user wishes to obtain or check out a piece of evidence (E), they will essentially go through the same process investigator (I) used to initially set up the evidence (E). When they go to obtain the evidence, they will obtain the bag (1702) with the evidence (E) they want by looking it up on the central computer system (201). They will then obtain the bag (1702) which will be checked out to them. FIG. 20 provides for an embodiment of a screen used on a remote computer (205) or central computer (201) showing a transfer to a new individual. The listing (2003) shows the current chain of custody with the evidence (E) having been passed from the investigator (I) to the evidence room and having been checked out from the evidence room to the courthouse. Listing (2005) provides for the evidence associated with the selected case and checkout section (2001) provides for the checkout details to be entered. In the depicted embodiment, the checkout section allows for a partial checkout, as indicated, where a unit (2013) is less than the entire available. To check out the evidence (E) a user would enter the checkout "From" and "To" fields (2011) and then indicate the transfer is to occur using button (2009). As can be seen in FIG. 20, an open entry is already prepared for the forthcoming transfer showing who (2015) performed the transfer.

When evidence (E) is taken to the lab or wherever they are to work on the evidence (E), the user may verify the contents of the bag (1702), match the label (1701) and will perform whatever tests are appropriate. The test results can then be entered into the same system (205), or can be connected to the piece of evidence (E) utilizing the tag number (1515) or (1535) or other interconnection if legacy system interoperability is necessary. The evidence (E) will then be checked back in again verifying that the bag (1702) includes the items identified on its label (1701) and that the bag label (1701) matches the bag (1702) originally checked out.

This process can repeat however many times is necessary to test the contents of the bag (1702). As should be apparent the chain of custody can be made more robust by the various computer automated checks performed during the process. Specifically, as the tag (1701) and bag (1702) all include computer readable indicia, the indicia can be matched by machine eliminating the possibility of human error in writing down the identifiers. Further, as the evidence (E) is identified by tag (1501) or (1503) and the tag (1501) or (1503) is connected to both the bag (1702) and the specific case, it becomes increasingly difficult for a mistake to be made which associates the item with an incorrect case.

It should be recognized that one of the key purposes of the chain of custody is to limit the possibility of evidence being tampered with and, if facts arise indicating that tampering may have occurred, to try and narrow down who may have committed it and what effect it may have had. Effectively, by knowing who has the evidence (E) in a checkout and who performed (2015) the checkout, you know who has the opportunity to tamper with or modify the evidence (E). Thus, should $100 be placed into evidence, and 6 months later it be discovered there is only $50 present, the people who had access to the bag (1702) and could have taken the other $50 is generally known. Further, as the evidence (E) is generally checked every time, should the error be detected, generally working backwards provides the most likely culprits in the modification.

While it is impossible to prevent individuals who are working with the evidence (E) from trying to defeat the system (100), or from tampering with the evidence (E), systems (100) generally reduce the ability to do so. In prior systems where identification was more manually intensive and relied upon physical signatures and the like, it was easier for an individual to forge credentials or provide false information. Further, as such chain was more prone to mistakes, the robustness of the system could fall into question even though the chain of custody was secure. For example, a reversal of two digits in writing down an evidence bag number may not be noticed until much later. When noticed, this could call into question if the right items was reviewed even though the nature of the mistake indicates that it is unlikely.

Further, once the evidence (E) was in the hands of a potential culprit in tampering, it could be a relatively easy matter for them to tamper with the evidence (E) without detection. Effectively, in a traditional system a piece of evidence (E) may be limited by description. Thus, if the description simply stated that the object was a stack of $100 bills totaling $1000 tied with a string, somebody may be able to come in and substitute some or all of the bills with other bills, modify the string holding them, or otherwise tamper with the specific items with a relatively low chance of detection.

The present system provides for improved chain of custody as it provides for an increased number of hard to forge elements all of which must be foiled to tamper with the evidence (E). For example, in the above situation, the presence of photographic evidence associated with the physical evidence can reveal specifics not reported, e.g. the serial number of the top bill, the color of the string, and the type of knot used in the tie. Still further, the connection with the tag (1501) or (1503), which is designed to be hard to remove and to indicate that it has been removed can further make such tampering difficult as the tag (1501) or (1503) would have to be duplicated and placed in the same position (as again indicated by photographs).

In addition to providing for a more robust system by simply providing more information connected with the evidence (E) to help show its uniqueness, it is also possible in the system to provide for hidden information which can be used to further insure that tampering is detected and thwarted. In a simple example, a person checking out the evidence (E) may not have access to the original evidence entry on the computer system (205) made by the investigator (I). Because of this, they may not know what photographs were taken or what additional information may be known about the evidence (E). They are simply presented with a raw specimen. This can make it more difficult for them to get all details correct if they are attempting to tamper with the evidence (E).

In order to still further improve upon the chain of custody, in an embodiment the present system provides for a background recording which is used to show all changes that have been made to the electronic records, the time they were made, and who made them as well as any other desirable system function such as the terminal (205) used or the location of the computer (103). In addition to being able to provide a report showing these changes over time, the system can draw attention that a change has made to a data item such as by highlighting the data field for the changed data item with a different color than original data entries. For example, highlighting a data field with a yellow border or yellow fill may indicate that the data item has been changed from the original data entry. As should be apparent from the above, one of the strengths of the system is that it allows for corrections and modifications on various pieces of evidence (E) over time. Thus, reports and analysis results can be done and connected with the evidence (E), further if additional information is known (e.g. another suspect is added) the information can be updated to allow it to remain current and useful for investigators.

The ability to modify, however, does introduce the ability to tamper. For example, a user can originally state that a package of money had $100 and then alter it later to say $50. If no other person had yet checked the number of bills present, it is impossible to know for certain which amount was actually found. The system deals with this by recording changes made, by whom (that is via who's account), and when the change was made. Thus, should an individual check out a particular evidence bag (1702) and then return the bag (1702) with an indication that a piece of evidence was destroyed by testing and no longer in the bag (1702), the time and date of that occurrence is recorded. Thus, should such change be added at a particular time, and that time correspond with the time that the results of such a destructive test be added to the evidence, the modification is probably legitimate. If such change occurs without support supporting the reason why, then the change may be suspect.

Similarly, should an individual decide to alter an amount of money in the bag from $100 to $50 the time and date of that modification is also recorded. While the above may be carried out for legitimate reasons, the idea of recording the occurrence of change provides that the changes will need to be explained and should make it more difficult for tampering to occur.

For example, if a user originally enters in the field that there is $1000, but when the evidence is checked in the next review shows that there is only $100, the reason may be as simple as typographical error. However, the issue may also be that someone has taken the other $900 and a flag may be indicated for review. Obviously, the presence of other identifying information (e.g. the photographs taken of the evidence) can further verify one story or the other.

Obviously, no system can completely prevent the misbehavior of the users tasked with using it. Should a user wish to steal from a stack of bills that is to be collected, they could always do so prior to the bills being entered into the system (100) at all. However, present systems also cannot deal with these problems and no technical solution can, as of yet, force individuals to behave in a certain fashion. One advantage of the present system, however, is that once the evidence (E) is in the system (100), the system (100) generally provides for a reduced possibility of tampering even by those purposefully trying to do so. Thus, from a legal admissibility point of view, the system (100) generally provides for a more robust chain of custody and provides for easier introduction of evidence (E) at trial, generally with fewer challenges.

At the same time, the system (100), by providing for a central repository of both physical evidence, and associated notes, observations, and other interpreted and photographic evidence, allows for more complete records to be maintained and searched. E.g. should a firearm be brought in, it can be possible to search all unconnected ballistics records to determine if the firearm was used in the commission of an, as yet, unconnected crime. Further, upon such connection being made, the central computer system (201) can indicate the connection and allow for evidence (E) to be listed in appropriate cases.

Still further, the connection of the various parts of the evidence entry at the time of the evidence entering chain of custody provides for an increased number of connections to help verify that the evidence (E), even in changing hands multiple times, is still the same item that was picked up initially and provides additional information which may not be available to connect to a case in present systems. Thus, the chain of custody not only gains legal strength but practically is generally better connected and serves as a more useful investigatory tool.

While the above has primarily focused on the system (100) as a system for the gathering and storing of evidence (E) to improve chain of custody from the crime scene (10) to the evidence storage facility (20), it should be recognized that the system (100) can also provide for powerful backend functionality which can assist in both the organization and operation of the evidence storage facility (20) as well as assisting with the investigatory work of the Investigator (I).

Computers such as computer (205) will generally be available at the investigatory facility (both inside and outside the evidence storage facility (201)) and may be placed on individual investigator's (I) desks or in other easily accessible places. Using these devices, the system (100) can be utilized as a method for searching, sorting, collating, or otherwise parsing evidence (E) in a manner that is useful for an investigator (I). It can also provide for logistical benefits for those that operate and maintain secure storage (203).

In this disclosure, the components of the evidence storage facility (20) and other facilities where computers (205) and (201) are located may be referred to generally as the back end facilities. In these facilities, the system (100) is no longer directly associated with the collection of evidence (E), as it was at the front end (that is, the crime scene (10)) of an investigation, but are now used to assist with various actions with regards to handling and working with evidence (E) that has already been collected.

Figure 21:
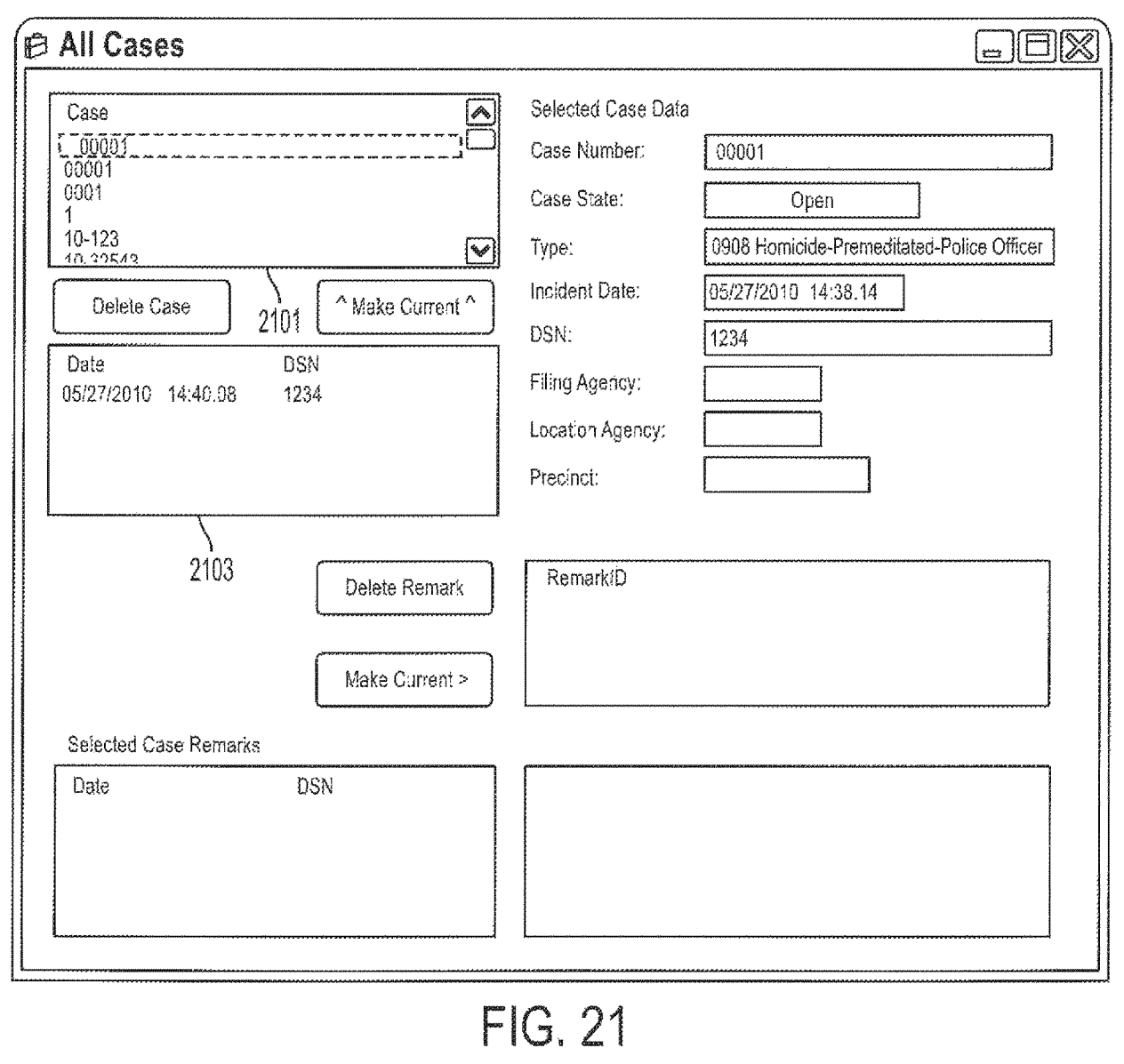

In the first instance, an investigator (I) can be provided with the ability to collate information from all the various cases by using a variety of search methods. While FIG. 19 has previously been discussed in conjunction with the ability to review suspects in a multiple of cases, it is not the only option. FIG. 21 provides a screen allowing the investigator (I) at a back end facility to review a list of cases (2101) and obtain general information about who created or opened cases and details of the case in the same manner as shown on the handheld device (103).

In a similar fashion, FIG. 22 provides for the ability to review outstanding evidence from an evidence list (2201) presenting the evidence (E) by identifier. This ability can be particularly useful should an investigator (I) be interested in determining what a particular evidence bag (1702) or piece of evidence comprises. For example, should the operator of facility (203) locate a piece of evidence (E) which appears to be old and possibly should have already been destroyed, they can locate that particular piece of evidence (E) by its record and review the details of it to associate it with, for example, a case or particular investigator (I).

Figures 23, 24A:
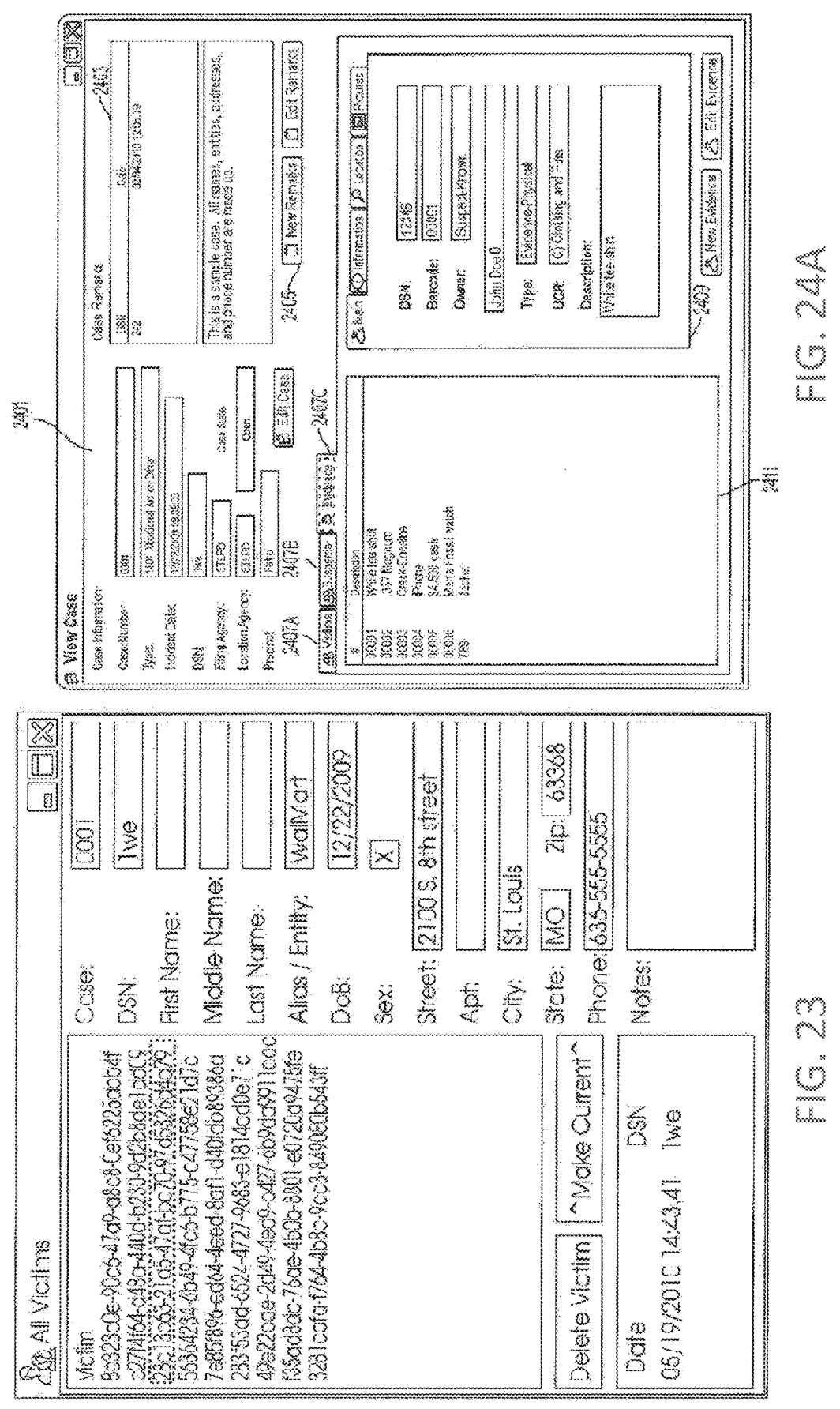

As should be apparent, as FIG. 19 discussed with suspects, it is also possible to provide a list of victims (2301) as indicated in FIG. 23.

While the above can be useful for investigatory work, they will often require a knowledge that a certain piece of evidence (E), suspect, victim, or case is present on the server (201) and now it is identified in order to be most effectively utilized. There may very well come a situation where an investigator (I) wants to know if a specific piece of evidence, or specific piece of information, is in the database but has no knowledge of the specific identifier of the evidence (E) or to what it may be associated. For example, if the investigator (I) was investigating a series of related crimes, they may want to perform a search to determine if other similar cases are listed but which have not been connected with the present ones.

FIG. 25A provides for a case list that allows for the activation of a filter (2501). Being able to view cases that have been filtered provides for the ability to make connections and to collate materials on the server (201) in a controlled fashion. Effectively, it provides an ability to efficiently search. In FIG. 25A, the filter (2501) may be setup to filter the cases in the case list (2503) by a variety of different methods. These include, but are not limited to, by incident date (2511), by date of last modification, (2513), by case number (2515), by type (2517), by DSN (2519) of the investigator (I), by the state (2521), the filing agency (2523), by the location agency (2525) or by the precinct (2527).

Figure 25B:
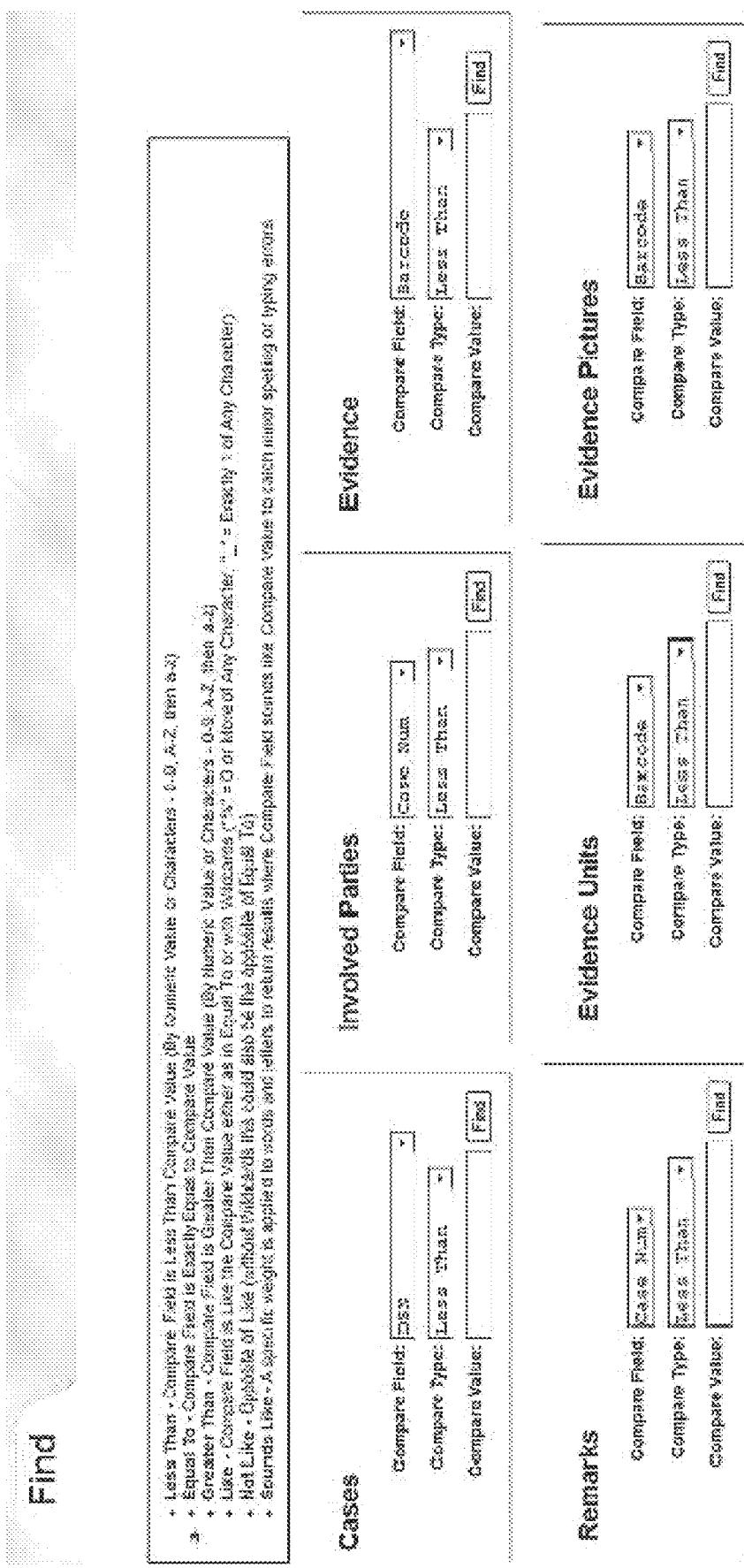
FIG. 25B shows a screenshot of logical operations for searches and filters.

Use of a filter in order to perform searches or to provide for a specific subset of data is well known and an investigator (I) would be able to gain the expected benefits from being able to filter results and examine subsets. Specifically, the Investigator (I) could review their cases or cases of another investigator (I), review cases of similar types to look for trends, or even to search for a specific case based on known facts or pieces of evidence (E). Multiple filters can be used for the searches, preferably using multiple screens for the handheld computer (103) while all of the filters could be viewed on a single screen with desktop computers (205) as shown in FIG. 25B. Also, the search requests and filters can be formed using several optional logical operations as also shown in FIG. 25B and listed in the table of logical operations.

LOGICAL OPERATIONS TABLE

| | |
|---|---|
| Less Than | Compare Field is Less Than Compare Value (By Numeric Value or Characters - 0-9. A-Z. then a-z) |
| Equal To | Compare Field is Exactly Equal to Compare Value |
| Greater Than | Compare Field is Greater Than Compare Value (By Numeric Value or Characters - 0-9. A-Z. then a-z) |
| Like | Compare Field is Like the Compare Value either as in Equal To or, ','ith Wildcards ("%" = 0 or More of Any Character, "_" = Exactly 1 of Any Character) |
| Not Like | Opposite of Like (without wildcards this could also be the opposite of Equal To) |
| Sounds Like | A specific weight is applied to words and letters to return results where Compare Field sounds like Compare Value to catch minor spelling or typing errors |

It will further be appreciated that these logical operations can be varied for each one of the fields that is being searched by the filter.

Figures 24B, 24C:
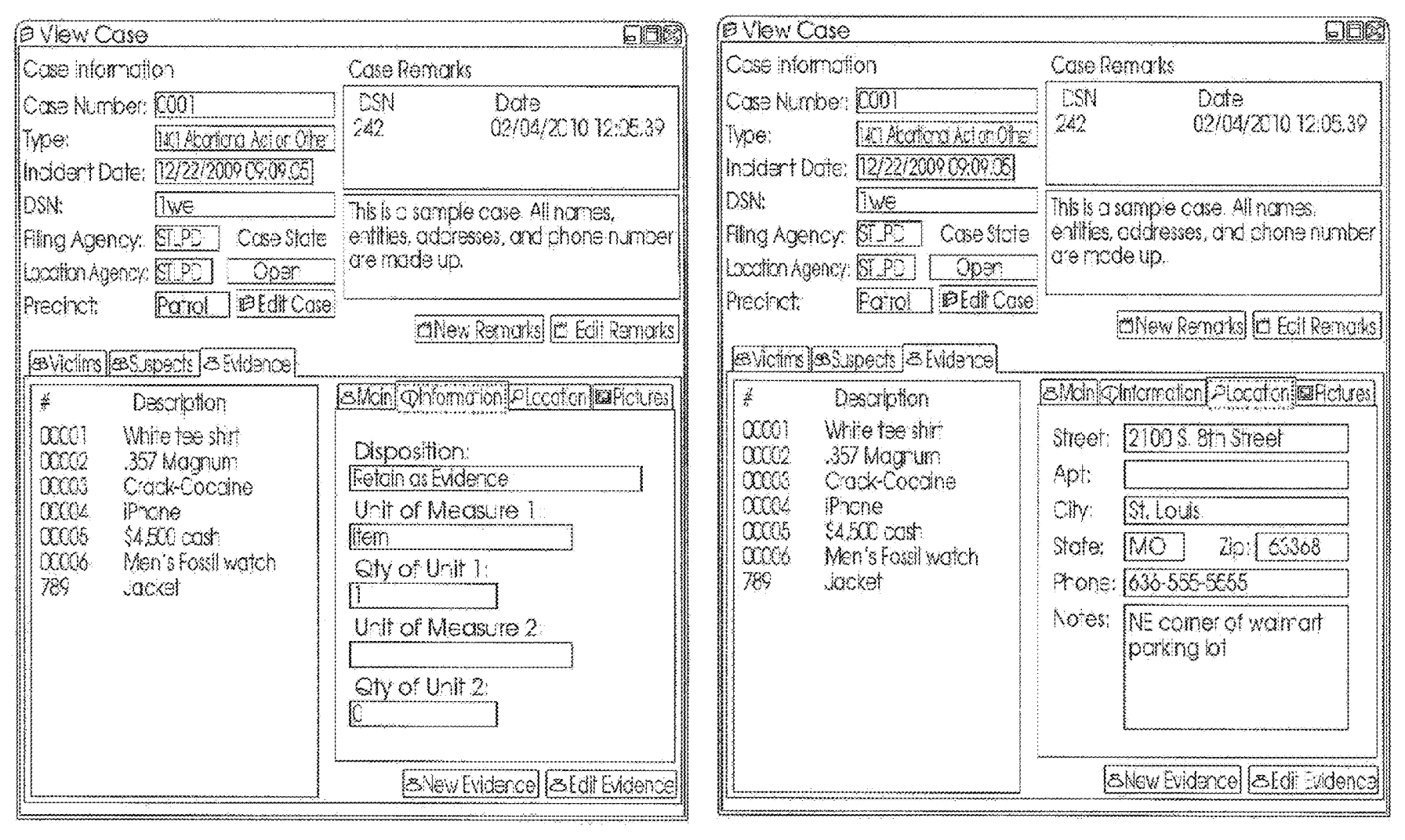
Figures 24D, 24E:
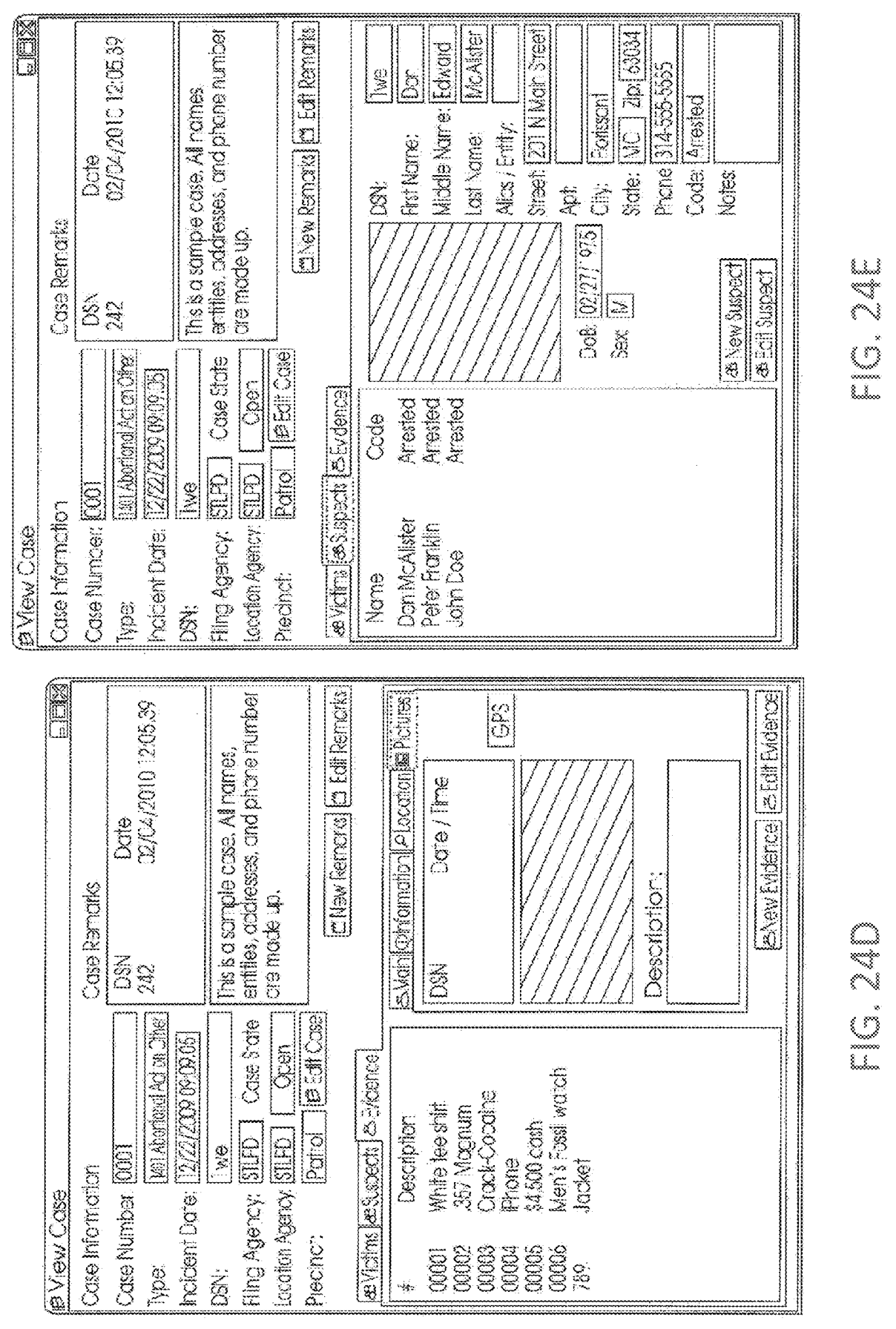
Figure 24F:
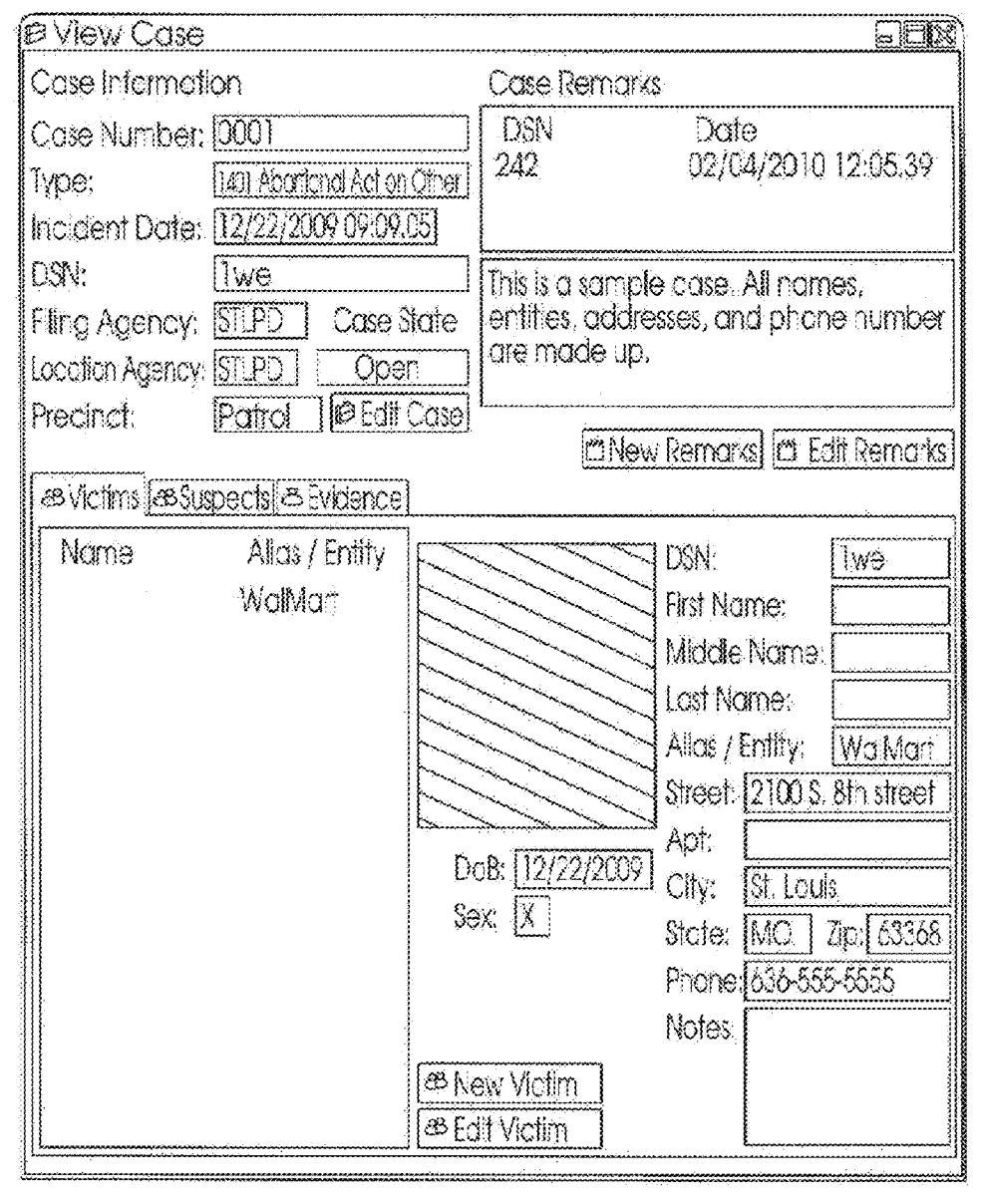

When reviewing a specific case, the system (100) will generally provide for ways to review all the information associated with that particular case in a coherent fashion. In this way an investigator (I) can review all evidence (E) associated with a case. The screens of FIGS. 24A-24C provide for an embodiment of a display that can be used to provide the information for a sample case. As should be apparent from the figures, the specific case view shows the case information (2401) for the case being viewed. The case view also shows a listing of all the remarks attached to the case (2403). These may have been generated in the field using the handheld computer (103) or may be added or edited in the case view of FIG. 24.

Attached to each case are tabs or folders (2407) which provide for the various lists of victims (2407A), suspects (2407B), and evidence (2407C) to be switched between and viewed. As can be seen in the various views of FIG. 24, the details of the information that was entered with the evidence collection at the crime scene (10) and disabled in FIGS. 10-13 is visible in area (2409). Generally as a piece of evidence (E) (e.g. white T-shirt (2411)) is selected, the information displayed in area (2409) will change. Further, as is illustrated in FIGS. 24A through 24D, the area (2409) may include additional tabs (2413) for different pieces of information about the particular evidence (E) selected allowing general access to the collected and entered information.

It should be apparent from the above description that once the information from the handheld (103) is uploaded to the server (201), the information does not remain static and may be used and manipulated by the investigator (I) both in ongoing investigations, or to obtain information from cases which are closed.

While the above components of the backend have focused on the ability to review existing evidence (E) information, in many cases, the case will eventually be closed. When this happens, it is important to make sure that the case records, and the evidence (E) associated with the case, are properly handled. In some cases, evidence (E) may need to be maintained in long term storage essentially forever (or at least until all parties involved in the case have died). In other circumstances, long-term storage of evidence (E) may be undesirable (for example, because it presents a biological threat or because it takes up too much space) and the evidence (E) will need to be destroyed or otherwise disposed of once it is expected to no longer be needed. One example could be a situation where the defendant has completed all available court appearances. In a still further case, the evidence (E) may need to be returned to an original owner, or may be sold to raise money for the investigating agency and knowledge of when such actions should be taken out are valuable.

Figure 26:
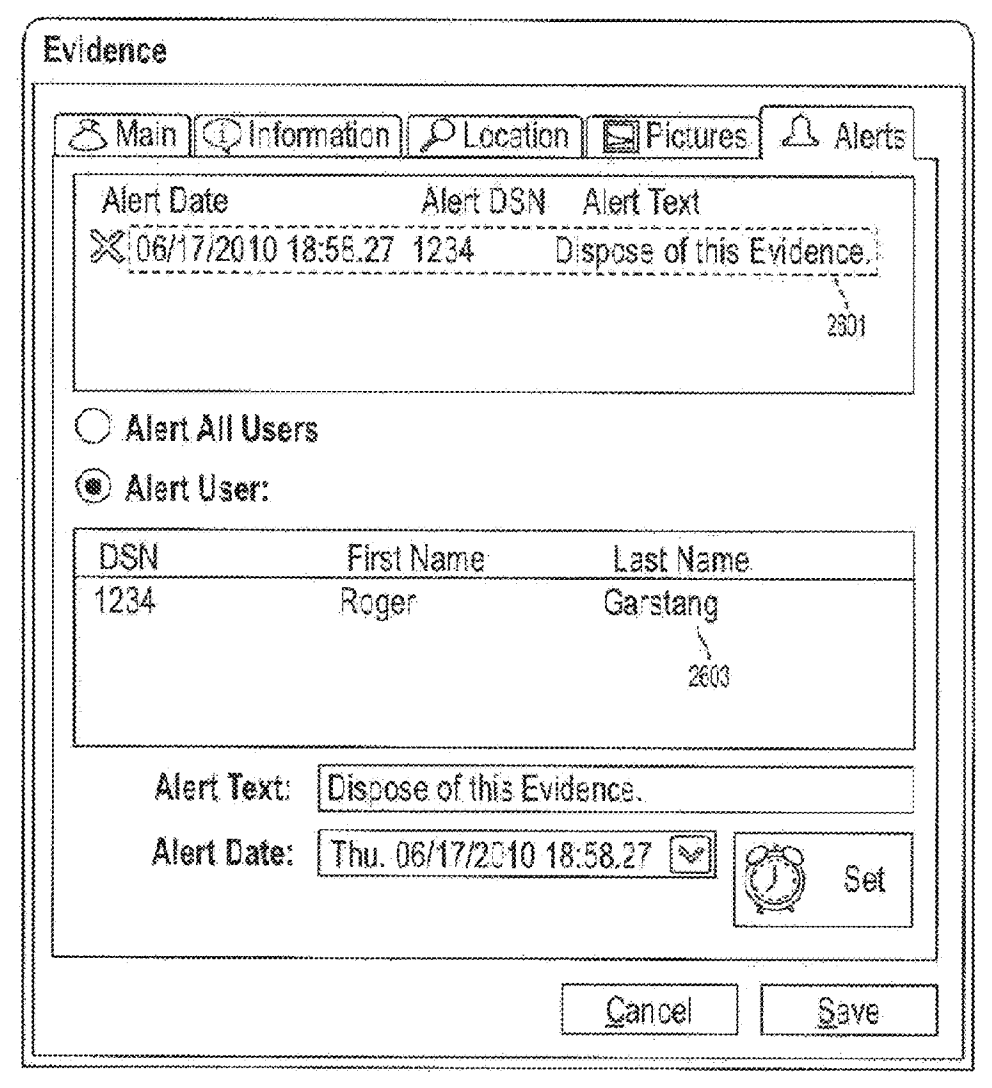

One ability of the backend system is to provide that the necessary resultant disposal of the evidence (E) can be entered when the evidence (E) is deposited at the facility (203) and alerts can be setup to indicate to an investigator (I), or any other party, that it is time to dispose of the evidence (E). FIG. 26 provides for an embodiment of a notification system by indicating a screen whereby an evidence alert (2601) may be created. The evidence alert (2601) will be associated with a specific piece of evidence (E) and/or with an evidence bag (1702) and will provide for an instruction as to what to do, and a date on which the alert becomes active. Thus, if a certain piece of evidence is to be disposed of 5 years after the case closes, the evidence alert (2601) will be setup to alert an individual (2603) responsible for the Evidence (E) at the desired time. This individual may be the Investigator (I), an individual responsible for the Evidence (E) storage, or any other person, as appropriate. Further, alerts can be simultaneously sent to multiple individuals if that is desirable.

Once the alert has been set it will operate in the background until the appointed time when it triggers. Alert notifications may be provided in any fashion but will generally utilize electronic communication methods such as, but not limited to, sending email or providing an alert notification through the system (100). FIG. 27 provides an embodiment of an alert reminder (2701) which may operate through system (100). When triggered, an alert reminder (2701) is provided to the appropriate individual telling them that a piece of evidence (E) needs to be dealt with and how to deal with it. Generally, this individual, upon receiving the alert (2701), will either deal with the evidence (E) as indicated or put the alert in a sleep mode. If they deal with the evidence (E) as indicated, they would mark that the alert (2701) has been completed (2703). If the individual does not currently have the time or desire to complete the alert, or if they feel that the Evidence (E) needs to be retained for a longer time for whatever reason, they may instead choose to set a reminder to close the alert but have it return at a later time. This may either be a short term sleep (e.g. if they got the alert (2701) at or near crime scene and wanted the alert (2701) to reappear when they returned) or may be a longer term delay (for example, if an appeal is still pending).

Figure 28:
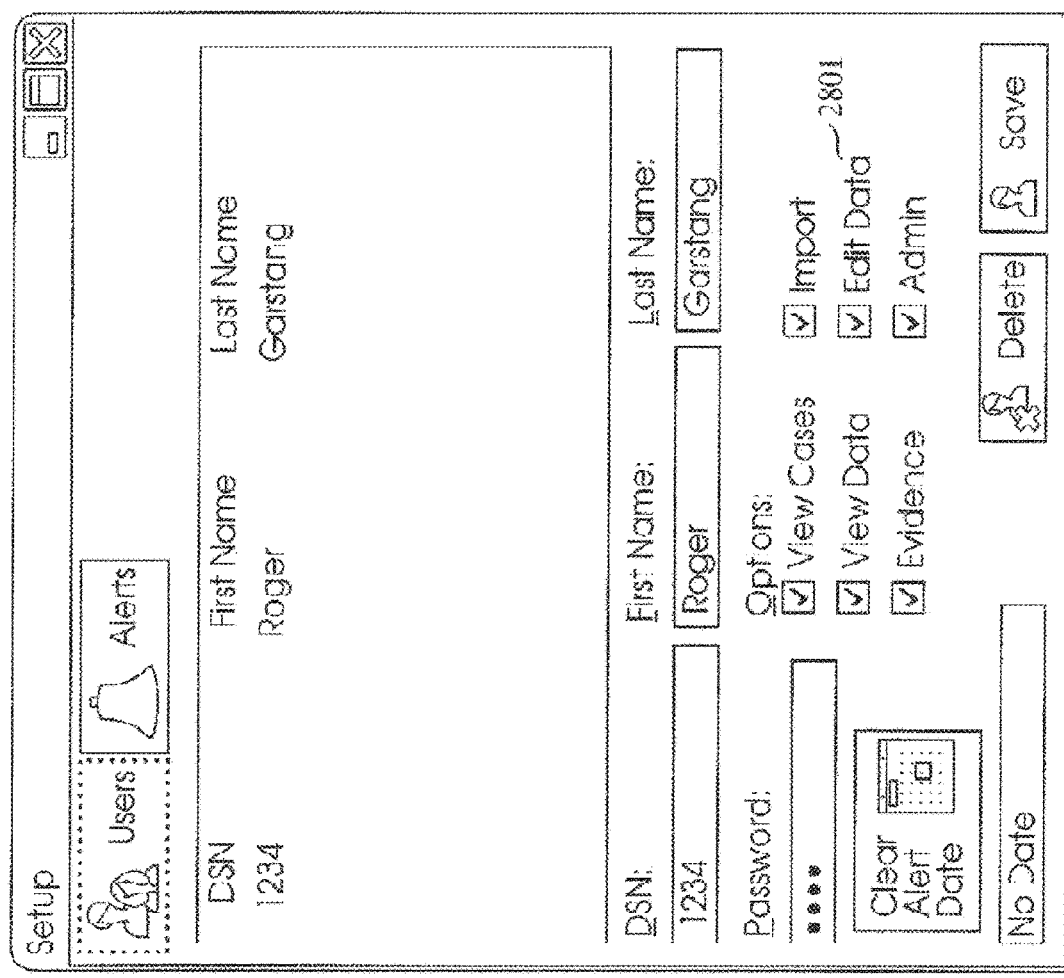
FIG. 28 shows a screenshot of a user setup and maintenance screen.
Figure 29:
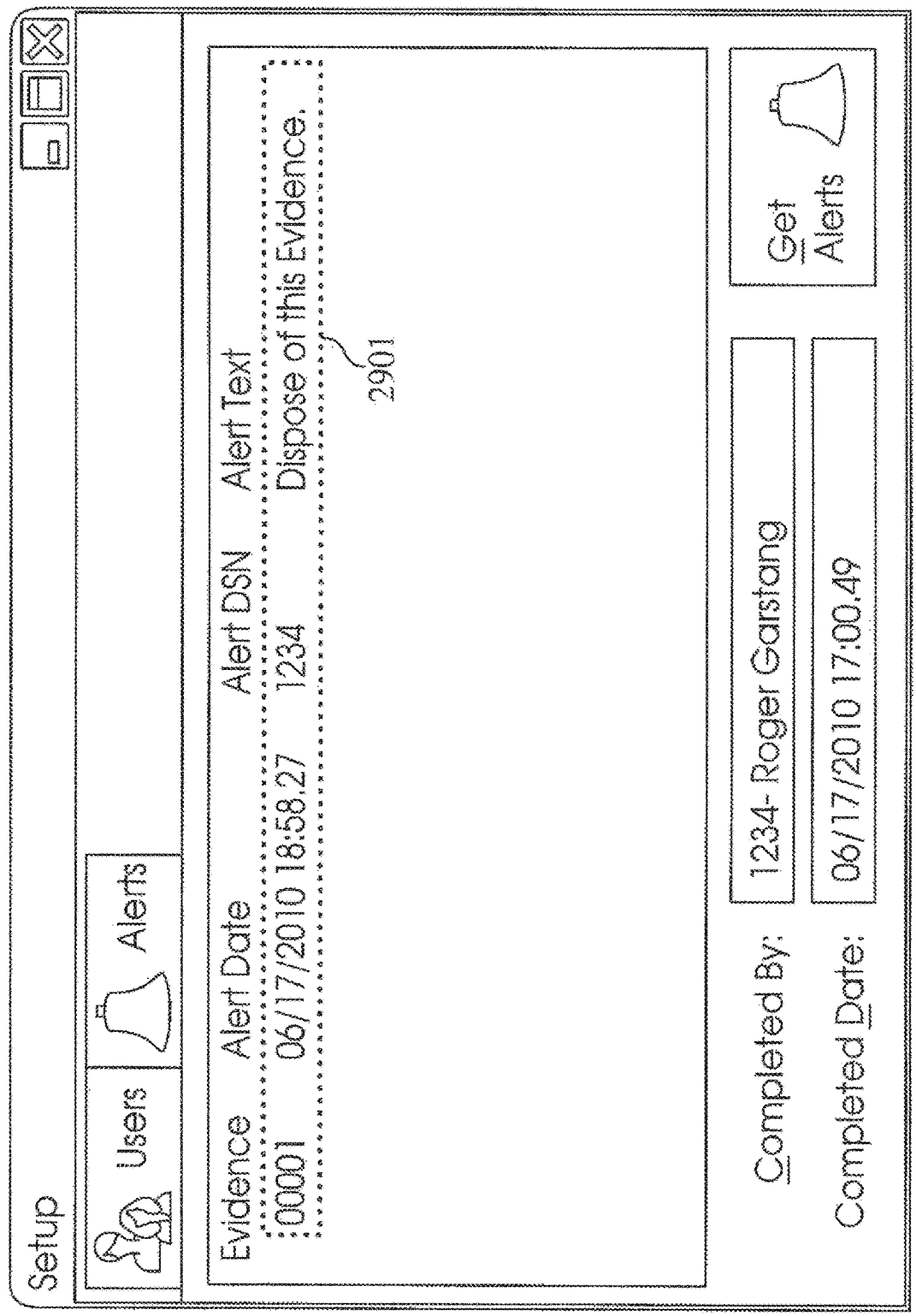
FIG. 29 shows an alert record screenshot.

It should be recognized that because the system (100) operates with potentially sensitive data, user control is desirable. FIGS. 28-29 provide for general administration of investigators (I) on the system and their access. In particular, the investigators (I) may be added and provided with various abilities (2801) including the ability to view, edit, and access various types of data. In this way, investigators (I) with different areas of expertise and need to interact with the system (100) can be provided with access appropriate for their expected use. This type of central control to setup and control users will generally be provided only to certain administrators to provide for further enhanced security in the system and, as discussed previously, all changes may be recorded.

As part of the user setup and monitoring, it may also be possible for an administrator to view the alerts (2901) of investigators (I). In this way they can verify that the investigator (I) is actually completing alerts (and not just putting them off) and should a piece of evidence (E) have been disposed of which is later needed or where there are questions as to the disposal, they can review the alert specifics to make sure that standard protocols were carried out.

eTWIST® System Used for SAK Evidence

In another aspect of the present invention an integrated eTWIST system can be particularly designed to be used in the collection, identification, processing, tracking, and other management of sexual assault kits (referred to herein as "SAK") in addition to maintaining the chain of custody for all types of evidence. Additionally, as explained in detail below, enhancements can be added to the system which would permit those persons who are outside of law enforcement but who are integrally involved in the collection, processing, and tracking of the evidence in the SAKs to have limited accessibility to the SAK data to which they are entitled under local laws and other regulations. For example, these outside parties may include but are not limited to third party investigators, healthcare providers, laboratory technicians, advocates, party representatives (3304), victims, party guardians and any combination thereof.

Figure 30:
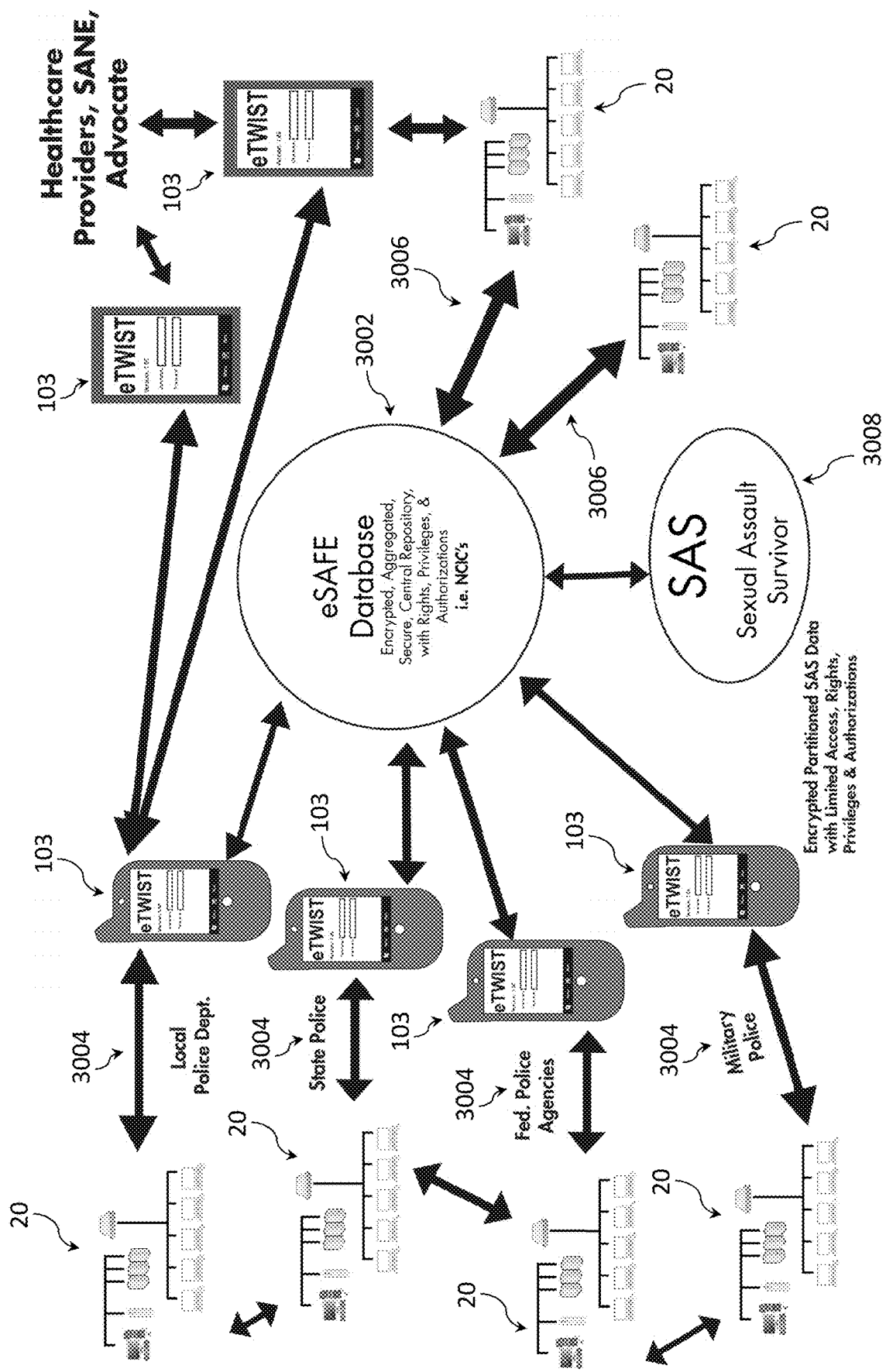
FIG. 30 shows a flow chart of a system used to collect evidence from victims for inclusion in sexual assault kit.

FIG. 1 illustrates a block diagram of the components of an evidence tracking system (100), such as the eTWIST system described herein. Generally, one part of the system is used at the location (10) where a piece of evidence (E) is to be collected, identified, and tracked. In many cases, this is the crime scene. However, when there has been an assault on a person's body, such as a sexual assault or another type of physical violence, the location could be wherever the victim may have been taken for treatment, such as a hospital, because the evidence may be carried on or within the body of the victim. Accordingly, FIG. 30 illustrates a block diagram in which the system could be used by SANEs that collect evidence from victims for inclusion in SAKs. Regardless of whether the evidence (E) is collected by LEOs at a crime scene or by SANEs at a hospital, the various pieces of evidence (E) are tagged through the use of tags (101) which are connected to the respective pieces evidence or to the specimen vessels or other containers that may hold individual pieces evidence in an environment that avoids contamination. The collection of the individual pieces of evidence is also tagged as a group by being placed in a bag or other container (102), such as in a SAK container, and some evidence that it too big to fit in the SAK container may have to be stored in an external vessel.

The existence and identification of the tagged evidence (E) is entered into a computer (103) by an investigator (I) or other collector (C), such as a SANE. The collector (C) will also provide additional information into the computer (103) to identify the evidence as well as information about the evidence (E) such as, but not limited to, identification information, photos, or observations. Multiple collectors of evidence can work together, such as an LEO investigator (I) and the SANE, and may also utilize the handheld computer (103) in the collection of additional evidence such as photographic evidence and interpreted evidence which may be connected or unconnected to physical evidence such as, but not limited to, identification of suspects or victims, other notes, or observations. It will also be appreciated that different collectors may be using different collection systems. For example, an investigator may be using the eTWIST system or some other type of computerized evidence management (CEM) system whereas a SANE can be using a computerized healthcare management system.

Both collectors may gather pieces of evidence that will be grouped and tracked in association with a single SAK container so it would be beneficial to have a centralized database that can correlate the data from different collection sources that belong to a single SAK case. For example, as particularly shown in FIG. 30, information associated with SAK kits can be uploaded to a SAK database (3002), and the administrator of the SAK database would provide the various users of the system the appropriate rights, privileges and authorizations according to their respective roles and responsibilities. In retrieving information, not only may law enforcement (3004) and healthcare providers (3006) access information, it is also possible to grant victims (3008), limited access to certain information that is associated with their particular cases. In entering information, a handheld computer (103) may be used, such as when LEOs travel to different crime scenes to collect evidence, whereas in other cases, the computer could be a laptop or desktop computer, such as for SANEs who typically collect evidence in a central facility, such as at a hospital or healthcare clinic, and it is possible for data to be entered directly into the SAK database by various users or entered through data channels of the backend systems (20) that are accessed by the users, such as the CEM system for law enforcement and the computerized healthcare management system for healthcare providers. The use of different types of backend systems in combination with the centralized database that correlates or otherwise maps the information from different backend systems for sexual assault evidence is generally referred to as an electronic Sexual Assault Forensic Exam (eSAFE™) system.

For CEM systems, the handheld computer (103) will generally provide for a linking connection associating the tag (101), the evidence (E), the bag/vessel or other type of container (102) and/or any other information related to the case and can store all this information in an internal memory while the investigator (I) is at the crime scene. The computer (103) will generally be capable of communication and may obtain information wirelessly from a remote location, specifically an evidence locker or other secure evidence storage site (20) and may include peripheral devices such as printer (111). For computerized healthcare management systems, the system used by the healthcare provider may similarly have a linking connection between tags, specimen vessels and/or vessels for other pieces of evidence, and the SAK container for the entire collection of the pieces of evidence.

The healthcare provider's system is likely connected to one or more servers that form the backend of the computerized healthcare management system, and it is most likely that a server would communicate the evidentiary information with the SAK database. However, it is also possible that some law enforcement agencies for small towns and clinics may not have a CEM system or a computerized healthcare management system which can communicate with the SAK database, and in this case, the SAK database can include its own SAK server which provides an online web-based connection through a browser that allows any authorized user (i.e. permanent users or temporary users) to enter the sexual assault data directly into the SAK database using the browser interface provided by the SAK server.

Once the evidence (E) has all been collected, the computer (103) and evidence (E) will jointly be presented to an evidence storage facility (20). The memory of the computer (103) is generally transferred to a generally secured central computer system (201). The evidence (E) may also be placed into secure storage (203) at a related time. This provides for the first check to make sure that the evidence (E) is correctly identified as the information transferred from the computer (103) will need to match with the evidence (E) actually provided.

Evidence (E) can be checked out from the secure storage (203) by parties which have applicable rights, privileges, and authorities required to access it through the use of the central computer system (201). Checking out the evidence involves obtaining the evidence (E) and having the central system (201) be updated to indicate that the evidence (E) has been placed in that previously verified individual's control. The system does not require a match from an original recipient of the evidence, but this could be an optional check for some jurisdictions. The system will note a respective piece of evidence has been returned (transferred). Generally, the returning/transferring party may or may not be the same party that checked out a respective piece of evidence. This process will repeat for every individual who will access the evidence (E). Further, the onsite access (205) may allow for parties to review evidence, collate cases by any number of criteria, and provide for chain of custody information for use at trial to further investigations and provide for simplified evidence (E) handling.

While maintaining the chain of custody, the system users will employ a vast array of mobile computing devices, continuously interacting with many disjointed and independent devices (both mobile and fixed), including potentially known and unknown databases and systems. Within the healthcare industry, as is true in many industries, data breaches are primarily due to device theft or loss—a fact that proves people are still often the weakest link in the security equation. Some recent reports show that data breaches within the healthcare industry alone number nearly 112,000,000 records breached, equating to approximately 35% of the total U.S. population. Encrypting data is vital to protecting Sexual Assault Survivor (referred to herein as "SAS") information, including protecting the privacy of the SAS, meeting HIPPA requirements, protecting the legal rights of all involved parties (i.e. victim, witness, suspect, etc.) The system database is designed to share SAK data so as to allow the SAS electronic access to track the SAK throughout the process, and provide process accountability and visibility to the survivor.

A System Administrator (referred to herein as "SA") or other designated authority can give the SANE the appropriate roles, rights and privileges to enter information into the system as described in detail below, or as discussed above, the SANE may enter the information into a separate healthcare management system that is in networked communication with the eTWIST system or may enter the information directly into the SAK database using the browser interface provided by a SAK server. When using the system, the SANE user logs in with the SANE's unique credentials and begins to enter the data relevant to the respective case, thus beginning the process to auto populate some or all of the necessary forms used later in the exam. The entry of information is described herein with reference to particular screenshots of the eTWIST system. Similar screens can be used in a healthcare management system or in a browser interface.

The user may select, based on their respective appropriate roles, rights and privileges, the type of case from the NCIC dropdown menu, such as 1100 Sexual Assault shown in FIG. 31A. The user can with appropriate roles, rights and privileges further define the type of sexual assault by expanding the dropdown menu tree and selecting a more exacting description. The user can further identify the case location as well as the entity(s) responsibly for the information that is being collected.

The SANE will perform an exam collecting each piece of evidence, biological, physical or any other type of relevant evidence. Examples of items that may be contained in the SAK, requiring identification, collection and tracking could be all types of evidentiary samples as currently used in the investigation of assault cases, along with any other types of evidence which may be deemed necessary in a particular case. Some samples require multiple samples to be collected. Some samples are too big or there are too many samples to fit into the "evidence vessels" provided with the SAK, and other types of "evidence vessels" must be employed.

Generally, before or within the preliminary and/or early stage(s) of the SAK exam (3306) process, the SANE, healthcare provider or stakeholder(s), so duly credentialed and authorized according to legal and/or protocol driven directive(s), will log in to the eSAFE™ computerized evidence management system as described in detail below and request from the eSAFE centralized database, a singularly respective, non-repeating, non-repeatable, unique data carrier ID, which represents the "DNA, License plate, and/or birth certificate" for the respective SAK. in human and/or machine readable indicia form, such as, but not limited to, a bar coded label, RFID label/tag or some other unique identifier and permanently affix said unique data carrier to the respective SAK, thus beginning the management, registration, identification, collection, documentation, accountability, transfer, and tracking of unique respective SAK establishing the genesis of and/or the origin of familial hierarchical relationships, between the original SAK and its continued offspring, such as but limited to, its respective evidence vessels, including specimen vials and/or components throughout their entire lifecycle.

Alternatively, by using the eTWIST system, the SANE should deploy an eTWIST generated new, a singularly respective, non-repeating, non-repeatable, unique data carrier ID, which represents the "DNA, License Plate, and/or birth certificate" of the SAK, in human and/or machine readable indicia form, such as, but not limited to, a bar coded label, RFID label/tag or some other unique identifier and permanently affix said unique data carrier to the respective SAK, thus beginning the management, registration, identification, collection, documentation, accountability, transfer, and tracking of unique respective SAK establishing the genesis of and/or the origin of familial hierarchical relationships, between the original SAK and its continued offspring throughout their entire lifecycle. All entries once saved on a mobile handheld device and/or the central server system/PC will be time and date stamped within the system and associated to the previously established unique data carrier ID which uniquely identifies the evidence within the SAK family (i.e., the "DNA, License Plate, and/or birth certificate" of the SAK).

The SANE will attach a unique data carrier evidence tag, such as a bar coded label, RFID tag or some other unique identifier, to each individual respective piece(s) of evidence and to the outside of a respective SAK. The SANE will scan each data carrier to identify/marry the data carrier to the respective SAK, as well to the SANE, case number and victim. Once the SANE scans the evidence tag the system begins the establishment of a hierarchical relationship or grandparent, parent, child relationship between the Case, the SANE, the Victim, and the evidence kit which ultimately allows identification of the individual piece(s) of evidence which make up the kit. The SANE will continue the process of attaching a unique evidence tag to each individual piece of evidence and or the evidence container until the exam is complete as shown in FIGS. 31B-31F.

It will be appreciated that a victim/SAS may present to the SANE before any LEO has had an opportunity to interview the victim so there may not be any computerized record of the sexual assault at the time that the SANE performs the examination and evidence collection. It is also possible that an LEO may have interviewed the victim before the SANE performs the examination and evidence collection so there could already be a record of the sexual assault in the eTWIST system, shown in FIG. 31B, or some other CEM system that is a part of the overall eSAFE system that the SANE could query through the SANE's computerized healthcare management system. If the computerized record has already been created, the SANE can confirm the biographical information of the victim and may supplement the information, such as with a photograph of the victim and possibly an alias name (depending on the level of authorization granted to the SANE by the administrator), and the SANE can move directly to the examination. If no record has been created, the SANE can begin the examination as described above and/or as directed by legal and/or other protocols.

Figures 31D, 31E, 31F:
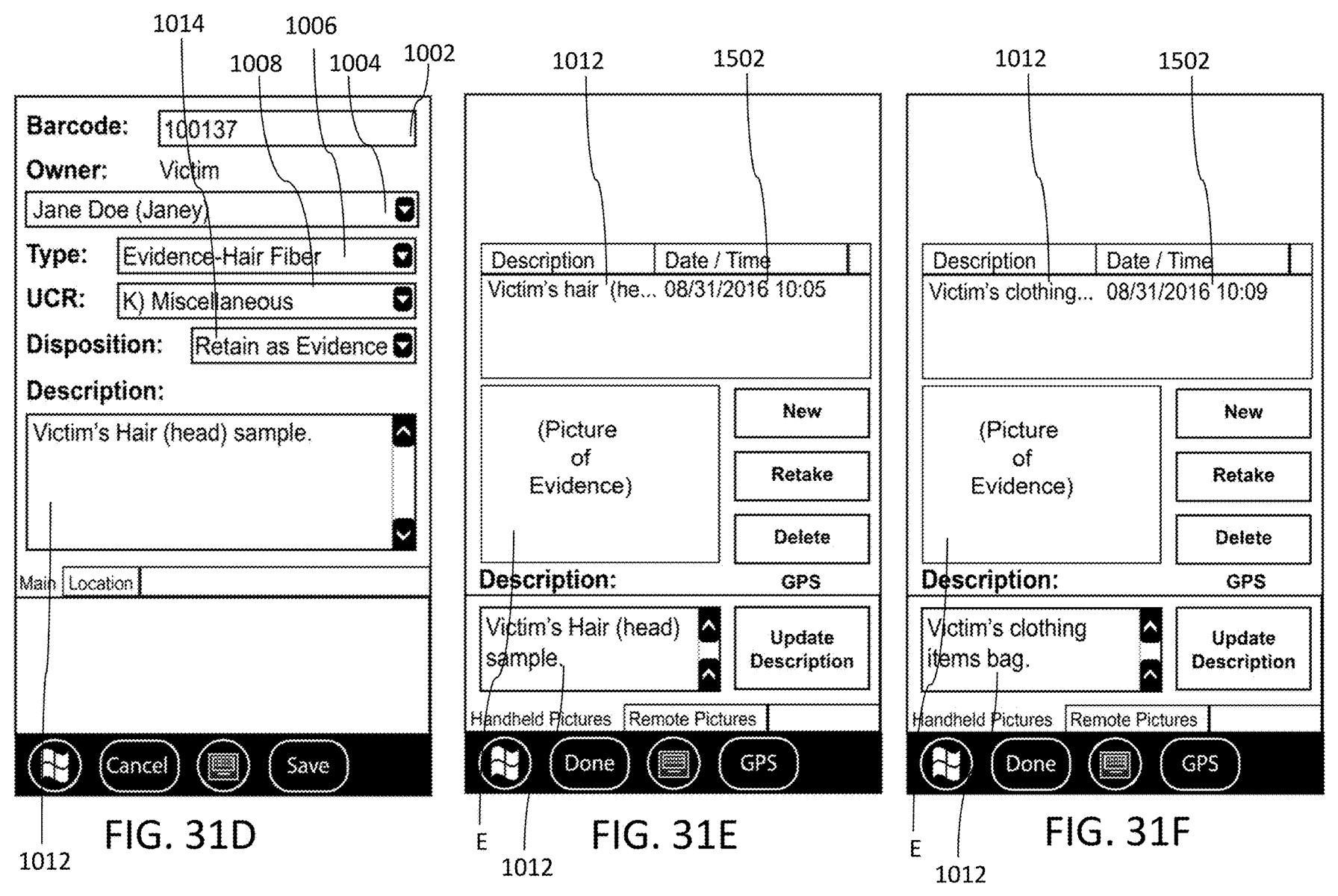

Evidence is collected by the SANE, uniquely identified by an evidence tag having a data carrier, such as a bar coded label, RFID tag or some other unique identifier, and documented in the eTWIST system or in the SANE's computerized healthcare management system which may run the eTWIST system or some limited variation thereof and is in operative communication with the eSAFE system. For example, when a swab of the victim's saliva and hair/fiber samples are taken the SANE will place the samples in separate specimen vessels with the unique evidence tags consisting of a bar code number, RFID tag or some other unique identifier to be retained as evidence shown in FIG. 31C and FIG. 31D. Corresponding information for each item of evidence is added into the record and uniquely correlated to the evidentiary item through its identification code as shown in FIGS. 31C and 31D. Additionally, the evidence tags can be photographed and scanned into the system using a mobile handheld device shown in FIG. 31E. Similarly, the victim's clothing, clothing samples, or any other relevant pieces of evidence can be similarly processed and saved as evidence within the system, as shown in FIG. 31F.

Figure 31L:
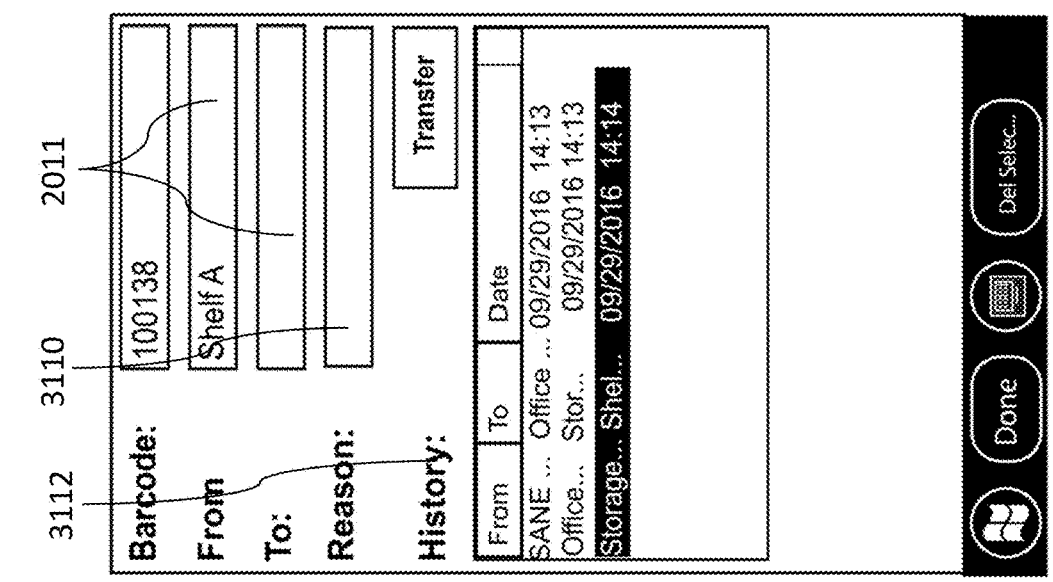
Figure 32:
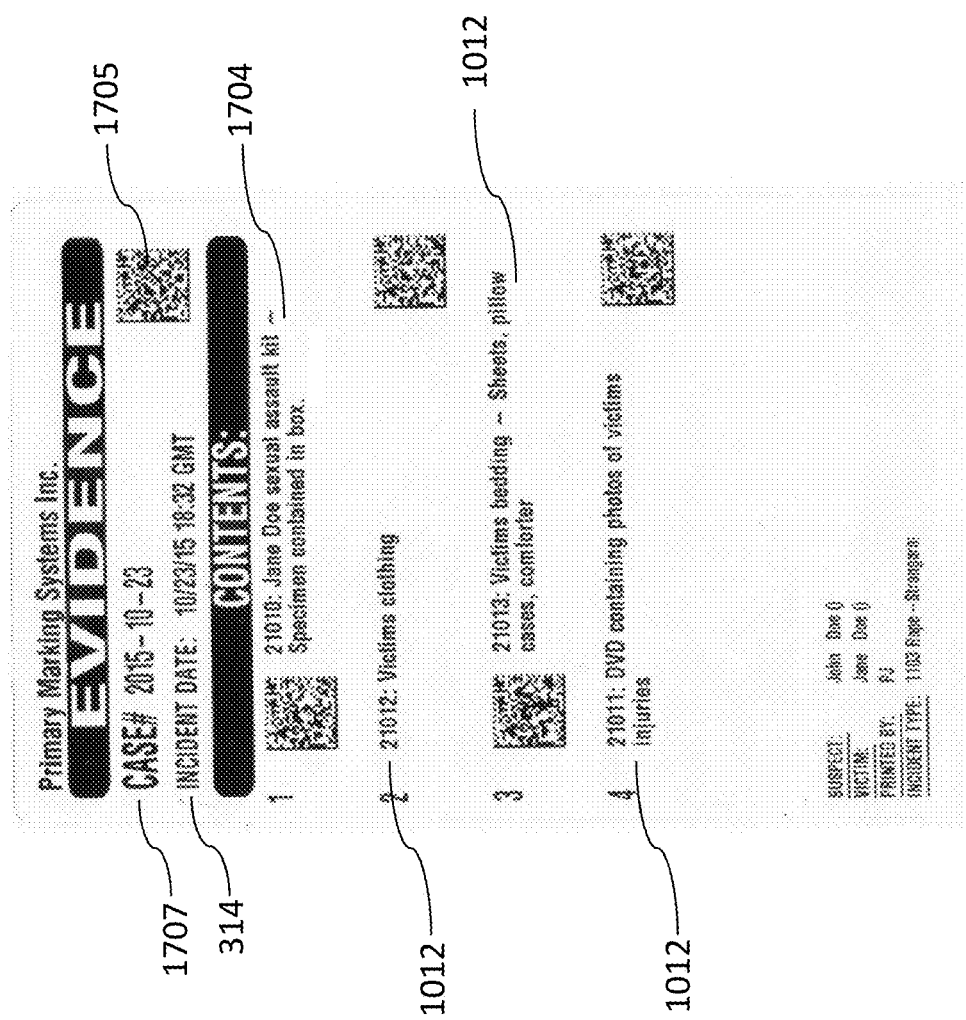
FIG. 32 shows a printed evidence tag for a sexual assault kit.

In some cases where possible, evidence vessels and their contents may be returned to the SAK, and appropriately identified using the previously described evidence tag to maintain the chain of custody of respective SAK'(s) as well as its now identified contents. As an aid in identifying, documenting and tracking the contents of the SAK on the outside of the SAK, using the "Print Label" feature in eTWIST shown in FIG. 31H, the user can simply select the "print all" feature, scan any previously uniquely identified evidence vessel identifier that has been associated with a respective SAK or the SAK unique identifier itself and load (3102) all related evidence as shown in FIG. 31G or access an individual piece of evidence (3104) that has been associated with a respective SAK as shown in FIG. 31I, to print an evidence kit container identification label, which could consist of, but not limited to, a listing of the items contained in the respective SAK or related to the SAK, case number, incident number/date/time, contents of the evidence containers contained in the SAK container, respective unique evidence tag identifiers including alphanumeric symbols and/or bar code(s), if available, and other desired data is printed for attachment to the kit container, as shown in FIG. 32.

Figure 31K:
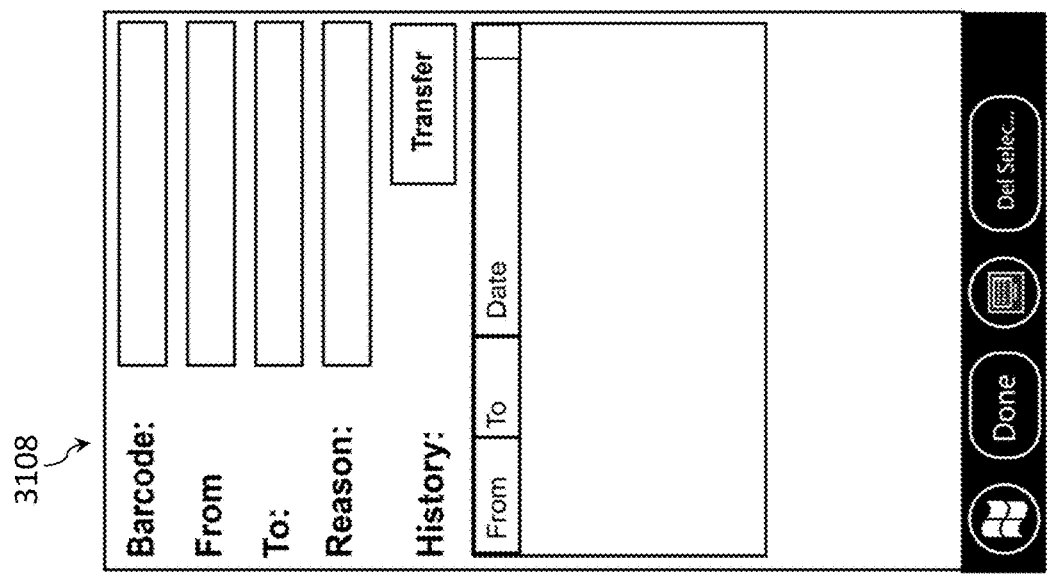
Figure 31J:
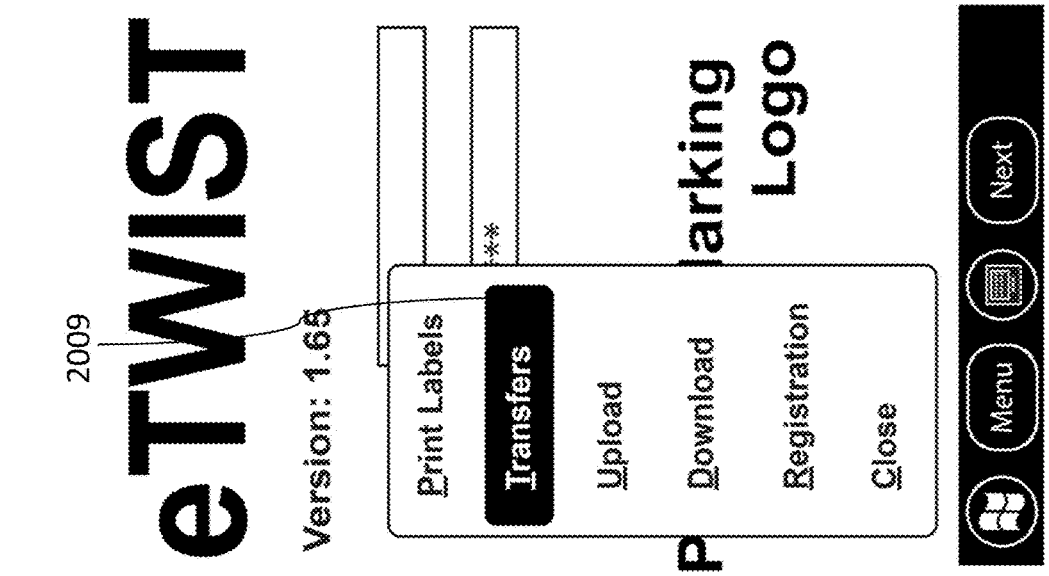

Thus the system eliminates a great deal of misuse, margin for error, confusion, unmet deadlines, misinterpretation, and the very real possibility of lacking clarity of all respective parties. All of this helps to reduce the rate of recidivism and timely prosecution of SAK's. Using the "Transfer Function" as shown in FIG. 31J within the eTWIST system, the user can "Transfer" the respective and uniquely identified SAK, including its contents as required by law or as directed by senior leadership protocols. When the transfer action is selected, a transfer window (3108) as shown in FIG. 31K is opened for the user to enter the evidence to be transferred along with the transferring parties and any reason (3110) for the transfer. As shown in FIG. 31L, the history of transfers (3112) will be logged and shown, such as transfers from a SANE to the LEO, to and from a "Storage Location(s)", another appropriately designated stakeholder, or directly "Transferred" to a LEO, thus maintaining the Chain of Custody.

All transactions within eTWIST have the Date and Time electronically recorded regardless of how long the exam takes, such as shown in FIGS. 31E, 31F, 31I and 31L. It is important to note that biological evidence begins to breakdown as soon as it is removed from body. The body itself reacts both positively and negatively differently over time, so it is important to note that accuracy in the recordation of the time and date a respective piece of evidence was collected can be very important to all interested parties. If LE has not yet been contacted the SANE or the healthcare facility may do so. When the LEO arrives using the same eTWIST transfer feature mentioned above, the SAK and/or specimen containers and/or its many and various familial hierarchical related evidentiary components are transferred to the LEO. The LEO will take ownership of the SAK and/or specimen containers and/or its many and various familial hierarchical related evidentiary components and the Transfer process continues with each and every subsequent movement of the SAK or respective pieces.

Upon completion of the examination, and SAK protocols, some or all of the investigators, such as, first responders, SANE and/or an advocates may upload all relevant sexual assault data into their respective backend systems, while also in near-real time upload all relevant data into the eSAFE system, and/or eTWIST backend system. Respective to Military, Federal, State, Local, Tribal and International laws, such data may or may not contain SAS personal identifiable information (aka "PII"), according to protocols. Accordingly, the eSAFE and eTWIST system will record relevant data including, but not limited to, the time and date of transfer, geo-location of the transfer, individual(s) responsible for the transfer, individual(s) receiving the transfer, physical location(s) of the transferred evidence, the reason for the transfer, SAK(s) and contents as recognized by the respective evidence tags, data required by law, relevant data from a Laboratory Information Management System (referred to herein as "LIMS") and any other relevant data as may be deemed necessary. Thus, the chain of custody is automatically maintained by the system. Accordingly, the eSAFE system once deployed to a central server, can serve as the connective hub and repository for all SAK's, investigative and healthcare data from any and all similar, dissimilar, connected, disjointed (meaning not yet joined to eSAFE), independent databases, mobile computing devices and the Internet of Things. Additionally, the eSAFE system provides an encrypted and partitioned stakeholder database with access limited by predetermined, rights, privileges, and authorizations to the respective stakeholders.

The electronic encrypted and partitioned SAK database, along with other aggregated data (with all of its restrictions, rights, privileges, authorities and security levels), is contained in a central database. The types of database operating systems selections are numerous and varying, such as, but limited to, i.e. Microsoft Sequel Server (SQL), SQL Azure, Microsoft Access, SAP, Amazon Aurora, My Sequel (MySQL), although it will be appreciated by those having skill in the art that these are merely examples of database that could be deployed and other similar database may be used. Data of all types could flow in and out of the eSAFE system with encrypted access restricted to respective and unique rights, permissions, authorities, and security levels. After initially logging into the database, the system would provide the stakeholder/user with a system-generated unique user identifier and password or present the stakeholder the option to establish her or his own. Such security credentialing should be respective and unique to the individual stakeholder, and should change, evolve, morph, or otherwise manifest itself into a different set of unique respective credentials over a given period of time.

Any transaction occurring in the eSAFE and eTWIST software system will be encrypted with a time and date stamp respective to the known stakeholder as identified by the stakeholder ID(s), (describe below). Additionally, a transaction identifier, such as a respective transaction number consisting of a consecutive ID number generated by the eSAFE system, designated to indicate the order in which a piece of evidence and/or a transaction was entered, populated and/or occurred in the eSAFE system, will be respectively assigned (i.e. the first transaction to occur in eSAFE or eTWIST, will be given transaction number 1, the next number 2, the next number 3 continuing to increment indefinitely). Given the fact and the manner in which data transactions will occur in the computerized systems, it would be nearly impossible for such consecutive numbers to be duplicated in either the eTWIST and/or eSAFE system(s).

Additional benefits are available from the integrated eSAFE systems in which near real-time information can be shared between law enforcement personnel, healthcare providers, and other stakeholders, such as but not limited to, any dually qualified first responder including firefighters, ambulance services, emergency medical services, and even the military, etc., holding the requisite security credentialing For example, a survivor, aka SAS, may be identified, either by contacting a first responder, a LEO, a healthcare provider, a SANE, and/or an advocate or by simply accessing the eSAFE system for help. When a SAS accesses the eSAFE system for help the system can alert a first responder, a LEO, a healthcare provider, a SANE or advocate in their area in a number of different manners. For example, simply clicking on a radio button such as "HELP ME" will direct all appropriate first responders to the location of the distress call. Similarly, another a radio button could direct precise pre-determined first responder(s), such as a LEO, healthcare provider, SANE or specific advocate(s) nearest to the location of the distress call, to the location of the distress call. Such a location based button could use GPS locating through a mobile app, phone number or actual location of the stakeholder to notify the pre-determined first responder(s) within the given area.

It can be expected the physical responses of the respective first responder(s) will be driven by their respective protocols. The eSAFE system could provide an alert back and/or advise the SAS that first responder(s) have been notified of the situation, received the request for help/assistance and are dispatched, and perhaps provide an ETA. The eSAFE system would provide a protocol-driven list of next steps, offer a simple selection to request that an advocate or first responder contact the SAS via voice or text, and provide instructions on what to do and not to do including localized/ regionalized SAK protocols.

Once the SAS and the SANE are united, using any of the systems described above, the SANE would begin the sexual assault examination process interviewing the SAS, collecting, identifying, photographing, logging, and tracking all relevant sexual assault kit evidence within the system. Per established SAK and/or legal protocols, a first responder(s) and an advocate(s) may also be required to interview the SAS, collect, identify, photograph, log, and track any additional crime scene evidence and data using the eTWIST software either on a mobile computing device or a central server system like a PC.

Directed by respective command and control designed evidence transfer protocols, using the transfer function of the eTWIST software on the SANE's mobile computing device or central server system will transfer (as described both above and below) the SAK(s) and the contents to a designated storage location(s), to the respective first responder(s) or so credentialed stakeholder. The unbroken chain of custody continues by accessing the transfer function of the eTWIST software from a first responder(s) so credentialed stakeholder's mobile computing device(s) or the eTWIST system which could be resident on a local PC, central server system, work station, tablet, laptop, smartphone or similar computing device. The first responder or so credentialed stakeholder would scan each evidence tags respective machine readable indicia affixed to the piece(s) of evidence or evidence container(s), or enter the respective evidence tag identifier by other means such as through an RFID scan, Bluetooth, Smart tag, voice entry or keystroke entry. Subsequently, each entered respective SAK evidence tag and its contents are respectively acknowledge and accepted by the first responder or so credentialed stakeholder for some or all of the inputted SAK(s) and their contents thus the chain of custody is maintained between the previous legally responsible party(s) and the newly legally responsible first responder(s) or so credentialed stakeholder.

The transfer function may provide for the "global" transfer of one or more SAK(s) and its contents as a whole or "globally" by scanning or entering an incident number, case number, or other respective individual SAK common identifier(s). This function describes and represents the hierarchical relationship whereby the scanning or entering of a respective incident number, case number or other respective individual SAK common identifier(s) transfers the chain of custody and thus the responsibility of the SAK(s) and/or its respective content(s) to the so credentialed receiving party(s).

Any and all relevant data from the eTWIST system that has been uploaded into the healthcare providers' backend system, whether the data has been edited, changed, amended, or altered, may be pushed to the eSAFE database as such relevant changes or edits occur or as established protocols describe. A similar action will occur from first responder(s)' perspective; as edits and/or changes may occur within a first responder and/so credentialed stakeholders eTWIST version, if available, whereby relevant data may be pushed to the eSAFE database as well, as established protocols describe.

Independently, it would be possible and perhaps encouraged, that stakeholders share data from their respective eTWIST systems to a host of other backend systems, including but limited to, Laboratory Information Management Systems (LIMS), Record Management Systems (RMS), Case Management Systems, not connected to the eSAFE, however such not yet definitively identified and presumable disjointed in nature, systems, would have to be configured to interface with eTWIST and/or eSAFE.

Furthermore, an alert(s) may be set at any time within the eSAFE and/or eTWIST system, to occur at a future time and date. Such alert(s) may be directed to 1 or more than one (1) individual, with a required response or no required response, to alert the respective party(s) of a specific action(s) set to occur on or before the designated time/day. Such alert(s) may be set to automatically escalate to the next appropriated member in the chain and/or any other so credentialed stakeholders, if after a determined time/date a specific response(s) or action(s) were not acknowledged by the recipient(s). Such escalations may continue as directed by command and control protocol or other legislative or directed protocol. Given the alerted recipients level of rights, privileges or authorization the recipients may or may not be able to view the complete history of the Case or Incident.

eSAFE™ Web-Based Online SAK Management System

A centralized system having at least one server and database that maintains operative communication (3314) with computerized systems such as, but limited to, computerized evidence management systems (CEMS), computerized judicial management systems (3312), computerized case and/or records management systems, computerized advocate case and/or records management systems, and/or computerized healthcare management systems. The centralized system may also communicate with LEO/A mobile units and/or provide a web-based interface for access by stakeholders who may otherwise have a need to access and/or use the centralized system, such as, but not limited to, victims, sexual assault survivors, advocates, healthcare providers, SAK component manufacturers and/or assemblers, aka, Product Participants, LEAs and judicial entities that may or may not have a CEM system. The centralized system is generally referred to as an electronic Sexual Assault Forensic Exam or (eSAFE™) system. The eSAFE system can correlate and/or otherwise map information from different frontend and/or backend CEM systems, such as, but not limited to, eTWIST. Although the eSAFE system can be used with all types of evidence, it will be appreciated that the eSAFE system is particularly well suited to the aggregation, management and dissemination of sexual assault evidence that is collected as it relates to Sexual Assaults examinations, and the further prosecution a criminal act(s).

Evidence in a sexual assault case may be collected by LEOs and other law enforcement investigators (I), but sexual assault evidence is also likely to be collected by SANEs. SAKs are the preferred mode of collecting, identifying, documenting, tracking, holding and maintaining sexual assault evidence. Just as LEOs individually identify various pieces of evidence (E) with tags (101) that are placed in evidence containers (102), the SANEs may individually identify pieces of evidence with respective tags that are placed in and/or on a SAK container, vessel, specimen containers including its many and various familial hierarchical related evidentiary components. The SANE may deploy identifiers such as, but not limited to, a unique bar code(s), a RFID label(s)/tag(s), an alpha characters set(s), a numerical character set(s), and/or an alphanumeric character(s) set, consisting of letters and/or numbers and often other symbols (such as punctuation marks and/or mathematical symbols), placed on or in specimen containers and/or its many and various familial hierarchical related evidentiary components, such as, but not limited to, individual specimen containers. The SAKs, specimen containers, and other types of evidence containers help ensure the integrity of the evidence by maintaining the evidence in an environment that avoids contamination. The attachment of the tags to the evidence and/or the containers and corresponding entry of the tag and evidence information into the CEM system helps to maintain the chain of custody of the evidence.

The existence and identification of the tagged evidence (E) is entered into a computer (103) by an investigator (I) or other collector (C), such as, but not limited to, the SANE or healthcare provider. The collector (C) will also provide additional information into the computer (103) to identify the evidence as well as information about the evidence (E) such as, but not limited to, identification information, photos, or observations. Multiple collectors of evidence can and/or may work together, such as an LEO investigator (I) and the SANE, and may also utilize their respective computers (103) and other types of computing devices described below in the collection of additional evidence such as photographic evidence and interpreted evidence which may be connected or unconnected to physical evidence such as, but not limited to, identification of suspects or victims, other notes, or observations. It will also be appreciated that different collectors may be using different collection systems. For example, an investigator may be using eTWIST or some other type of CEM system whereas a SANE could be using the eSAFE system to "push" data to a computerized healthcare management system.

Figure 33A:
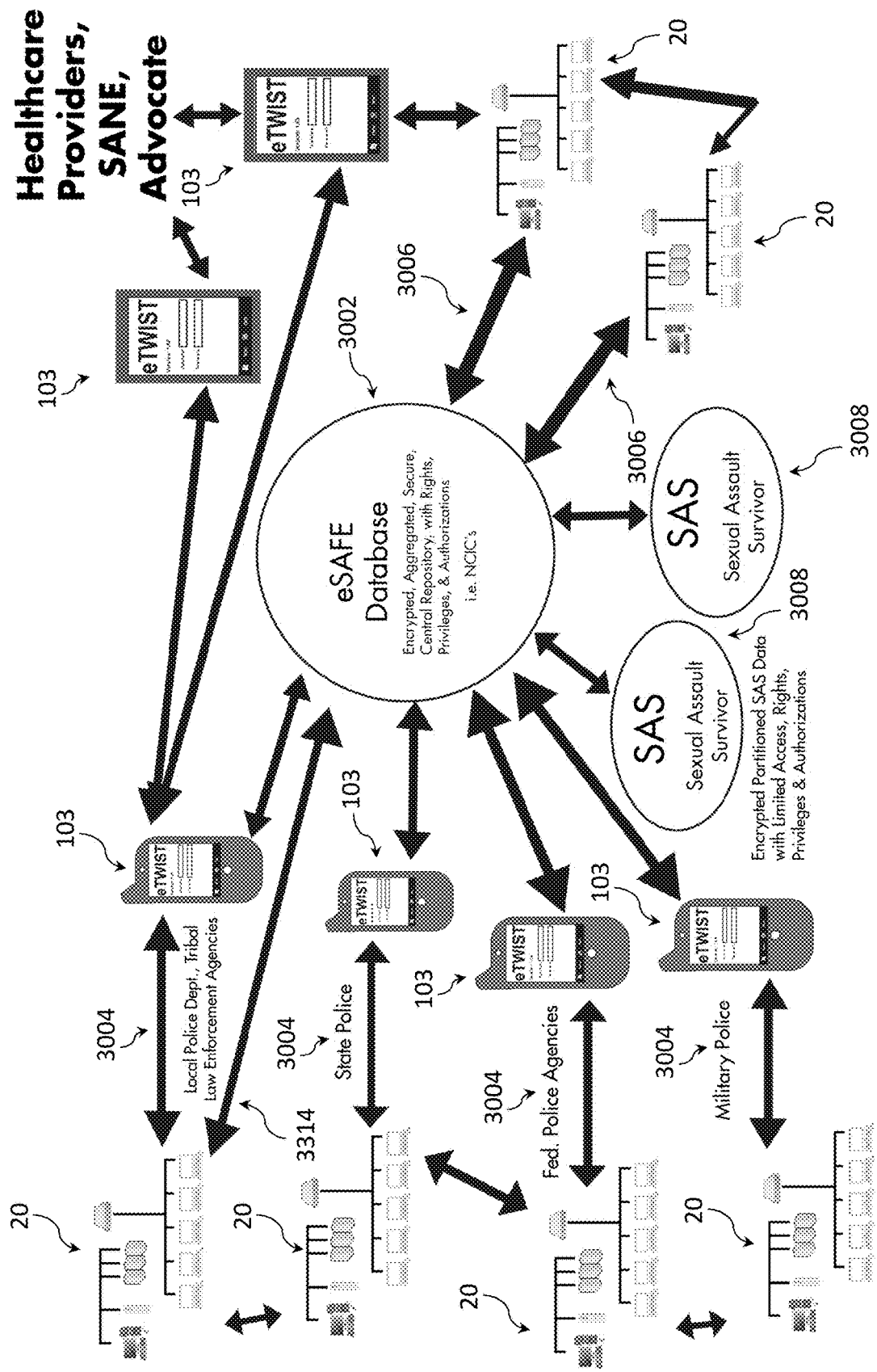
FIGS. 33A and 33B show flow charts of a system for tracking evidence kits with multiple party access.
Figure 33B:
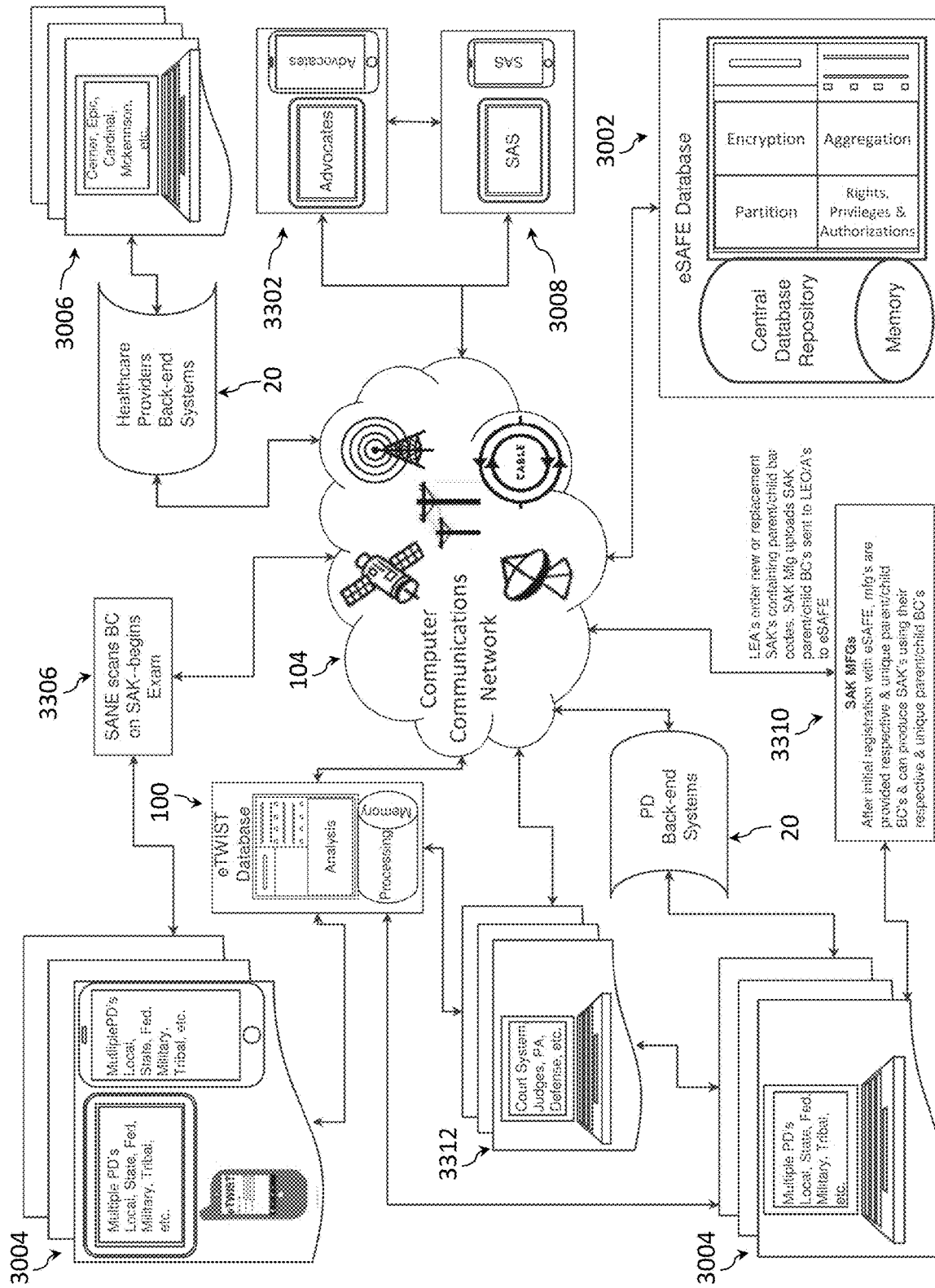
Figure 34:
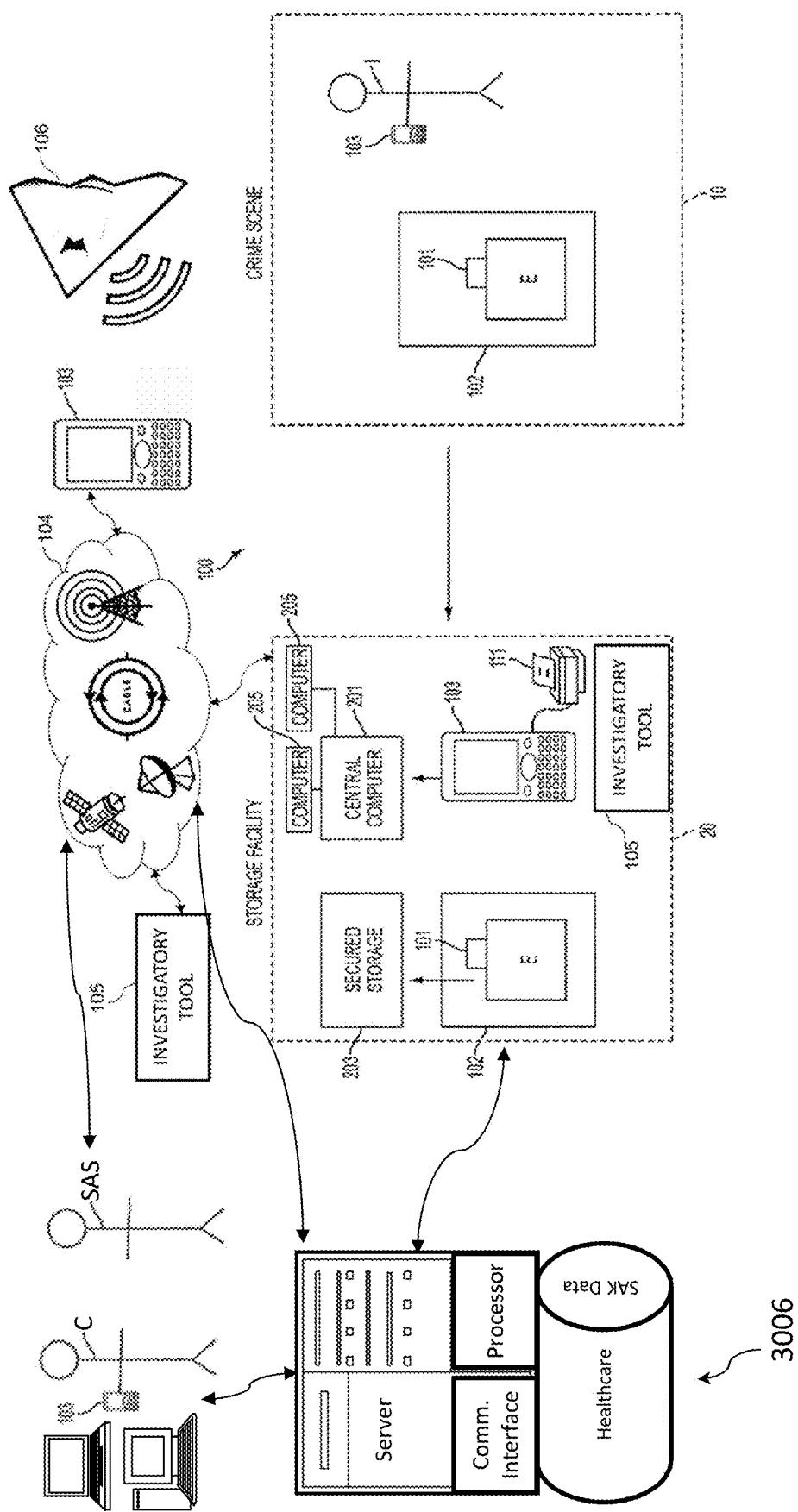
FIG. 34 shows a block diagram of a system for tracking evidence integrated with a healthcare system.

Collectors of evidence may gather pieces of evidence that will be grouped and tracked in association with a single SAK container so it would be beneficial to have a centralized database that can correlate the data from different collection sources that belong to a single SAK its various familial hierarchical related evidentiary components, stakeholders and the respective case. For example, as particularly shown in FIGS. 33A and 33B, information associated with SAK kits can be uploaded to eSAFE database (3002) and the administrator of the eSAFE database will provide the various stakeholders of the system the appropriate, respective rights, privileges and authorizations according to their respective roles and responsibilities. In retrieving information, not only may law enforcement (3004) and healthcare providers (3002) access information, it is also possible to grant other stakeholders such as, but limited to, victims/SAS 3008), guardians, healthcare providers, healthcare backend systems providers and advocates (3302) with limited access to certain information that is associated with their particular cases. In entering information, computing devices (103) such as, but not limited to, a mobile handheld computing device may be used, such as, but not limited to, when LEOs travel to different crime scenes to collect evidence, whereas in other cases, the computer could be in the form of a kiosk, at a location relevant to the transfer of evidentiary material, a laptop or desktop computer, such as for SANEs who typically collect evidence in a central facility, such as but not limited to a hospital or healthcare clinic, and it is possible for data to be entered directly into the eSAFE database by various so credentialed stakeholders and/or entered through data channels of respective backend systems (20) that are accessed by stakeholders of computerized management systems, such as, but not limited to, eTWIST, other CEM systems for law enforcement, advocate systems, legal/judicial and/or computerized healthcare management system for healthcare providers.

In order to establish an unbroken chain of custody, the system will document and track the SAK processes and progress of respective SAK's and the familial hierarchical related evidentiary components of respective SAK from the genesis to disposal. The system will record time and date stamping, establish and provide for a unique consecutive "transaction number" for each and every transaction and occurrence(s) placed into the system. The eSAFE system may provide the option for, according to established legal and/or other protocol driven directive(s), SAK Product Participants (aka SAK manufactures assemblers and/or distributors) of SAK's and the SAK's internal components such as, but limited to; oral Swabs, cotton or other tipped applicators, fingernail scrapings, rectal swabs, hair sample vessels and other types of receptors used in performance of a Sexual Assault Examination, to register within the eSAFE system to obtain respective and unique SAK's DNA identifiers or "license plates" prior to making or providing any and all SAK's, as well as their respective components available for distribution, sale, consumption and/or use in Sexual Assault forensic examinations and/or investigations.

The ability to associate, identify, differentiate, track, record and account for the SAK itself as a singular, respective item would be a major step forward. The coupling of the SAK ID designator (aka SAK credentials or license plate), with the ability to establish familial hierarchical relationships with and between all aspects, stakeholders and/or individuals related to the respective SAK(s), its processes and/or progress, as well as other respectively identified SAK's internal components, could and perhaps would be, considered by many as the most important and valuable part of the Sexual Assault Examination and investigation. As the sum the familial hierarchical relationship between all and/or all respective individuals, stakeholders, processes, components and parts, contain, hold and provide the evidence to convict or exonerate. Thus establishing and maintaining an unbroken chain of custody, transparency and traceability as set by legal or other protocol driven directive(s).

The eSAFE or eTWIST system could by creating, providing, recording and registering a uniquely singular, independent, non-repeating, non-repeatable, respective electronic SAK ID designator (3310), i.e. SAK credentials or SAK license plate, establish accountability and trust for the multitude of connected as well as, but not limited to, disjointed, dysfunctional and/or disconnected systems and/or devices. All SAK ID designator(s), component(s) product ID designator(s) for the respective components of a respective SAK, could or may be generated from and/or will be recorded in the eSAFE system against the respective requestors' ID designator, whether permanent or temporary in nature. Such a SAK ID designator as well all other ID designators generated and/or produced in the systems will be generated, produced and/or replicated in human and/or machine readable indicia form, except "transaction numbers" as describe herein, and/or will include a checksum, (a checksum can be defined as a sum derived from the bits of a segment of computer data that is calculated before and after transmission or storage to assure that the data is free from errors or tampering or a digital fingerprint, which uniquely identifies the original source), and/or other security elements, measures and/or features, either discernable or not by human investigation, for each SAK used or consumed for an examination.

The preferred embodiment would include the established respective eSAFE SAK ID designator and component(s) product ID designator(s) which should be, according to established legal and other protocol driven directives be permanently pre-affixed to all SAK's, as well as permanently affixed to the various respective familial hierarchical related evidentiary components of a respective SAK, provided for in the system. As a practical matter in the protocol driven early adaptor stage, such an undertaking may not be entirely practical and completely available for every instance where a SAK and the respective component of a respective SAK are deployed.

In order to achieve the maximum transparency, traceability, recordability and accountability for all SAKs each SAK according to established legal or other protocol driven directive(s), should contain the uniquely singular, respective, independent, non-repeating, non-repeatable, permanent, affixed SAK ID designator(s). In order to achieve the maximum transparency, traceability, recordability and accountability for all SAKs, a user/stakeholder, generally a SANE or healthcare provider, with pre-established, appropriate, Rights, Privileges and Authorizations, logs into the system using their pre-established respective requestors ID designator, (one such embodiment is described below). The stakeholder may request the eSAFE database to generate a respective SAK ID designator, whereas the system produces, prints or otherwise causes to print, a respective SAK ID designator consisting of a individually, singularly unique machine or human readable indicia. In concert with and using the eSAFE system, said stakeholder associates said requestor ID designator with the eSAFE generated individually, singularly and respective SAK ID designator. Such an association may be achieved/accomplished by such means as, but limited to, scanning the individually, singularly unique machine readable requestor ID designator and the SAK ID designator indicia, or by entering the human readable requestor ID designator and the SAK ID designator indicia by key stroke, a touchscreen, voice, or as may be other common appliance(s) and methods of entering computerized data, into the system, thus establishing the genesis and/or beginning the familial hierarchical relationship(s) of a continuous, unbroken chain of custody between SAK ID designator and its many and various familial related evidentiary components.

As described, the system will track and record every transaction within the system, such as, but not limited to, transactional time and date, the unique and consecutive "transaction number", requestor ID designator, generated SAK ID designator and all other transactions as required by legal and/or other protocol driven directive(s). As the sexual assault examination, continues through its many and/or various stages, related internal components such as, but not limited to, receptors, vessels and/or other collectors are consumed, their contents are uniquely identified and respectively marked such as, but not limited to, by deploying consensus algorithms (consensus algorithms are defined as a process in computer science used to achieve agreement on a single data value among distributed processes or systems.), affixing a unique bar code(s), RFID label(s)/tag(s), alpha characters set(s), numerical character set(s), or an alphanumeric character(s) set provided by the system. As a practical matter in the protocol driven early adaptor stage, such an undertaking may not be entirely practical or completely available for every instance where a SAK and the respective components of a respective SAK are deployed. Such deployments as may be required within a protocol driven directive(s) given period of time, providing for all SAK's, including its many and various related evidentiary components within the SAK should contain a permanently affixed respective SAK ID designator, and SAK component(s) product ID designator(s) thus helping to provide familial hierarchical relationship(s).

For example a component's product ID designator could be described as, but not limited to: (1) Cotton or other Tipped Applicator p/n 12345T or (1) Medium Hair Sample Vessel p/n 23456HV, expressed in human readable and/or machine readable indicia, and could include special characters. Such product ID designator(s) may incorporate markings such as, but not limited to, 1D/Linear bar codes, 2D bar codes, RFID tags/labels, alpha characters set(s), numerical character set(s), and/or an alphanumeric character(s) sets or special characters for each and every component, single and/or multiple evidence vessels/specimen containers establishing and/or continuing familial relations within and/or respective to a respective SAK(s)

The SAK ID designator along with, but not limited to, previously associated respective components and/or items within the SAK, including any and all other transactions occurring in eSAFE and eTWIST software system will be encrypted or logged with a time and date stamp respective to the known credentialed stakeholder. Additionally, a transaction identifier consisting of a consecutive ID number and known credentialed stakeholder ID, where such identifier(s) may additionally consist of, but not limited to, perhaps consensus algorithms, blockchains, prefix(s), suffix(s), alpha, numeric, alphanumeric, special symbol(s) and/or character(s), checksum, and/or other combined and singular identifiers, such as, but not limited to, eSAFE and eTWIST software license ID, eSAFE and eTWIST "foreign" transaction ID(s), eSAFE and eTWIST account ID(s). Such identifier(s) may, but not limited to, be in the form of a "hashed" identifier(s), perhaps deploying consensus algorithms. The transaction identifier should be calculated, configured, produced, assigned and/or generated by eSAFE and/or eTWIST databases as applicable. The transaction identifier is designated to indicate the history and/or order and/or place in "time" in which a piece of evidence and a transaction were entered, populated and/or occurred in eSAFE and/or eTWIST systems, and will be respectively assigned, to the transaction. One embodiment could be, but not limited to, perhaps deploying consensus algorithms for all transactions that occur in eSAFE and/or eTWIST. Another embodiment of a transaction number could be, but not limited to, XXXX1XXXX, the next transaction could be number XXXX2XXXX, the next transaction number could be XXXX3XXXX, continuing to increment indefinitely.

Given the manner in which data transactions occur in databases and/or systems such as, but not limited to, eSAFE and eTWIST, once a respective transaction ID is established, generated, assigned, configured, and calculated in eSAFE and/or eTWIST, such a respective transaction ID is near impossibility to be duplicated by either respective system, and/or in either respective system by so credentialed stakeholders of either respective system. A standard log in procedure for all Permanent ID and Temporary ID status holders should be set.

Example 1: Stakeholder Requesting Permanent ID Status and Credentials

A Permanent Requestor, as established by legal and/or other protocol driven directive(s), is an entity requesting Permanent ID Status within the eSAFE system. Such an entity as established by legal or other protocol driven directive(s), can be generally regarded as, but not limited to, SAS, a SANE, a healthcare provider, a first responder, a LEO, an Advocate, any branch of the Military or any authorizing body. An authorizing body is generally regarded as, but not limited to, any legally recognized Federal, State, Local, Tribal or other governmental office holder(s) or official(s), any legally recognized Private, Federal, State, Local Crime lab(s), any legally recognized healthcare provider(s) or facility, any legally recognized healthcare backend systems provider(s), any legally recognized Federal, State, Local, Tribal or Military official, or SAK Product Participants/Manufactures or assemblers, and component manufactures or assemblers each requesting Permanent ID Status and Credentials. Such credentialing provides and/or acknowledges accessibility into the system.

One example of legal or other protocol-driven initial system registration criteria to become a registered requestor having a permanent ID could be, but not limited to, as described below. As a general and practical rule, it should be expected that all or most of the requested requestor information should be completed. Minimally those fields indicated by * should be completed for accurate and unbroken Chain of Custody reporting and tracking within eSAFE.

1. What is your primary role, Select One (perhaps by deploying, such as, but not limited to, one of the following: a drop down menu, manual entry, and/or voice driven menu type selection and/or as may be directed by legal and/or other protocol driven directive(s))*
    a. SAS
    b. SANE
    c. Guardian
        i. Guardian Full Name*
        i. Guardian Full Address*
    d. First Responder
    e. LEO
    f. Advocate
    g. Federal, State, Local, Tribal or other Government Official
    h. Military Official
    i. A Legally recognized Private, Federal, Local or State Crime lab
    j. SAK Product Participants
    k. Package Delivery Service and Company
    l. Healthcare Backend Systems Provider
    m. Other, please describe in detail: _____
2. Requestors Full Name*
3. Email—work and/or private*
4. Mobile phone number*
5. Desk Phone number with extension if applicable, (Must Provide if NO Mobile or Cell Number)
6. Affiliation or Employer*
7. Complete Affiliation or Employer Address*
8. PKI—Public Key Infrastructure* (or other trusted root certificate) System provided The stakeholder applying for or requesting Permanent ID Status would be asked to select either a text, email or a return phone call from the system to the cell number or other singularly unique address of the Permanent ID Status requestor that has been provided in the registration process to receive a Permanent ID Status designator.

The stakeholder(s) of a successful registration of a Permanent ID status, having been so duly authorized, with established and properly authorized credentialing for use of the within the eSAFE system, will be sent from the system, a singular, unique, respective, random, and non-repeating Permanent ID designator. Which could consist of, but limited to, alpha characters, numeric characters, alpha-numeric characters, a checksum, and/or special characters. The eSAFE system using legal and/or other protocol driven directive(s), will send such Permanent ID designator, by means such as, but limited to, text, email, phone call or other type(s) of confirmation(s), notification(s), with further instructions, respective to established legal and/or other protocol driven directive(s), to a singularly unique address such as, but not limited to, the registered or documented email(s) address(es), text address(es) and/or mobile number, or other "address(es)" respective to established legal and/or other protocol driven directive(s), provided by the permanent requestor, during initial requesting application and/or procedure.

The respective text, email and/or phone call, must be responded to and/or otherwise acknowledged by the stakeholder requesting Permanent ID designator status within a time frame and/or period provided for by using established legal or other protocol driven directive(s) or the request of a Permanent ID designator status will be denied from the eSAFE system, and the process must begin anew. All phone calls sent, by the eSAFE system regardless of the response, such as, but limited to, whether the call was received, answered, wrong number, busy signal, recording(s) left in a voicemail, or other electronic recordation device(s) or procedures as may be prescribed per respective, established legal and/or other protocol driven directive(s), should be recorded.

To begin the process anew, as per established legal or other protocol driven directive(s), the Permanent ID designator applicant must wait a given time period to reapply for Permanent ID status. Beginning with the applicants' initial attempt for Permanent ID status and continuing with each and every subsequent request attempt, a recordation and logging of all attempted data entry, including, but limited to, the time and date of all attempts, IP address of the device processing the attempt, the result of the attempt, i.e. success or failure of the attempt and/or why the attempt(s) were made, or as recording procedures may be prescribed and/or detailed by protocol driven directive(s), will be held in the system. The eSAFE system may be set to time out after a protocol driven directive(s) number of failed registration attempts, or a protocol driven directive(s) timeframe. If during or while the applicant is applying and/or attempting to register, for Permanent ID status, the eSAFE system has timed out, no further attempts for reapplication may be made until authorized by a stakeholder possessing Permanent ID Status so duly authorized, having established and properly authorized credentialing for use within the eSAFE system, or as per established legal or other protocol driven directive(s). Exceptions may be made for SAS registrations as prescribe or detailed by legal and/or other protocol driven directive(s).

Example 2: Stakeholder Requesting Temporary ID Status and Credentials

A Temporary Requestor, as established by legal or other protocol driven directive(s), is an entity requesting Temporary ID Status within the system that has not yet received Permanent ID Status and credentials and is eligible to apply for and receive a Temporary ID Status credentials. Such an entity as established by legal or other protocol driven directive(s), would be generally regarded as, but not limited to, a SAS, a SANE, a healthcare provider, a first responder, a LEO, an Advocate, any branch of the Military, SAK Product Participant(s) or any authorizing body. The authorizing body is generally regarded as those jurisdictional authorities and entities as described in Example 1 above and that have not yet received Permanent ID credentials and is eligible to apply for and receive a Temporary ID Status credentials. Accordingly, such credentialing provides and acknowledges Temporary accessibility into the system. The initial registration criteria for Temporary ID Status can follow a similar example as presented for Example 1 above.

The Temporary Requestors are preferably asked to select either a text, email or a return phone call from the eSAFE system to the cell number or contacted or notified by other singularly unique address of the Temporary requestor provided in the registration process to receive a Temporary ID designator. The stakeholder, of a successful registration of a Temporary ID status so duly authorized, with established and properly authorized credentialing for use of the within the system, will be sent, by the eSAFE system, a singular, unique, respective, random, and non-repeating non-registered Temporary ID designator which could consist of, but limited to, alpha characters, numeric characters, alpha-numeric characters, or could include special characters, a checksum, to either the registered/documented email(s) address(s) and/or mobile number, or other singularly unique address provided by the Temporary requestor during initial requesting procedure.

The eSAFE system using legal and/or other protocol driven directive(s), will send to the stakeholder of a successful registration of Temporary Requestor ID Status, by means such as, but limited to, text, email, phone call and/or other type(s) of confirmation(s), with further instructions, respective to established legal or other protocol driven directive(s), to a singularly unique address such as, but not limited to, the registered or documented email(s) address(s) and/or mobile number, or other "address" provided by the non-registered Temporary Requestor, during initial requesting procedure.

The respective eSAFE system text, email or phone call, or other type(s) of confirmation, must be responded to or otherwise acknowledged by the stakeholder requesting Temporary ID status within a time frame and/or period provided for by established legal or other protocol driven directive(s) or the request of a Temporary ID status will be denied, by the system and the process must begin anew. All phone calls sent, by the eSAFE system regardless of the response, such as, but limited to, whether the call was received, answered, wrong number, busy signal, recording(s) left in a voicemail, or other electronic recordation device(s) and/or procedures as may be prescribed per respective, established legal and/or other protocol driven directive(s), should be recorded.

Subsequently, all stakeholders granted Temporary ID status, would be given an additional, as described by legal and/or other protocol-driven directives, a respective time period and frame to perfect their Temporary ID status to a Registered Requestor ID status using their respective Temporary ID designator or be denied participation in the system until further authorized by a stakeholder with Permanent ID Status. As per legal or other protocol-driven directive(s) any entity holding a valid Permanent ID status may be edited or reduced to Temporary ID status by either the holder of the valid Permanent ID status or one holding a System Administer position within the eSAFE system. Said reduction and edit of said status level will be documented by the system, recording time and date stamping for each and every transaction and/or occurrences including the valid Permanent ID credentials executing such status reduction(s) and/or edit(s) placed into the system.

To begin the process anew, as per legal or other protocol driven directive(s), the Temporary ID applicant must wait, as prescribed by legal and/or other protocol-driven directive(s), a given time period to reapply for Temporary ID Status.

Beginning with the initial applicants' attempt for non-registered temporary requestor Temporary ID status and continuing with each subsequent attempt, a recordation or logging of all attempted data, including but not limited to, the time and date of the attempt, IP address of the device processing the attempt, the result of the attempt, success or failure of the attempt or why the request for subsequent attempt(s) was initiated, will be held in the system. It should be expected that the system may time out after a given number of failed registration attempts by a user holding or not holding a respective non-registered temporary requestor ID. If the user holding a respective non-registered temporary requestor ID designator while the applicant is registering or attempting to register, for Temporary ID status, the eSAFE system has timed out, no further attempts for reapplication may be made with the for respective non-registered temporary ID designator Status designation until authorized by registered requestor within the system by a stakeholder with Permanent ID status with appropriate rights, privileges or authorizations within the eSAFE system. Exceptions may be made for SAS registrations as prescribe by or detailed by legal and/or other protocol driven directive(s).

Example 3: Stakeholder Requesting &/or Confirming SAS/Guardian Requestor ID Status One example of a protocol-driven initial SAS eSAFE system registration criteria could be generally regarded as, but not limited to, as described below. Such system registration may be completed by a SAS, a Legal Guardian of the SAS, a first responder, a LEO, a healthcare provider, an Advocate, or an authorizing body, with the acknowledged, prior established written and/or electronically authorized approval of the SAS within the eSAFE system, as per established legal or other protocol driven directive(s). An authorizing body is generally regarded as, but not limited to, any legally recognized Federal, State, Local, Tribal or other governmental office holder and/or official, any legally recognized Private, Federal, State, Local Crime lab(s), any legally recognized healthcare provider(s) or facility, any legally recognized healthcare backend systems provider(s), any legally recognized Federal, State, Local, Tribal or Military official(s), and/or SAK Product Participants/Manufactures or assemblers, and component manufactures or assemblers each holding respective Permanent ID Status credentials. Such credentialing provides and acknowledges accessibility into the system.

As shown in the example below, the legal and/or other protocol driven directive(s) eSAFE initial registration criteria for SAS/Guardian ID Status will likely have some differences from the registration for the Permanent Requestor and the Temporary Requestor. As a general and practical rule, it should be expected that all or most of the SAS/Guardian ID requestor information should be completed. Minimally, those fields indicated by * should be completed for an accurate and unbroken Chain of Custody reporting and/or tracking within the system.

1. What is your role, select all that apply (perhaps by deploying, such as, but limited to, one of the following: a drop down menu, manual entry, and/or voice driven menu type selection and/or as may be directed by legal and/or other protocol driven directive(s))*
    a. SAS
    b. Guardian
        i. Guardian Full Name*
        ii. Guardian Full Address*
    c. Other, please describe in detail: _____
2. Survivor's Full Name*
3. Survivors Full Address
4. Survivors/Guardian's Email—work or private if self-employed
5. Survivors/Guardian's Mobile phone number*
6. Survivors/Guardian's Desk Phone number (Must Provide If NO Mobile or Cell Number)
7. Survivors/Guardian's PKI—Public Key Infrastructure* (or other trusted root certificate) System provided after initial successful registration Additionally, all SAS/Guardian requesters would be asked to select either a text, email or a return phone call from the eSAFE system to the cell number or other singularly unique address of the SAS requestor provided in the registration process to receive a SAS/Guardian ID designator. The stakeholder, of a successful registration of a SAS/Guardian ID status so duly authorized, with established and properly authorized credentialing for use of the within the eSAFE system, will be sent, by the system, a singular, unique, respective, random, and non-repeating registered SAS ID designator which could consist of, but limited to, alpha characters, numeric characters, alpha-numeric characters, and/or could include special characters, a checksum, to either the registered/documented email(s) address(es) and/or mobile number, or other singularly unique address provided by the SAS/Guardian requestor during initial requesting procedure.

The eSAFE system using legal or other protocol driven directive(s), will send to the stakeholder of a successful registration of SAS/Guardian Requestor ID Status, by means such as, but limited to, text, email, phone call or other type(s) of confirmation(s), with further instructions, respective to established legal and/or other protocol driven directive(s), to a singularly unique address such as, but not limited to, the registered or documented email(s) address(es) or mobile number, or other "address" provided by the SAS/Guardian Requestor, during initial application or requesting procedure(s).

The respective eSAFE system text, email or phone call, or other type(s) of confirmation, must be responded to or otherwise acknowledged by the stakeholder requesting SAS/Guardian ID status within a time frame and/or period provided for by established legal and/or other protocol driven directive(s) or the request of a SAS/Guardian ID status may be denied, by the system and the process must begin anew. All phone calls sent, by the eSAFE system regardless of the response, such as, but limited to, whether the call was received, answered, wrong number, busy signal, recording(s) left in a voicemail, or other electronic recordation device(s) or procedures as may be prescribed per respective, established legal or other protocol driven directive(s), should be recorded.

The eSAFE system will provide a unique checksum ID tied to the SAS/Guardian established respective designator ID(s). Such security credentialing must be respective and unique to the individual user, and should change, evolve, morph, or otherwise manifest itself into a different set of unique respective credentials over a given period of time that are not repeatable again for a further given period of time, as may be directed by legal or other protocol driven directive(s)

In one embodiment a survivor, aka, SAS is identified, either by contacting stakeholder(s), such as, but not limited to, a first responder, a LEO, a healthcare provider, a SANE, or an advocate by simply dialing a unique set of alpha characters, numeric characters, and alpha-numeric characters which also could include special characters, i.e. #511, or perhaps 1-800-HELP-4ME, or by accessing the system website or a respective SAS mobile app for help.

When a SAS accesses the eSAFE system for help, the system itself could alert, stakeholder(s), such as, but not limited to, first responder(s), LEO/A(s), healthcare provider(s), SANE(s), or Advocate(s) in their area, in a number of different manners. For example, such as, but not limited to, simply clicking on a radio button on the system website or mobile app such as "HELP 4ME", which could notify, alert and connect to a pre-determined first point of contact, such as but not limited to, a family member of all types and descriptions, friend(s), teacher(s), guardian(s) and/or interface with a PSAP (Public Service Answering Point), or perhaps a localized CAD/RMS systems linked or interfaced with the system, identifying, alerting and directing, precise, pre-determined, first responder(s), LEO(s), healthcare provider(s), SANE, and/or the advocate(s) or any other so deemed responsible party(s) by legal or protocol driven directive(s) nearest to the distress call location based on PSAP or GPS locating of on the SAS mobile device, IP address, the SAS providing a phone number, or a simply providing their actual location into the systems, are a few of potential examples.

It should be expected the physical responses of the respective stakeholders such as but not limited to, first responder(s), healthcare providers, Advocates will be driven according to legal or respective protocol driven directive(s). The system could provide an alert back to and/or advise the SAS that their pre-determined first point of contact(s), first responder(s) and any other so deemed responsible party(s) by recognized legal or protocol driven directive(s) have been notified of the situation, received the request for help/assistance and are dispatched, and perhaps provide an ETA. The system could provide a protocol driven directive(s) list of next steps, or offer a simple selection to request that an advocate or first responder and/or any other so deemed responsible party(s) recognized by legal or protocol driven directive(s) contact the SAS via outlets such as, but limited to, voice, email and text, or provide instructions on what to do and not do including localized/regionalized SAK protocols.

In the first embodiment, once the SAS and the SANE, who is so duly authorized, with prior established and properly authorized credentialing for use of the eTWIST and/or eSAFE systems, are united, using the eTWIST software resident on, but limited to, the SANE's Mobile Computing Devices, Smartphones, PC's, Tablets, Phablets, Laptops, Kiosks, Mobile Data Terminals and/or Work Stations/Terminals, Central Server(s) and connecting to the web based eTWIST software, the SANE would begin the sexual assault examination process according to established protocols, such as, but not limited to, logging in to eSAFE and requesting a SAK ID designator, interviewing the SAS, collecting, documenting, identifying, photographing, logging, tracking all relevant sexual assault kit evidence and continuing until the completion of the examination.

Per established SAK and legal protocol driven directive(s), a first responder(s) or an advocate(s) may also be required to interview the SAS, collect, document, identify, photograph, log, and track any additional crime scene evidence and data using the eTWIST software resident on, the first responder(s) or an advocate(s) devices such as, but limited to, Smartphones, Mobile Computing Devices, Smartphones, PC's, Tablets, Phablets, Laptops, Kiosks, Mobile Data Terminals and/or Work Stations/Terminals.

Upon completion of the examination, SAK protocols, legal or protocol driven directive(s) some or all of the stakeholders and investigators, so duly authorized, with prior established and properly authorized credentialing for use of the eTWIST and/or eSAFE systems, such as but limited to, First Responders, SANE and an Advocate may upload all relevant sexual assault data into their respective backend systems, if applicable, while also in near-real time uploading all relevant data into the eSAFE and/or eTWIST backend systems.

Respective to Military, Federal, State, Local, Tribal and International laws and statutes, such data may or may not contain SAS personal identifiable information (PII), according to legal and/or protocol driven directive(s).

As directed by the respective C2 (Command and Control) designated evidence transfer protocols, legal or protocol driven directive(s), using the transfer function of the eTWIST and/or eSAFE software on stakeholders such as, but not limited to, a first responder, a LEO/A, a healthcare provider, a SANE, package delivery companies and service(s), and an advocate's Mobile Computing Devices, Mobile Data Terminals, Smartphones, PC's, Tablets, Phablets, Laptops, Kiosks and Work Stations/Terminals, or by accessing a Central Server(s) and connecting to the web based eTWIST and/or eSAFE software, the SANE or other credentialed, applicable user(s) may transfer the SAK(s) and their contents or other familial relations, such as, but not limited to, singular and multiple evidence vessels/specimen containers to a designated storage location(s), and to the respective first responder(s), other respective or credentialed transfer recipient(s), location(s) and point(s).

The unbroken chain of custody continues by the transferring party(s) and the receiving party(s) using the transfer function of the eTWIST and/or eSAFE software resident on a mobile computing device(s) or the web based eTWIST and/or eSAFE system, which could be access through and using device(s) such as, but limited to, Central Server(s), a local PC, work station/terminal, tablet, phablet, laptop, smartphone, mobile data terminals, kiosks or similar computing device(s)/system(s). The transfer process begins by the responsible, current and registered owner, with prior established and properly authorized credentialing, within eTWIST and/or eSAFE system, of the item(s) desiring to be transferred, logging into the eTWIST and/or eSAFE system and proceeding to the transfer section.

A current owner is defined as a person(s) or entity(s) having the appropriate Rights, Privileges and Authorities within the eTWIST and/or eSAFE system(s), to desire transferring "ownership" meaning legal responsibility of the respective item(s) from the current ownership and location to the next or subsequent ownership and location(s). It should be noted the current owner may or may not be yet involved in the SAK process.

The transferring party(s) may scan the SAK and the respective evidence vessel(s) machine readable indicia or each respective machine readable indicia affixed to the piece(s) of evidence, or enter by other means, i.e. RFID tag/label scan, Bluetooth data transfer, Smart tag scan, by voice or keystrokes entries, for each human readable indicia of the SAK(s) and its contents respectively, whereby acknowledging the desire, authority, right, privilege and willingness to transfer said item(s), and input the reason why such a desire exists to transfer some or all of the SAK(s). If the transfer function is desirous to simply move the SAK(s) and respective contents to a new location but not to transfer ownership, the current owner, person(s), stakeholder(s) and entity(s) simply notes the respective new location(s) and point(s) within the transfer process function within the eTWIST and/or eSAFE system. Such transfer process/protocol(s) may be repeated, as may be described by established SAK or legal protocol driven directive(s), with each and every subsequent movement of the SAK and respective pieces.

Should the desire for a transfer be to convey "new ownership" as described above, the receiving party(s), with prior established and properly authorized credentialing, must log into the eTWIST and/or eSAFE system proceed to the Transfer Function and transfer all or some portion of the SAK(s) or item(s)/component(s) requesting transfer to the receiving party(s). The responsibility for some or all of the inputted SAK(s) and their contents, remain the responsibility of the Transferring Party(s) until the so duly credentialed receiving Party(s) logs into the eTWIST and/or eSAFE system and accepts the responsibility from the previous responsible party(s), point(s) or location. Whereby the Receiving Party(s) is now recognized as in possession and trust, continuing and maintaining the chain of custody. Such transfer process/protocol(s) may be repeated, as may be described by established SAK and/or legal protocol driven directive(s), with each and every subsequent movement of the SAK and/or respective pieces.

The transfer function may provide for the "global" transfer of one or more than one SAK(s) and its contents and component(s) as a whole or "globally" by scanning or entering a respective ID designator such as, but not limited to, an incident number, case number, component(s) product ID designator(s), SAK ID designator(s), and other respective ID designator(s), and/or as may be described by established SAK or legal protocol driven directive(s). This function describes and represents a familial hierarchical relationship whereby the scanning or entering of a respective incident number, case number or other respective individual SAK common identifier(s) transfers the Chain of Custody and thus the responsibility of the entire SAK(s) and its contents to the receiving party(s), location(s) or point(s), as may be described by established SAK and/or legal protocol driven directive(s). Such transfer process/protocol(s) may be repeated, as may be described by established SAK or legal protocol driven directive(s), with each and every subsequent movement of the SAK and/or respective pieces.

In a second embodiment where the eTWIST software system is not in place, active or for other reason(s), unavailable to a LEO(s), a first responder(s), an advocate(s), and the SANE. The SAS and the SANE are united as in the first embodiment and the SANE would begin the sexual assault examination process of interviewing the SAS, collecting, documenting, identifying, photographing, log, tracking all relevant sexual assault kit evidence and continuing until the completion of the examination according to historical healthcare protocols or as may be described by established SAK or legal protocol driven directive(s).

Per established SAK or legal protocol driven directive(s), a LEO(s), a first responder(s), and an advocate(s) may also be required to interview the SAS, collect, document, identify, photograph, log, or track any additional crime scene evidence and data according to historical LEO, first responder protocols or training and an advocate(s) historical healthcare protocols and/or as may be described by established SAK or legal protocol driven directive(s). Such processes as described in the first and/or the second embodiment, should/may be repeated, as may be described by established SAK or legal protocol driven directive(s), continuing with each and every subsequent movement of the respective SAK(s), its respective contents, pieces, single and multiple evidence vessels and specimen containers, whereby establishing familial hierarchical relationships.

Upon completion of the SAK examination, and according to SAK and/or as described by legal protocol driven directive(s), some or all of the investigators, such as, but not limited to, LEO(s), First Responders, a SANE(s), and/or an Advocate(s) may upload or input all or some of the relevant sexual assault data into their respective backend systems, through various means such as, but not limited to handwriting preprinted SAK forms then scanning the documents into PDF or other document saving protocols/format, or perhaps by using keyboard entry of data into a pre-determined formats, perhaps into a healthcare providers backend system. Such respective backend systems would upload all relevant and legally allowable data into the system and, if available for use, into respective eTWIST systems as well.

As established and directed by legislation or C2, aka Command and Control, protocols, as data is uploaded and input into the eSAFE system all relevant allowable data would be transferred, uploaded, or otherwise conveyed to the respective LEA's, Healthcare providers, Advocates or other so legally directed backend system(s) at near real-time or as communication protocols would commonly allow. Respective to Military, Federal, State, Local, Tribal and International laws, such data may or may not contain SAS personal identifiable information, (PII) which may or may not be accessed without SAS authorization according to legal and/or protocol driven directive(s).

Upon each successful data function, the eSAFE and/or eTWIST system will record relevant data. Such data may contain, but is not limited to: Audio, Video, Photographic or other types of recordations, the time and date of transfer, the geo-location of the transfer, the requestor(s) ID designator responsible for the transfer, the individual(s) receiving the transfer ID designator, to and from of the physical location(s) of transferred SAK and other evidence, the reason for the transfer, SAK(s) with ID designator(s), SAK component(s) product ID designator(s), as recognized by the respective human readable and/or machine readable indicia, SAS designator ID, all associated checksum designator(s), (a checksum can be defined as a sum derived from the bits of a segment of computer data that is calculated before and after transmission or storage to assure that the data is free from errors or tampering or a digital fingerprint, which uniquely identifies the original source), all relevant data from a Laboratory Information Management System (LIMS) and/or other relevant data as may be deemed necessary by legal or other established protocol, thus maintaining the Chain of Custody and providing the authorized SAS or otherwise authorized user(s), such as but not limited to, prosecuting attorneys, legislative bodies, advocates and/or law enforcement officials, with a transparent and timely depiction of the status of respective SAK(s) and single or multiple evidence vessels and specimen containers having established familial relationships.

Any and all relevant data from the system or any/all similar, dissimilar, connected, disjointed, independent databases, PC's, Tablets, Phablets, Laptops, Kiosks, Work Stations/Terminals, Mobile Computing Devices, Mobile Data Terminals and the IoT, that has been uploaded into the healthcare providers', respective LEA's, Investigative, Advocates or other so legally directed backend system(s), such data whether it has been edited, changed, amended, altered, or not, may or can be pushed to the system database as such relevant changes and/or edits occur and/or as established protocols describe.

A similar action could occur from first responder(s) perspective; as edits and/or changes occur with either the First Responder eTWIST version, or some other first responder data base system, relevant data may or can be pushed to the eSAFE system database as well, as established protocols describe. Again providing all authorized SAS or users with accessible, accurate, timely and transparent depiction of the status of their respective SAK.

Independently, first responders or others so duly authorized, may share data from their respective eTWIST or backend data repository systems, to a host of other backend systems. Including but not limited to, a Laboratory Information Management System (LIMS), Record Management Systems (RMS), Case Management Systems (CMS), connected to the eSAFE. However such not yet definitively identified and presumable disjointed in nature, systems, would have to be configured to interface with eSAFE.

Furthermore, an alert(s) may be set at any time within the eSAFE and eTWIST system, to occur at a future time and date. Such alert(s) may be directed to (1) or more than one (1) individual, with a required response or no required response, to alert the respective party(s) of a specific action(s) set to occur on or before a designated time and day. Such alert(s) may be set to automatically escalate to the next appropriated member in the chain of command or anyone else so authorized by legal and/or protocol driven directive(s), if after the pre-determined prescribed time and date such specific response(s) or action(s) were not acknowledged by the recipient(s). Such escalations may continue as directed by C2, legislative or other legal or protocol driven directive(s). Given the alerted recipients level of rights, privileges or authorization, the recipients may or may not be able to view the complete history of the Case or Incident.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, it will be appreciated that multiple jurisdictions could be operating different CEM systems, most of which will likely have a familial hierarchical relationship of the evidence data such as with the eTWIST system, and the eSAFE system according to the present invention could import limited non-hierarchical data from each one of the CEM systems which relate to the status of a sexual assault investigation and the processing of the SAK without importing the data for the corresponding pieces of evidence that are stored in the CEM systems in the familial hierarchical relationship. Accordingly, although eSAFE system can preferably store data for multiple pieces of evidence in a familial hierarchical relationship, it will be appreciated that it is not necessary for every implementation of the eSAFE system to store the data for multiple pieces of evidence so the familial hierarchical relationship may not be required. Thus, the breadth and scope of the present invention should not be limited by any of the above-described exemplary embodiments, but should be defined only in accordance with the following claims appended hereto and their equivalents.

What is claimed is:

1. A system for tracking evidentiary materials from remote locations, comprising:
    a plurality of evidence tags, wherein each of the evidence tags is comprises of an evidence tag identifier with machine readable indicia, wherein the evidence tags are designed to be attached to the evidentiary materials;
    a first set of evidence containers for holding a first set of the evidentiary materials with a rst set of the evidence tags attached to the first set of evidence containers for the evidentiary materials, wherein a second set of the evidence tags are attached directly to a second set of the evidentiary materials;
    a plurality of evidence kit containers having a set of unique evidence kit container identifiers corresponding with each of the evidence kit containers, wherein the first set of evidence containers are stored within a first evidence kit container having a first identifier from the unique evidence kit container identifiers, wherein the set of unique evidence kit container identifiers are comprised of a corresponding set of unique machine readable indicia, and wherein none of the evidence kit containers has a computer processor device;
    a central server;
    a central database, wherein the central database is configured within the central server, wherein the central database comprises a plurality of electronic records corresponding with the evidentiary materials, wherein the database has a hierarchical relationship between the first set of evidence containers and the first evidence kit container, and wherein the hierarchical relationship is comprised of a first set of correlations in the central database between each evidence tag identifier for the first set of evidence tags and the first identifier;
    a computing device in operative communication with the central server, wherein the computing device is separate from the evidence kit containers, wherein the computing device is comprised of a computer processor, a memory, a display screen, and a data entry device, wherein the data entry device is at least one of a camera module, a microphone, and a user input device, and wherein the evidence tag identifier is entered into the computer processor through a scan of the machine readable indicia by the data entry device for each one of the evidence tags attached to the evidence containers and the evidentiary materials; and
    a plurality of system user accounts, wherein the plurality of system user accounts are comprised of a set of custodial accounts and a set of victim accounts, wherein the system user accounts are configured to have a plurality of system user permissions, wherein the system user permissions are comprised of a set of custodial permissions and a set of victim permissions, wherein the system user permission is configured to provide an access to a set of evidence entries in the electronic records stored on the central database through the computing device, wherein the access is comprised of a query access for all system user accounts, a read-write access for the custodial accounts, and a read-only access for the victim accounts, wherein the set of evidence entries is comprised of a plurality of evidentiary information, a set of evidence tag identifiers for the plurality of evidence tags, and at least one of the evidence kit container identifiers, and wherein the set of evidence entries is transferred from the computing device to the central database for storage in corresponding electronic records.

2. The system of claim 1, wherein the read-write access is configured to allow the system user accounts with custodial permissions to input the set of evidence entries into the central server through the computing device, and wherein the read-only access is configured to prevent system user accounts with victim permissions from inputting the set of evidence entries into the central server.

3. The system of claim 1, further comprising a second set of evidence containers stored in the evidence kit containers, wherein the first set of evidence containers are comprised of a plurality of fixed-size specimen containers, wherein the second set of evidence containers are comprised of an expandable vessel, wherein the expandable vessel has an expanded volume greater than a space within the evidence kit containers, and wherein each one of the evidence kit containers is solely used for a single case.

4. The system of claim 1, further comprising a set of evidence container identification labels attached to a corresponding set of the evidence kit containers, wherein the evidence container identification labels a further comprised of a corresponding set of machine readable indicia for the evidentiary materials in the respective evidence kit containers, wherein an item of evidence in the second set of the evidentiary materials is held in the expandable vessel, wherein the item of evidence inside the expandable vessel does not fit in the first evidence kit container, wherein at least one of the evidence tags from the second set of tags and one identification label from the set of evidence container identification labels is attached to the expandable vessel, wherein the hierarchical relationship is further comprised of a second set of correlations in the central database between the second set of evidence tags, the one identification label, and at least one of the first set of evidence tags and the first identifier.

5. The system of claim 4, wherein the evidence container identification label is further comprised of the set of machine readable indicia on the second set of evidence tags and a corresponding list of human readable indicia respectively associated with the set of machine readable indicia, wherein each evidence tag identifier uniquely corresponds with each one of the corresponding evidence tags, and wherein the human readable indicia are comprised of an alphanumeric representation of the evidence tag identifier and a description of the corresponding evidentiary materials.

6. The system of claim 1, further comprising an evidence index configured within the central database, wherein the evidence index is comprised of the evidence entries, the system user accounts, a progress report, a process, an evidence kit container status, and the hierarchical relationship, wherein the evidentiary information in the evidence entries is comprised of at least one of a description of the evidence and a photograph of the evidence, and wherein the evidence kit container status is automatically updated in the central database according to a chain of custody transfer entry made to the electronic records through the computing device with one of the custodial accounts.

7. The system of claim 1, further comprising a plurality of healthcare management servers in networked communication with the central server, a first set of computing devices in operative communication with the healthcare management servers, a plurality of evidence management servers in networked communication with the central server, and a second set of computing devices in networked communication with the evidence management servers, wherein each one of the computing devices further comprises a corresponding one of the computer processor, the memory, the display screen, and at least one of the camera, the microphone, and the user input device, wherein the get of evidence entries is entered into the computer processor through the data entry device and is communicated to at least one server of the healthcare management servers and the evidence management servers, wherein each one of the evidence entries are at least one of the scan of the machine readable indicia through the camera module and interpreted by the computer processor, a voice entry of an alphanumeric representation of the evidence tag identifier through the microphone and translated by the computer processor through a speech-to-text conversion, and a touch entry of the alphanumeric representation though the user input device, and wherein the one server communicates the set of evidence entries to the central to the central server for storage in corresponding electronic records.

8. The system of claim 1, wherein each one of the plurality of user accounts further comprise a unique user identifier, wherein the central database correlates the unique user identifier with the user account, wherein the unique user identifier is saved within the electronic records corresponding with the set of evidence entries for a set of cases, wherein each one of the evidence kit containers corresponds uniquely with one case in the set of cases, wherein the unique user identifier is communicated from the computing device to the central server, and wherein the computing device receives from the central server a set of the electronic records for the set of cases associated with the unique user identifier in the central database.

9. The system of claim 8, wherein the unique user identifier is for at least one of the custodial accounts, the victim accounts, and another non-custodial account, wherein the unique user identifier for one of the custodial accounts is associated with at least one of a law enforcement officer and a sexual assault nurse evaluator and the electronic records received from the central server are for a first set of active cases, wherein the unique user identifier for one of the victim accounts does not include any personally identifiable information and is associated with victim biographical information in one or more of the cases and the corresponding electronic records are received from the central server, and wherein the user identifier is for at least one of a non-custodial victim advocate, a non-custodial prosecuting attorney, and a non-custodial defense attorney and the electronic records received from the central server are for a second set of active cases.

10. The system of claim 1, wherein the hierarchical relationship is further comprised of a second set of correlations between the first identifier and a case identifier corresponding to a set of cases, wherein the computing device is a handheld computer for a law enforcement officer with one of the custodial accounts in networked communication with the central server, wherein a set of the electronic records are stored in the memory of the handheld computer for at least one case in the set of cases, wherein a search term is entered through the user input device of the handheld computer, wherein the computer processor performs an internal search of the memory for the search term, wherein the handheld computer ends the search term to the central server in an external search request, wherein the computer processor receives at least one of an internal search result and an external search result from the central server for the search term, and wherein the handheld computer provides on the display screen at least one of the internal search result and the external search result.

11. A system for tracking evidentiary materials within an evidence kit from remote locations, the system comprising:
- an evidence kit container having a unique evidence kit container identifier, wherein the unique evidence kit container identifier is comprised of at least one of a first machine readable indicia and a first human readable indicia, and wherein the evidence kit container does not have a computer processor device;
- a set of evidence container for holding evidentiary materials, wherein the set of evidence containers is stored within the evidence kit container;
- a plurality of evidence tags, wherein each of the evidence tags is comprised of a second machine readable indicia, wherein the second machine readable indicia is an evidence tag identifier uniquely corresponding with at least one of the unique evidence kit container identifier and each one of the corresponding evidence tags, wherein the evidence tags are designed to be attached to at least one of the evidentiary materials and the set of evidence containers;
- a central server;
- a central database, wherein the central database is configured within the central server, wherein the central database comprises a plurality of electronic records corresponding with evidentiary materials, wherein the electronic records comprise the corresponding unique evidence kit container identifier and at least one of a victim name and a victim identifier, wherein the central database correlates at least one evidence tag identifier for a set of the evidence tags corresponding with the unique evidence kit container identifier;
- a computing device in operative communication with the central server, wherein the computing device is separate from the evidence kit container, wherein the computing device is comprised of a computer processor, a memory, a display screen, and a data entry device, wherein the data entry device is at least one of a camera module, a microphone, and a user input device, and wherein the unique evidence kit container identifier and the evidence tag identifier are entered into the computer processor through scans of the machine readable indicia by the data entry device for the evidence kit container and each one of the evidence tags attached to the evidence containers and the evidentiary materials, respectively; and
- a plurality of system user accounts each comprising a unique user identifier, wherein the plurality of system user accounts are comprised of a set of custodial accounts and a set of victim accounts, wherein the system user accounts are configured to have a plurality of system user permissions, wherein the system user permissions are comprised of a set of custodial permissions and a set of victim permissions, wherein the system user permission is configured to provide an access to a set of evidence entries in the electronic records stored on the central database through the computing device, wherein the access is comprised of a query access for the custodial accounts and the victim accounts, a read-write access for the custodial accounts, and a read-only access for the victim accounts, wherein the set of evidence entries is comprised of a plurality of evidentiary information, a set of evidence tag identifiers for the plurality of evidence tags, and the unique evidence kit container identifier, and wherein the set of evidence entries is transferred from the computing device to the central database for storage in the electronic records.

12. The system of claim 11, wherein the electronic records for each case in a set of cases is further comprised of a unique case identifier, wherein the central database correlates the unique case identifier with an evidence kit container status and correlates each unique user identifier with at least one of the set of cases and the unique evidence kit container identifier for each case in the set of cases, wherein each one of the evidence kit containers is solely used for a single case in the set of cases, wherein a first subset of the evidence containers are comprised of a plurality of fixed-size specimen containers, wherein a second subset of the evidence containers are comprised of expandable vessels, and wherein the expandable vessel have an expanded volume greater than a space within the evidence kit container.

13. The system of claim 11, wherein the system user accounts are selected from the group of accounts consisting of a plurality of registered accounts, a plurality of non-registered accounts, and a combination thereof, wherein the unique user identifier is communicated from the computing device to the central server, wherein the computing device receives from the central server a set of the electronic records correlated with unique user identifier in the central database, wherein the unique user identifier for one of the custodial accounts is associated with at least one of a law enforcement officer and a sexual assault nurse evaluator, wherein the unique user identifier for one of the victim accounts is associated with the unique evidence kit container identifier and the corresponding evidence kit container status, and wherein the corresponding electronic records are received from the central server.

14. The system of claim 11, wherein the victim identifier does not include personally identifiable information, wherein the electronic records received by the computing device for the victim accounts are comprised of at least the unique evidence kit container identifier and the evidence kit container status, wherein the computing device is comprised of a handheld computer for a law enforcement officer with one of the custodial accounts in networked communication with the central server, wherein the electronic records are stored in the memory of the handheld computer for at least one case, wherein a search term is entered through the user input device of the handheld computer, wherein the computer processor performs an internal search of the memory for the search term, wherein the handheld computer sends the search term to the central server in an external search request, wherein the computer processor receives at least one of an internal search result and an external search result from the central server for the search term, and wherein the handheld computer provides on the display screen at least one of the internal search result and the external search result.

15. A system for tracking evidentiary materials from remote locations, comprising:
- a plurality of evidence kit containers, wherein the evidence kit containers are comprised of a corresponding set of unique evidence kit container identifiers, and wherein the evidence kit containers do not have any computer processor device;
- a plurality of evidence tags, wherein each one of the evidence tags comprises an evidence tag identifier with a unique machine readable indicia;
- a first set of evidence containers for holding the evidentiary materials, wherein a set of the evidence tags are attached to at least one of the evidentiary materials and the first set of evidence containers, and wherein the first set of evidence containers fit within the evidence kit container;
- a set of unique case identifiers, wherein the unique tracking identifiers respectively correspond to a set of cases;
- an evidence management server;
- an evidence management database, wherein the evidence management database is configured within the evidence management server, wherein the evidence management database comprises a plurality of electronic records corresponding with evidentiary materials for the set of cases, wherein the electronic records are comprised of a plurality of evidence entries stored in the evidence management database corresponding to a hierarchical relationship between the evidence kit containers, the evidence tags, at least one of the cases, and a set of victim biographical information, wherein the hierarchical relationship is comprised of a set of correlations in the evidence management database between the unique evidence kit container identifiers, the unique machine readable indicia, the case identifiers, the victim biographical information, and an evidence kit container status, and wherein the evidence entries are comprised of a plurality of evidentiary information, a set of evidence tag identifiers for the plurality of evidence tags, the unique evidence kit container identifiers, and the victim biographical information;
- a central server, wherein the central server is in networked communication with the evidence management database through the evidence management server;
- a central database, wherein the central database is configured within the central server, wherein the central database comprises the unique evidence kit container identifier for each of the evidence kit containers and the corresponding evidence kit container status;
- a first set of computing devices in operative communication with at least one of the evidence management server and the central server;
- a second set of computing devices in operative communication with the central server;
- a third set of computing devices in operative communication with the central server;
- a first set of law enforcement officer custodial accounts with read-write access to input the evidence entries to the evidence management database on the evidence management server through at least an entry of one unique evidence kit container identifier for a corresponding one of the evidence kit containers and at least one scan of the unique machine readable indicia for a corresponding one of the evidence tags by the first set of computing devices, to query the evidence management database through the first set of computing devices, and to view the evidence entries on the first set of computing devices, wherein the evidence management server communicates the evidence kit container identifiers and the corresponding evidence kit container status to the central server for entry into the central database;
- a set of sexual assault nurse evaluator custodial accounts with read-write access to input the unique evidence kit container identifiers to the central database on the central server through the second set of computing devices; and
- a set of victim accounts with a read-only access to query the central database on the central server through the third set of computing devices and to view a limited set of the evidence entries from the central database through the third set of computing devices.

16. The system of claim 15, further comprising a second set of law enforcement officer custodial accounts with read-write access to input the evidence entries to the central database on the central server through the first set of computing devices, to query the central database through the first set of computing devices, and to view the evidence entries on the first set of computing devices, wherein each one of the computing devices in the first set of computing devices is comprised of a computer processor, a memory, a display screen, and a data entry device, wherein the data entry device is at least one of a camera module, a microphone, and a user input device, wherein the unique evidence kit container identifiers are each comprised of a unique machine readable indicia, and wherein the unique evidence kit container identifiers for each one of the evidence kit containers is entered into the computer processor through a scan of the corresponding unique machine readable indicia entry by the data entry device.

17. The system of claim 15, further comprising a healthcare management server in networked communication with the central database through the central server, wherein the sexual assault nurse evaluator custodial accounts have read-write access to input the unique evidence kit container identifiers and victim biographical information to the healthcare management server through the second set of computing devices, and wherein the healthcare management server communicates the evidence kit container identifiers and victim biographical information to the central server for entry into the central database.

18. The system of claim 15, wherein each one of the computing devices in the first set of computing devices is comprised of a computer processor, a memory, a display screen, and a data entry device, wherein the data entry device is at least one of a camera module, a microphone, and a user input device, wherein a set of the electronic records are stored in the memory for a corresponding one of the cases, wherein a search term is entered through the user input device, wherein the computer processor performs an internal search of the memory for the search term, wherein the computer processor sends the search term to the evidence management server in an external search request for the evidence management database, wherein the computer processor receives at least one of an internal search result of the memory for the search term and an external search result of the evidence management database for the search term, and wherein the display screen shows at least one of the internal search result and the external search result.

19. The system of claim 15, further comprising a second set of evidence containers stored in the evidence kit containers, wherein the first set of evidence containers are comprised of a plurality of fixed-size specimen containers, wherein the second set of evidence containers are comprised of an expandable vessel, and wherein the expandable vessel has an expanded volume greater than a space within the evidence kit containers.

20. The system of claim 15, wherein each one of the evidence kit containers uniquely corresponds with and is solely used for a single case.

\* \* \* \* \*

UNITED STATES PATENT AND TRADEMARK OFFICE
CERTIFICATE OF CORRECTION

PATENT NO. : 11,151,676 B2
APPLICATION NO. : 15/892578
DATED : October 19, 2021
INVENTOR(S) : McIntyre It is certified that error appears in the above-identified patent and that said Letters Patent is hereby corrected as shown below:

In the Claims

In Claim 1:
Column 63 at Line 5 should read: "wherein the system user permissions are configured to"
Column 63 at Line 9 should read: "comprised of a query access for all of the system user"
Column 63 at Line 17 should read: "ing device to the central database for storage in the corre-"

In Claim 7:
Column 64 at Line 32 should read: "entries to the central server for storage in the"

In Claim 11:
Column 65 at Line 24 should read: "a set of evidence containers for holding the evidentiary mate-"
Column 65 at Line 40 should read: "corresponding with the evidentiary materials, wherein the"
Column 66 at Line 2 should read: "system user permissions are configured to provide an"

In Claim 15:
Column 67 at Line 25 should read: "records corresponding with the evidentiary materials for"

Signed and Sealed this
Third Day of May, 2022

Katherine Kelly Vidal
*Director of the United States Patent and Trademark Office*